US012730826B2

(12) United States Patent
Nordstrom et al.

(10) Patent No.: US 12,730,826 B2
(45) **Date of Patent: *Sep. 8, 2026**

(54) ACTIVITY COMPUTER SYSTEMS

(71) Applicant: Eventyr Outdoors, Inc., Plymouth, MN (US)

(72) Inventors: Craig Allen Nordstrom, Maple Grove, MN (US); Daniel James Ellyson, Deer Park, WI (US); Joshua Aaron Smith, Maple Grove, MN (US)

(73) Assignee: Eventyr Outdoors, Inc., Plymouth, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/020,372

(22) Filed: Jan. 14, 2025

(65) Prior Publication Data

US 2025/0148554 A1 May 8, 2025

Related U.S. Application Data

(63) Continuation of application No. 17/520,377, filed on Nov. 5, 2021, now Pat. No. 12,236,496, which is a (Continued)

(51) Int. Cl.
*G06Q 10/02* (2012.01)
*G06F 16/9537* (2019.01)
(Continued)

(52) U.S. Cl.
CPC ........ *H04W 4/021* (2013.01); *G06F 16/9537* (2019.01); *G06Q 10/02* (2013.01); (Continued)

(58) Field of Classification Search
CPC ... H04W 4/021; G06F 16/9537; G06Q 10/02; G06Q 50/14; G06Q 10/40; G06Q 30/0613
(Continued)

(56) References Cited

U.S. PATENT DOCUMENTS 7,881,955 B2 2/2011 Ewart et al.
2001/0054043 A1 12/2001 Harlan
(Continued)

FOREIGN PATENT DOCUMENTS

WO WO-2012128991 A1 * 9/2012 ............... G01S 1/02

OTHER PUBLICATIONS

Davis, Alice, "Beacons on the Horizon," Q1 2016, attractionsmanament.com, pp. 68-71 (Year: 2016).*
(Continued)

*Primary Examiner* — Shannon S Campbell
*Assistant Examiner* — Freda A Nelson
(74) *Attorney, Agent, or Firm* — Fish & Richardson P.C.

(57) ABSTRACT

In one implementation, a system for broadcasting on-duty adventure opportunities among computing devices includes an adventure management computer system to transmit (a) push notifications to selected mobile computing devices related to activated on-duty adventure opportunities and (b) local beacon signal identifiers for mobile-to-mobile beacon signal transmissions for the activated on-duty adventure opportunities, a guide mobile computing device to locally broadcast information for the on-duty adventure opportunity, and a participant mobile computing device (i) to detect the local beacon signals with the local beacon signal identifier for the on-duty adventure opportunity, (ii) to obtain the adventure information for the on-duty adventure opportunity from the adventure management computer system, and (iii) to reserve the on-duty adventure opportunity with the adventure management computer system.

20 Claims, 54 Drawing Sheets

Related U.S. Application Data continuation of application No. 16/484,222, filed as application No. PCT/US2018/017217 on Feb. 7, 2018, now Pat. No. 11,200,628.

(60) Provisional application No. 62/455,886, filed on Feb. 7, 2017.

(51) Int. Cl.

| | |
|---|---|
| ***G06Q 50/14*** | (2012.01) |
| ***H04W 4/021*** | (2018.01) |
| *G06Q 10/40* | (2026.01) |
| *G06Q 30/0601* | (2023.01) |

(52) U.S. Cl.
CPC ............. *G06Q 50/14* (2013.01); *G06Q 10/40* (2026.01); *G06Q 30/0613* (2013.01)

(58) Field of Classification Search
USPC .............................................................. 705/5
See application file for complete search history.

(56) References Cited

U.S. PATENT DOCUMENTS

| | | | | |
|---|---|---|---|---|
| 2008/0046298 | A1 | 2/2008 | Ben-Yehuda et al. | |
| 2008/0201227 | A1* | 8/2008 | Bakewell | G06Q 30/02 705/14.19 |
| 2009/0239552 | A1 | 9/2009 | Churchill et al. | |
| 2010/0191550 | A1* | 7/2010 | Hutson | G06Q 30/04 707/711 |
| 2012/0202428 | A1* | 8/2012 | Mirbaha | H04W 4/08 455/41.2 |
| 2013/0024203 | A1* | 1/2013 | Flores | G06Q 30/02 705/1.1 |
| 2013/0282421 | A1 | 10/2013 | Graff et al. | |
| 2013/0304522 | A1* | 11/2013 | Cundle | G06Q 10/02 705/5 |
| 2015/0058324 | A1 | 2/2015 | Kauwe et al. | |
| 2015/0339694 | A1 | 11/2015 | Robbin et al. | |
| 2016/0092954 | A1* | 3/2016 | Bassett | H04W 4/023 705/26.41 |
| 2016/0239737 | A1* | 8/2016 | Jiang | G10L 25/48 |
| 2017/0093967 | A1 | 3/2017 | Grosz | |
| 2019/0098445 | A1* | 3/2019 | Hu | H04W 12/50 |
| 2020/0027178 | A1 | 1/2020 | Nordstrom et al. | |
| 2022/0130000 | A1 | 4/2022 | Nordstrom et al. | |

OTHER PUBLICATIONS

Marcelo, Bustamante, “Beacons Everywhere! Possible Locations for Beacons”, Jul. 27, 2016, 2016, dma.org, 3 pages. (Year: 2016).*

Ramirez, Christmas, “The Must-Have Outdoor Apps for 2016”, Dec. 21, 2015, elevationoutdoors.com; 17 pages. (Year: 2015).*

Davis, Alice, “Beacons on the Horizon,” Q1 2016, attractionsnnanannent.conn, pp. 68-71, (Year: 2016).

International Search Report and Written Opinion in Appln. No. PCT/US2018/017217, dated Jun. 25, 2018, 13 pages.

Scheuernnan, Morgan, “7 Reasons To Use Beacon Technology On Campuses”, Jan. 25, 2016, elearningindustry.conn, 13 pages. (Year: 2016).

Viera Palmarova, Gabriela Lovaszova, “Mobile Technology Used in an Adventurous Outdoor Learning Activity: A Case Study”, Jul. 2012, Problems of Education in the 21st Century 44(1):64-71. (Year: 2012).

* cited by examiner

Figures 7K, 7L:
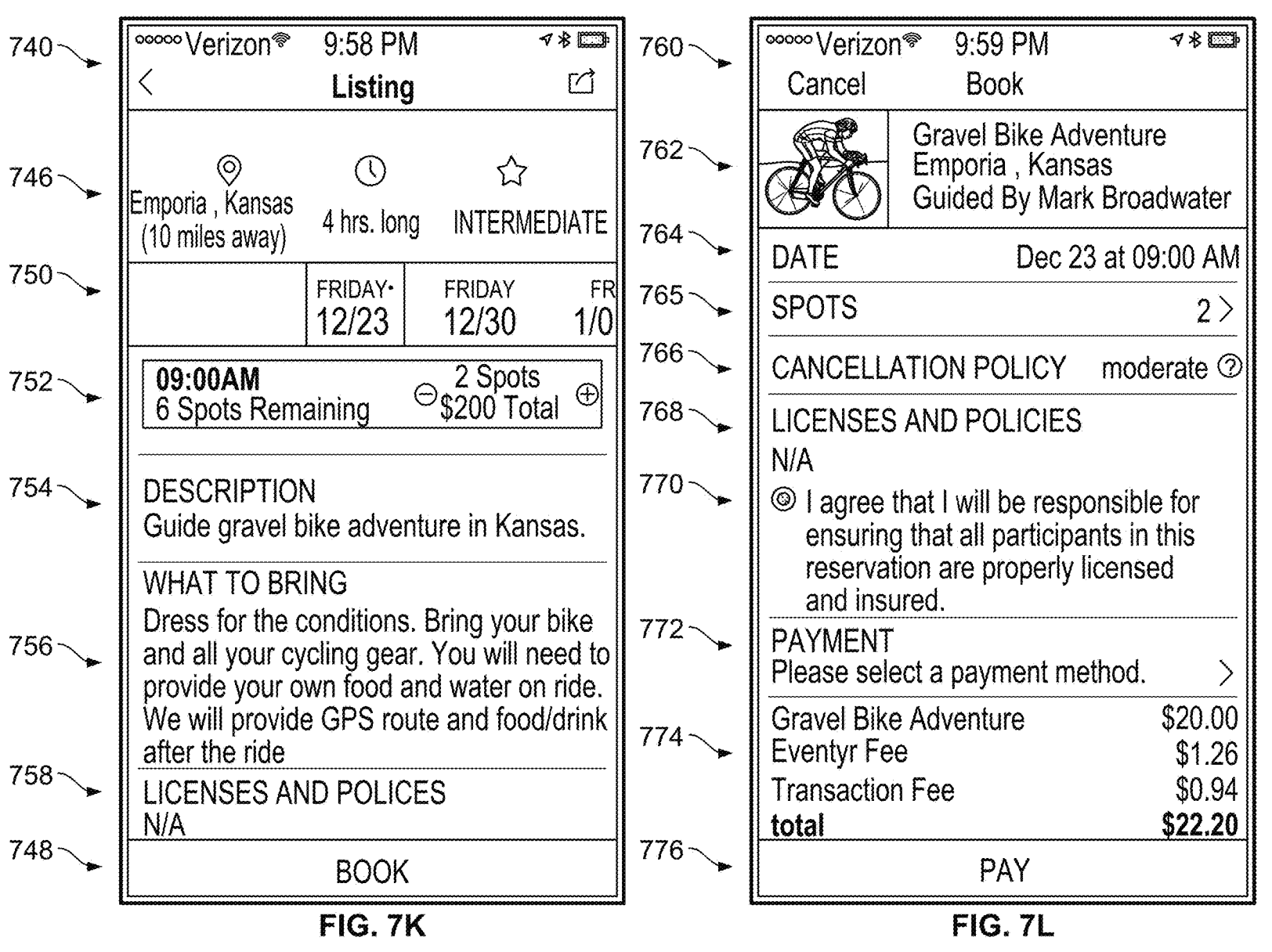

ooooo Verizon 9:58 PM
Listing
Emporia , Kansas
(10 miles away)
4 hrs. long
INTERMEDIATE
FRIDAY 12/23
FRIDAY 12/30
FR 1/0
09:00AM
6 Spots Remaining
2 Spots
$200 Total
DESCRIPTION
Guide gravel bike adventure in Kansas.
WHAT TO BRING
Dress for the conditions. Bring your bike and all your cycling gear. You will need to provide your own food and water on ride. We will provide GPS route and food/drink after the ride
LICENSES AND POLICES
N/A
BOOK 740, 746, 750, 752, 754, 756, 758, 748

FIG. 7K ooooo Verizon 9:59 PM
Cancel Book
Gravel Bike Adventure
Emporia , Kansas
Guided By Mark Broadwater
DATE Dec 23 at 09:00 AM
SPOTS 2 >
CANCELLATION POLICY moderate ?
LICENSES AND POLICIES
N/A
I agree that I will be responsible for ensuring that all participants in this reservation are properly licensed and insured.
PAYMENT
Please select a payment method. >
Gravel Bike Adventure $20.00
Eventyr Fee $1.26
Transaction Fee $0.94
total $22.20
PAY 760, 762, 764, 765, 766, 768, 770, 772, 774, 776

Figures 7M, 7N:
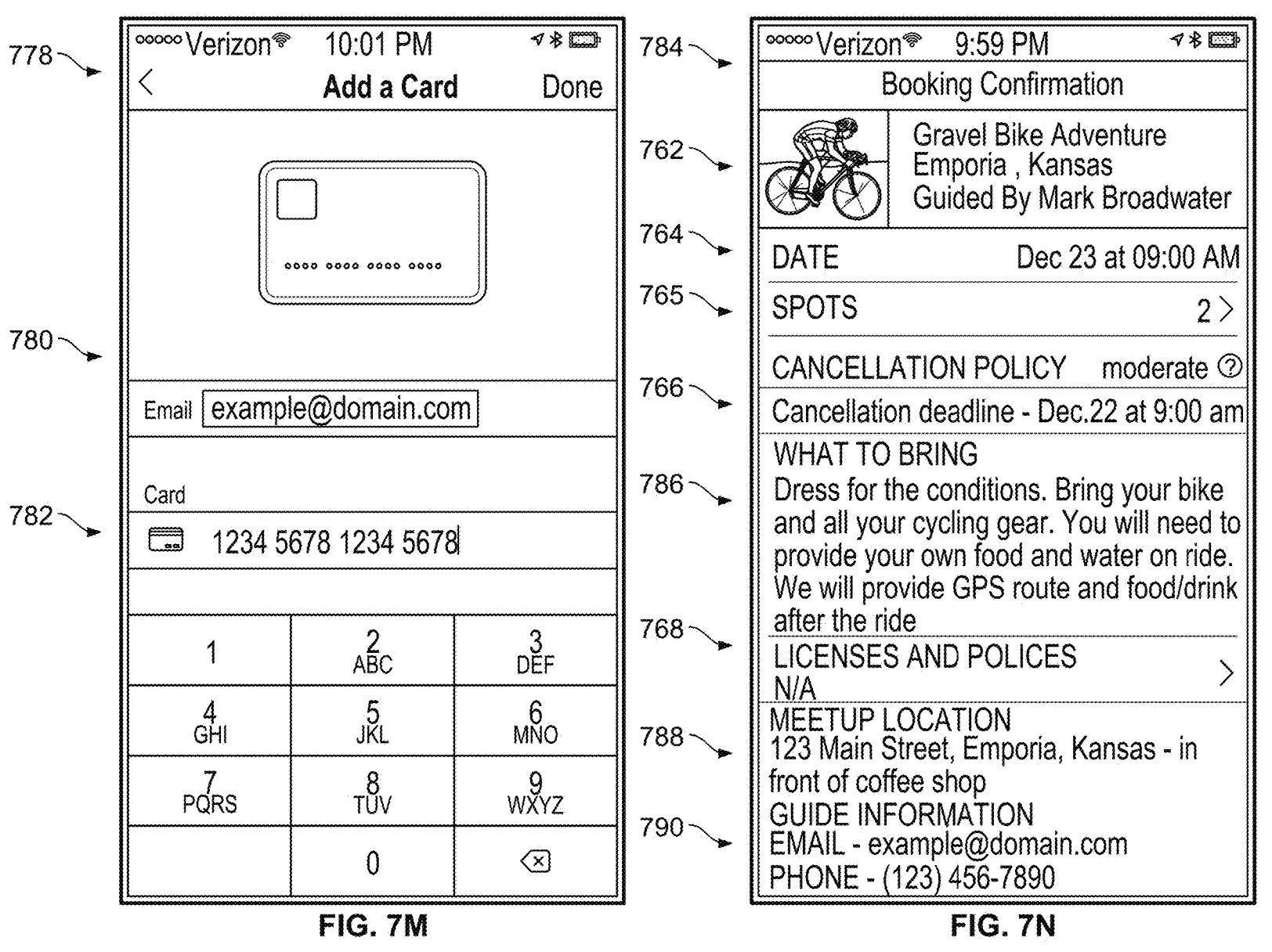

FIG. 7L 778
780
782 ooooo Verizon 10:01 PM
Add a Card
Done
oooo oooo oooo oooo
Email example@domain.com
Card
1234 5678 1234 5678
1
2 ABC
3 DEF
4 GHI
5 JKL
6 MNO
7 PQRS
8 TUV
9 WXYZ
0

FIG. 7M 784
762
764
765
766
786
768
788
790 ooooo Verizon 9:59 PM
Booking Confirmation
Gravel Bike Adventure
Emporia , Kansas
Guided By Mark Broadwater
DATE Dec 23 at 09:00 AM
SPOTS 2 >
CANCELLATION POLICY moderate ?
Cancellation deadline - Dec.22 at 9:00 am
WHAT TO BRING
Dress for the conditions. Bring your bike and all your cycling gear. You will need to provide your own food and water on ride. We will provide GPS route and food/drink after the ride
LICENSES AND POLICES >
N/A
MEETUP LOCATION
123 Main Street, Emporia, Kansas - in front of coffee shop
GUIDE INFORMATION
EMAIL - example@domain.com
PHONE - (123) 456-7890

EVENTYR Step 5: Preview Finish

⑤ PREVIEW

Water

FROM
$125/activity

Tu scarora Lodge & Canoe Outfitters
Bob

Maple Grove, Minnesota | 4 Hours Long | Beginner Level

DESCRIPTION
We're Andy McDonnell and Ada Igoe. "Born and raised, as they say, we both grew up outside of Grand Marais, MN and spent our childhoods in the woods. We reconnected after college when we both worked at the same Gunflint Trail outfitters for a summer. Since then, we've been making our lives together on the Gunflint Trail, helping people discover and explore the Boundary Waters Canoe Area Wilderness, Quetico Provincial Park, Superior National Forest, and Gunflint Trail. We love using our local knowledge to help you create your best canoe trip or cabin getaway ever. We look forward to meeting you!

WHAT TO BRING
- Change of clothes in case you get wet
- waterproof hiking boots

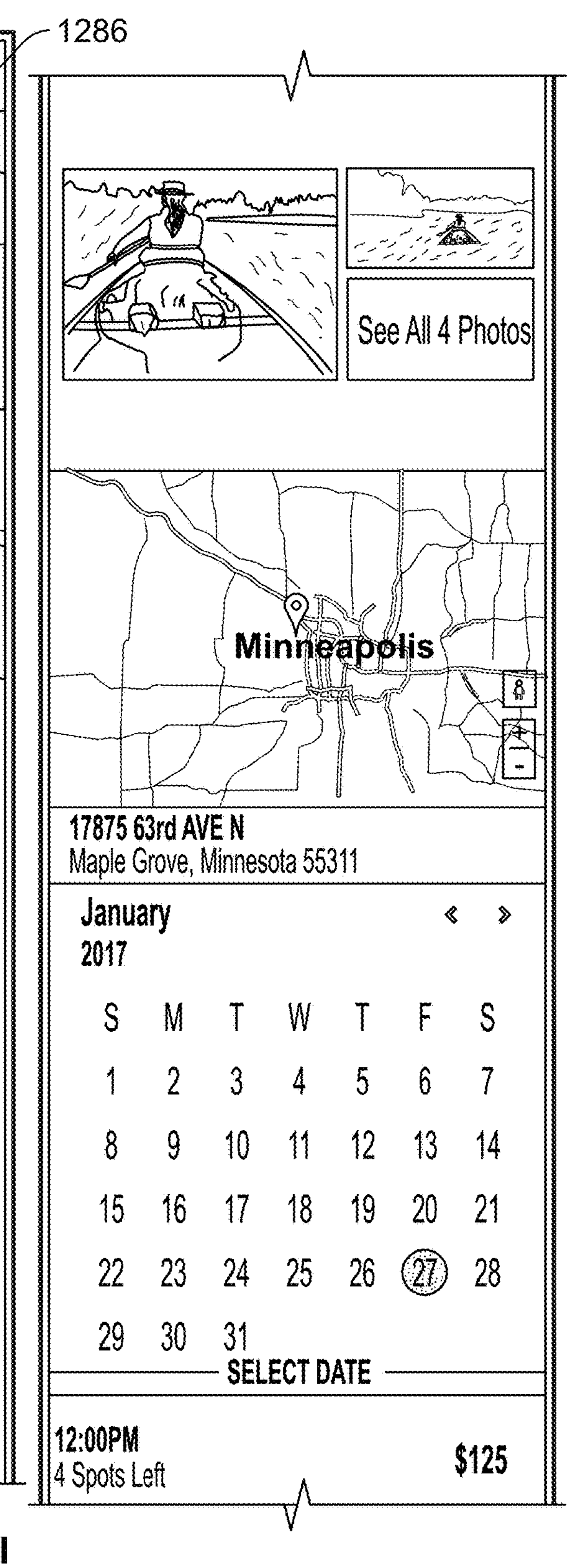

FIG. 12I

ACTIVITY COMPUTER SYSTEMS

CROSS-REFERENCE TO RELATED APPLICATIONS

This application is a continuation of U.S. application Ser. No. 17/520,377, filed on Nov. 5, 2021, which is a continuation of U.S. application Ser. No. 16/484,222, filed on Aug. 7, 2019 (now U.S. Pat. No. 11,200,628), which is a National Stage Application under 35 U.S.C. § 371 of International Application No. PCT/US2018/017217, filed on Feb. 7, 2018, which claims priority to U.S. Application Ser. No. 62/455,886, filed on Feb. 7, 2017. The disclosures of the prior applications are incorporated by reference in their entirety.

TECHNICAL FIELD

This document generally describes technological improvements to user interfaces and computer systems for connecting users with sources of outdoor guide opportunities or other activities.

BACKGROUND

Outdoor guides can be experts in one or more outdoor activities, like hunting or fishing, and provide guiding services for clients related to their areas of expertise. In general, guide services can include a variety of different activities, such as instructing beginners or enthusiasts on one or more outdoor skills (e.g., casting techniques for fly fishing), introducing users to particular outdoor locations (e.g., bringing users to a particularly good hunting location), and/or guiding users on an outdoor experience (e.g., taking users on a hunting trip). Typically, an expert guide is hired by users on a per trip or per experience basis, which can last anywhere from a couple hours to a couple weeks (or longer).

Users have located guides in a number of ways, such as through word of mouth referrals, recommendations through hospitality services (e.g., concierge services), online advertising, and internet searches. For example, an outdoor guide may have an individual website to describe his/her services and may also purchase online advertising on social networking and internet search platforms. Prospective and existing users can locate and connect with this outdoor guide in a variety of ways, such as through entering the uniform resource locator (URL) for the guide's website into a web browser, conducting an internet search for the guide (which can link back to the guide's website), and/or selecting an online advertisement for the guide (which can also link back to the guide's website).

SUMMARY

This document generally describes technology for an improved platform and mobile user interface that optionally combines social media aspects with activity sourcing capabilities for connecting users with sources of outdoor guide opportunities or other activities. Such connections between users and guide opportunities can be made based on any of a variety of factors, such as location, time of day, date, available or required equipment, range of costs, cost-sharing bid opportunities, stored user preferences, historical reviews from previous users, a user-specific input level of adventure/risk, or the like. In particular embodiments, the improved platform and user interface features can be implemented in a manner that allows for users and/or adventure providers (e.g., guides) to be rapidly on-boarded (enrolled) to the platform.

In one example, such an improved platform can be more technically complex than a conventional social media platform based on adventure opportunities and all of the corresponding facets of scheduling, booking, and fulfilling adventures. Accordingly, on-boarding users to this example of the platform can reduce or eliminate multiple and iterative different requests to the user for information, which can be time consuming and difficult to fulfill depending on the user's device type (e.g., smartwatch, smartphone, wearable computing device, tablet). The improved platform can streamline the onboarding process through a set of non-conventional user interface features that prompt the user for minimal information on the front end by accessing user information from other sources and/or delaying obtaining such information from the user until one or more later points in time. By offloading the burden on users through non-conventional user interface features, the improved platform can provide an on-boarding process that can remove barriers to entry and participation for users.

Once on-boarded, the improved platform can provide a guide-pairing computer system configured to pair users seeking a physical activity (e.g., either a specific, predetermined activity or a spontaneous, previously unplanned or unknown activity) with a variety of filtered sources for such activity. Such computer systems can use internet-based technology to assist users in identifying, connecting with, and reserving an activity from a set of selectable adventures (e.g., outdoor guide trips, outdoor guided experiences, marine-based activities, excursions, ecotours, sporting activities, personal training, and other events) with appropriate guides across varied fields of interest and varied geographic regions (including outdoor activities and indoor activities). For example, users can identify, reserve, and pay for outdoor opportunities that are offered by outdoor guides through a centralized computer system (e.g., server system, cloud-based computer system), which can include connecting users with guides and outdoor opportunities that are located near a user's current location or near a location that the user will be visiting at a future date. Guides and guide opportunities can additionally and/or alternatively be identified based on other search criteria (e.g., type of opportunity, date, time, guide reviews, guide ratings, required gear, price) that may be explicitly and/or implicitly determined based on user input through a client device, such as a mobile device (e.g., smartphone, tablet computing device), laptop, and/or desktop computer.

In some implementations, specifically programmed mobile applications (e.g., accessed via a smartphone or tablet) and web applications (e.g., accessed via a browser of a computing device) to communicate with such a centralized computer system can be provided to, installed on, and executed/interpreted by client computing devices used by guides and users. Mobile applications (referred to herein as "mobile apps") and web applications can provide features to generate, identify, reserve, and process payments for outdoor adventures or other activities (e.g., trips, outdoor experiences) through, for example, securely accessing specific hardware components on the client computing devices, like location services (e.g., global positioning system (GPS) components, Wi-Fi positioning components, wireless beacons), audio and visual inputs (e.g., cameras, microphones), volatile and non-volatile storage locations (e.g., local storage devices, memory), output mechanisms (e.g., touchscreen display, speaker), and/or input mechanisms (e.g., touchscreen, buttons, motion/orientation sensors). For example, a mobile app that is installed on a guide's computing device can include input features through which a guide can geotag one or more locations that are relevant to a proposed guide trip (e.g., meetup location, route to be travelled on the trip, recommended gear retailer location), select or take photos/videos that depict the experience for a trip, input equipment information and images (e.g., identifying what equipment is provided by the guide or what equipment is recommend to be brought by the user), and/or access a local calendar on the guide's device to identify possible times for the guide trip. In another example, a mobile app installed on a user's device, which may be the same as or different from a mobile app installed on a guide's device, can include input features through which a user can provide permission for the current geolocation of the mobile device to be provided to and used by the centralized computer system to identify nearby guided adventures, designate particular types of outdoor adventures (e.g., trips, outdoor experiences) that are of interest, and/or select and secure registration for particular adventures. Additional and/or alternative mobile app features are also possible.

In some implementations, a mobile app installed on a guide's computing device can provide an "on-duty" service in which the guide can activate an adventure opportunity when the guide is physically at the location for an adventure, which can prompt the centralized computer system to promote and book the adventure opportunity for nearby participants. The "on demand" service can be different from other adventure bookings that are made further in advance of the adventure date/time, and which can have attached cancellation policies (e.g., 24 hour cancellation policy). For example, a guide providing ski lessons can simply show up to a ski area and activate the on-duty feature for a ski lesson adventure at the ski area, and the central computer system can promote and book the ski adventure for nearby participants. The central computer system can promote on-duty adventures in any of a variety of ways, such as through providing notifications (e.g., push notifications) on mobile apps of users who are currently (or were recently, historically) located near the location of the on-duty adventure, interested in that type of adventure (e.g., based on express interests, based on historical adventure participation), and/or combinations of other factors. Additionally and/or alternatively, the mobile device and app of the guide providing the on-duty adventure service can locally broadcast information about the on-duty adventure, such as through transmitting a local beacon signal (e.g., BLUETOOTH low energy (BLE) beacon signal, Wi-Fi beacon signal, near filed communication (NFC) beacon) for which user mobile applications are programmed to listen, detect, and request additional information. Such beacon signals can include a unique identifier for the on-duty adventure, which may be encoded with some higher-level adventure type information (e.g., skiing type adventure, hunting type adventure, snow mobile type adventure) and which can be used by user devices to request additional information for and to book the adventure through the centralized computer system.

In some implementations, such a centralized computer system can serve adventure and guide information to user computing devices (e.g., adventure description and images, guide reviews, required gear and licenses), but can hold back some information relevant to the adventure until the adventure has been booked and/or proceeded until a cancellation window has closed. Hold-back information can include information that a user would be able to use in order to circumvent the centralized computer system to book the adventure, such as the guide's direct contact information (e.g., phone number, email address), the specific locations where the guide is scheduled to meet participants for adventures (e.g., street address for meet-up location), and/or other details that users could potentially use to thwart the system. Similarly, information on participants in an adventure may be held back from guides until an adventure has been booked and/or has proceeded past the cancellation window.

In one implementation, a system for broadcasting on-duty adventure opportunities among computing devices includes an adventure management computer system to manage information and reservations for adventure opportunities, the adventure management computer system including: a frontend (i) to receive requests to activate on-duty adventure opportunities and (ii) to transmit (a) push notifications to selected mobile computing devices related to activated on-duty adventure opportunities and (b) local beacon signal identifiers for mobile-to-mobile beacon signal transmissions for the activated on-duty adventure opportunities, a backend (i) to select the mobile computing from among a group of mobile computing devices based, at least in part, proximity of the mobile computing devices to the on-duty adventure opportunities and (ii) to generate the local beacon signal identifiers, and a data storage system to store user data and adventure data according to a particular database schema, wherein the user data includes, at least, location information for users associated with the group of mobile computing devices, wherein the adventure data includes, at least, (i) adventure information and (ii) the local beacon signal identifiers. The system can further include a guide mobile computing device to activate an on-duty adventure opportunity and to locally broadcast information for the on-duty adventure opportunity, the guide mobile computing device including: a display to output user interface control features for activating the on-duty adventure opportunity, an input subsystem to receive user input activating the on-duty adventure opportunity, a location subsystem to determine a current location of the guide computing device, a first wireless communication chipset (i) to transmit a request to activate the on-duty adventure opportunity to the adventure management computer system and (ii) to receive a local beacon signal identifier for the activated on-duty adventure opportunity, and a second wireless communication chipset to transmit local beacon signals for detection by nearby mobile computing devices, the local beacon signals including, at least, the local beacon signal identifier for the activated on-duty adventure opportunity. The system can further include a participant mobile computing device (i) to detect the local beacon signals with the local beacon signal identifier for the on-duty adventure opportunity, (ii) to obtain the adventure information for the on-duty adventure opportunity from the adventure management computer system, and (iii) to reserve the on-duty adventure opportunity with the adventure management computer system, the participant mobile computing device including: a first wireless communication chipset to detect the local beacon signals with the local beacon signal identifier for the on-duty adventure opportunity, and a second wireless communication chipset to transmit a request for the adventure information for the on-duty adventure opportunity and to transmit a request to reserve the on-duty adventure opportunity.

Such an implementation can optionally include one or more of the following features. The first wireless communication chipset of the guide mobile computing device can be a mobile data network chipset. The second wireless communication chipset of the guide mobile computing device can be a Wi-Fi chipset. The second wireless communication chipset of the participant mobile computing device can be a Wi-Fi chipset. The first wireless communication chipset of the guide mobile computing device can be a mobile data network chipset. The second wireless communication chipset of the guide mobile computing device can be a BLUETOOTH chipset. The second wireless communication chipset of the participant mobile computing device can be a BLUETOOTH chipset. The first wireless communication chipset of the guide mobile computing device can be a Wi-Fi chipset. The second wireless communication chipset of the guide mobile computing device can be a BLUETOOTH chipset. The second wireless communication chipset of the participant mobile computing device can be a BLUETOOTH chipset. The activated on-duty adventure opportunity can be reserved by the participant mobile computing device based on the local beacon signals from the guide mobile computing device being detected and without the participant mobile computing device needing to determine its own location. The location subsystem can include a global positioning system (GPS) subsystem to determine the current location based on one or more detected satellite signals. The location subsystem can include a local positioning subsystem using terrestrial wireless signals to determine the current location. The database schema can include a plurality of relational database tables that include, at least, (i) a booking table that represents adventure reservation instances that each include a number of reserved spots and (ii) a tour table that represents adventure opportunity instances that each include an aggregate number of remaining spots available. The aggregate number of remaining spots in the tour table can be (i) redundant of an aggregation of the adventure reservation instances and (ii) provides a faster recall of the aggregate number of remaining spots from the database than the aggregation of values in the booking table.

In another implementation, a method for broadcasting on-duty adventure opportunities among computing devices includes receiving, via a user interface on a mobile computing device, user input to activate an on-duty adventure opportunity; obtaining, from a location subsystem of the mobile computing device, a current location of the mobile computing device; transmitting, using a first wireless chipset of the mobile computing device, a request to an adventure management computer system for activating the on-duty adventure opportunity, wherein the request includes, at least, the current location; receiving, using the first wireless chipset of the mobile computing device, confirmation that that on-duty adventure opportunity has been activated and an identifier for the activated on-duty adventure opportunity; repeatedly transmitting, using a second wireless chipset of the mobile computing device, a beacon signal that includes, at least, the identifier for the activated on-duty adventure opportunity in the payload, wherein the beacon signal is formatted to be detected by another mobile computing device that, upon detection, will automatically cause the other mobile computing device to request adventure information from the adventure management computer system and to present an interface with reservation control features for the on-duty adventure opportunity; receiving, using the first wireless chipset of the mobile computing device, confirmation that the other mobile computing device has reserved the on-duty adventure opportunity; and stopping, by the mobile computing device, the repeated transmission of the beacon signal in response to receiving the confirmation.

Such an implementation can optionally include one or more of the following features. The first wireless communication chipset of the mobile computing device can be a mobile data network chipset. The second wireless communication chipset of the mobile computing device can be a Wi-Fi chipset. The first wireless communication chipset of the mobile computing device can be a mobile data network chipset. The second wireless communication chipset of the mobile computing device can be a BLUETOOTH chipset. The first wireless communication chipset of the mobile computing device can be a Wi-Fi chipset. The second wireless communication chipset of the mobile computing device can be a BLUETOOTH chipset. The activated on-duty adventure opportunity can be reserved by the other mobile computing device based on the beacon signals from the mobile computing device being detected and without the other mobile computing device needing to determine its own location. The confirmation can include contact information for a user associated with the other mobile computing device that, prior to the on-duty adventure opportunity being reserved, was not available on the mobile computing device. Contact information for a user of the mobile computing device can be transmitted to the other computing device with confirmation of the reservation.

In another implementation, a method for on-boarding users to an adventure management platform includes outputting, on a computing device, a sequence of screens that each include one or more fields to enroll a user with the adventure management platform, wherein the adventure management platform provides electronic listings of outdoor adventure opportunities that are available for reservation on a single site across a plurality of different adventure providers, wherein the sequence of screens comprises less than a threshold number of screens; receiving, at the computing device, user input via the sequence of screens to create an account for a user of the computing device; transmitting, by the computing device, the user input to an adventure management computer system hosting the adventure management platform; receiving, at the computing device, confirmation that the account for the user has been created; and accessing, on the computing device, the adventure management platform in response to receiving the confirmation.

Such an implementation can optionally include one or more of the following. The sequence of screens can include a first screen that obtains authorization to access data from one or more social media profiles for the user, one or more second screens that are limited to requesting information that was otherwise not identified in the data accessed from the one or more social media profiles. The user includes a participant on the adventure management platform, and the threshold number of screens is three screens. The user includes a guide on the adventure management platform, and the threshold number of screens is nine screens. The sequence of screens can include a first set of screens to create the account for the user and a second set of screens to create an initial adventure opportunity for the guide on the adventure management platform.

In another implementation, a method for limiting access to guide and participant contact information on an adventure management platform includes receiving, at an adventure management computer system hosting the adventure management platform, a request to add an adventure opportunity to the adventure management platform, the request being from a guide computing device and including information identifying a guide for the adventure opportunity; storing, by the adventure management computer system, the adventure opportunity in association with an account for the guide on the adventure management platform, the account including contact information for the guide; transmitting, by the adventure management computer system, information for the adventure opportunity to a participant computing device, wherein the information describes the adventure opportunity and the guide without including the contact information for the guide; receiving, at the adventure management computer system, a reservation request for the adventure opportunity from the participant computing device; reserving, by the adventure management computer system, one or more spots on the adventure opportunity in association with the participant computing device; and transmitting, by the adventure management computer system, confirmation of the reservation and the contact information for the guide after the adventure opportunity is reserved, wherein transmitting the contact information permits a participating user of the participant computing device to contact the guide directly without the adventure management computer system being included in the communication.

Such an implementation can optionally include one or more of the following features. The contact information can be transmitted in response to the adventure opportunity being reserved. The contact information can be transmitted in response to a cancellation period for the reservation expiring.

In another implementation, a method for providing on-duty adventure opportunities includes activating an on-duty adventure opportunity being offered at a location; transmitting, in response to the activating, information describing the on-duty adventure opportunity to computing devices near the location; and booking the adventure opportunity for a particular user in response to a booking request from a particular computing associated with the particular user.

In another implementation, a system for providing on-duty adventure opportunities includes one or more computing devices each with a processor and memory storing instructions that, when executed, cause the processor to: activate an on-duty adventure opportunity being offered at a location; transmit, in response to the activating, information describing the on-duty adventure opportunity to computing devices near the location; and book the adventure opportunity for a particular user in response to a booking request from a particular computing associated with the particular user.

In another implementation, a system for providing on-duty adventure opportunities includes means for activating an on-duty adventure opportunity being offered at a location; means for transmitting, in response to the activating, information describing the on-duty adventure opportunity to computing devices near the location; and means for booking the adventure opportunity for a particular user in response to a booking request from a particular computing associated with the particular user.

In another implementation, a method for on-boarding users to an adventure management platform includes outputting less than a threshold number of screens to enroll a user with the adventure management platform; transmitting enrollment input received via the screens to the adventure management platform; and accessing the adventure management platform in response to receiving confirmation the user has been enrolled.

In another implementation, a system for on-boarding users to an adventure management platform includes one or more computing devices each with a processor and memory storing instructions that, when executed, cause the processor to: output less than a threshold number of screens to enroll a user with the adventure management platform; transmit enrollment input received via the screens to the adventure management platform; and access the adventure management platform in response to receiving confirmation the user has been enrolled.

In another implementation, a system for on-boarding users to an adventure management platform includes means for outputting less than a threshold number of screens to enroll a user with the adventure management platform; means for transmitting enrollment input received via the screens to the adventure management platform; and means for accessing the adventure management platform in response to receiving confirmation the user has been enrolled.

In another implementation, a method for limiting access to information on an adventure management platform includes transmitting adventure opportunity information that describes an adventure opportunity and a guide without including the contact information for the guide; reserving one or more spots on the adventure opportunity; and transmitting confirmation of the reservation and the contact information for the guide after the adventure opportunity is reserved.

In another implementation, a system for limiting access to information on an adventure management platform includes one or more computing devices each with a processor and memory storing instructions that, when executed, cause the processor to: transmit adventure opportunity information that describes an adventure opportunity and a guide without including the contact information for the guide; reserve one or more spots on the adventure opportunity; and transmit confirmation of the reservation and the contact information for the guide after the adventure opportunity is reserved.

In another implementation, a system for limiting access to information on an adventure management platform includes means for transmitting adventure opportunity information that describes an adventure opportunity and a guide without including the contact information for the guide; means for reserving one or more spots on the adventure opportunity; and means for transmitting confirmation of the reservation and the contact information for the guide after the adventure opportunity is reserved.

Certain implementations of the improved system or method may provide one or more advantages. For example, users and guides can be more efficiently on-boarded through web and mobile applications running on user computing devices, and through a centralized computer system (e.g., cloud based computer system, server system). For instance, instead of providing interfaces that include multiple different pages of forms and fields through which users are requested to provide information, which can be difficult and onerous on the user depending on the type of computing device that he/she is using (e.g., type-inputs can be more difficult on touchscreen interfaces, particularly devices with smaller form factor touchscreen displays). To facilitate user experience and on-boarding, user interfaces are provided through web and mobile apps that request minimal inputs from a user by obtaining information from other sources (e.g., other social platforms and/or accounts authorized by users) and/or postponing obtaining some information until a later time. For example, the centralized computer system can be programmed to prompt user computing devices to request information from users at a metered pace over time (e.g., ask for one additional field of user information every month) to spread the profile creation process over time.

In a further example, mobile apps and web applications can additionally be programmed to minimize network traffic and, thus, improve the performance of the client computing devices and centralized computer system. For example, mobile apps and web applications running on client computing devices can be programmed to delay transmission of a guide/adventure search query until all parameters have been provided by a user so that intermediate results (e.g., results based on a portion of the parameters), which may only be partially relevant to the user, are not served to the user, which could cause wasted/unwanted network traffic. In another example, mobile apps and web applications can be programmed to cache guide and adventure information transmitted by a centralized computer system for at least a threshold period of time (e.g., 1 week, 1 month, 3 months, 1 year) and to reference the cache before requesting files and other data from the centralized computer system so as to avoid retransmission of information already contained on client computing devices. In another example, a centralized computer system and client computing devices can be programmed to use one or more data compression protocols that are common to across the centralized computer system and client computing devices so as to minimize an amount of network traffic for the centralized computer system and client computing devices to communicate.

In another example, the centralized computer system can be programmed to use a database schema that reduces latency associated with database requests. For example, the centralized computer system can use a database schema that includes fields that store aggregate data values that, conventionally, would be stored across multiple database records. For example, conventionally the status of availability for an adventure opportunity on a particular date may be determined by querying a table storing each booking for a unique identifier associated with the adventure opportunity, retrieving data values for those records (e.g., retrieving a number of spots that have been reserved in each booking), aggregating them, and then comparing them to a number of spots for the adventure to determine whether the adventure is available. In contrast, the centralized computer system can be programmed to store and update a tally of available slots for a particular adventure opportunity with the database record for the adventure opportunity as bookings are made. By doing this, the status of the adventure can be recalled through retrieval of the single database record, which can reduce disk reads/writes, comparison operations, and the overall number of queries that are run to achieve the results. Although such a configuration may present possible data integrity issues where the tally is adjusted inconsistently with the bookings, the centralized computer system can maintain a record of bookings that are queried and compared periodically (e.g., during periods of low traffic) to the tally to confirm the integrity of the tally database records.

In yet another example, mobile apps and web applications can be programmed to minimize the use of computing resources on client computing devices, which can minimize power consumption, improve operational efficiency, and overall improve the operation of client computing devices. For example, mobile apps and web applications can be programmed identify and register event handlers for particular client computing devices so that device components, like location services, are accessed at particular times during operation of the mobile apps and web applications instead of being continually polled. For instance, an event handler may be registered on a client computing device so that location services are only polled when a user has selected a button to identify guides or outdoor adventures that are located near the client computing device's current location. For example, on-duty activity broadcasting and reservations via a centralized computer system and client computing devices can allow for nearby, currently available adventure opportunities to be transmitted to, received by, and displayed on user computing devices. User computing device can be placed in an on-duty mode of operation in which they poll the centralized computer system and/or guide computing devices transmitting beacon signals for on-duty adventure services. Polling the centralized computer system can involve transmitting the client computing device's current location (e.g., GPS location, nearby access point identifier) to the centralized computer system, which can determine whether any nearby on-duty services are available and can transmit information on nearby on-duty services to the client computing device. To conserve resources (e.g., battery, processor cycles), the client computing device can be intermittently poll the centralized computer system (e.g., every 15 minutes, whenever the device has moved more than a threshold distance from its previous location). Similarly, the centralized computer system can be programmed to track on-duty requests from client computing devices and, if authorized by the devices' users, to provide push notifications of nearby on-duty service as they become available.

In another example, nearby on-duty services can be identified to user computing devices without the user computing devices having to determine its own location and without needing to poll the centralized computer system for nearby on-duty services. Instead, guide computing devices can be programmed to enter into an on-duty broadcast mode in which they actively transmit local wireless beacon signals (e.g., BLE beacon signals, Wi-Fi beacon signals) with specialized headers and payloads that identify the beacon signals as on-duty activity advertisements. Additionally, the beacon signals can include payloads that include unique adventure identifiers (e.g., uniform resource locators (URLs), unique identifier on the centralized computer system, universally unique identifiers (UUIDs)) that the user computing devices can receive via a beacon signal, can use to obtain additional information on the advertised adventure from the centralized computer system, and can use to book the advertised adventure. By using local beacon signals, a user computing device can passively monitor for beacon signals and, when appropriate, request additional information from the centralized computer system when a beacon signal is detected, instead of having to expend the additional resources to determine its own location and then periodically poll the centralized computer system for nearby on-duty adventures.

In yet another example, some guide-related information, such as contact information for guides, can be withheld from users until they have booked an adventure and/or crossed a cancellation policy threshold. Such features can permit for the centralized computer system to act as a central hub for adventure bookings, reviews, and processing, which can build a critical mass of both guides and users.

The details of one or more embodiments are set forth in the accompanying drawings and the description below. Other features and advantages will be apparent from the description and drawings, and from the claims.

DESCRIPTION OF DRAWINGS

FIGS. 12A-M are a set of example screenshots for on-boarding a guide to an adventure management platform through an interface on a mobile device.

Like reference symbols in the various drawings indicate like elements.

DETAILED DESCRIPTION

Figure 1A:
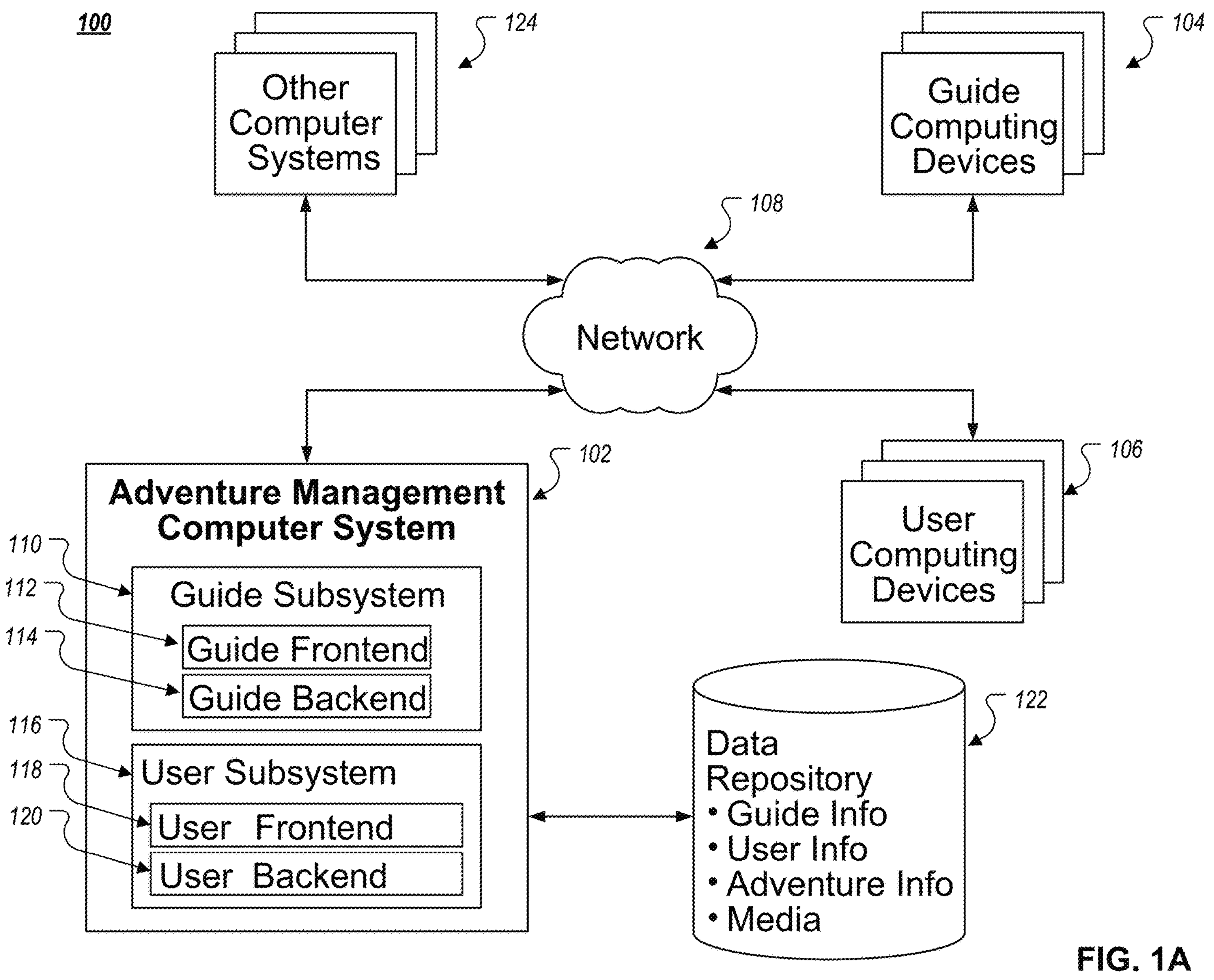
FIGS. 1A-B are diagrams of example activity-sourcing computer systems.
Figure 1B:
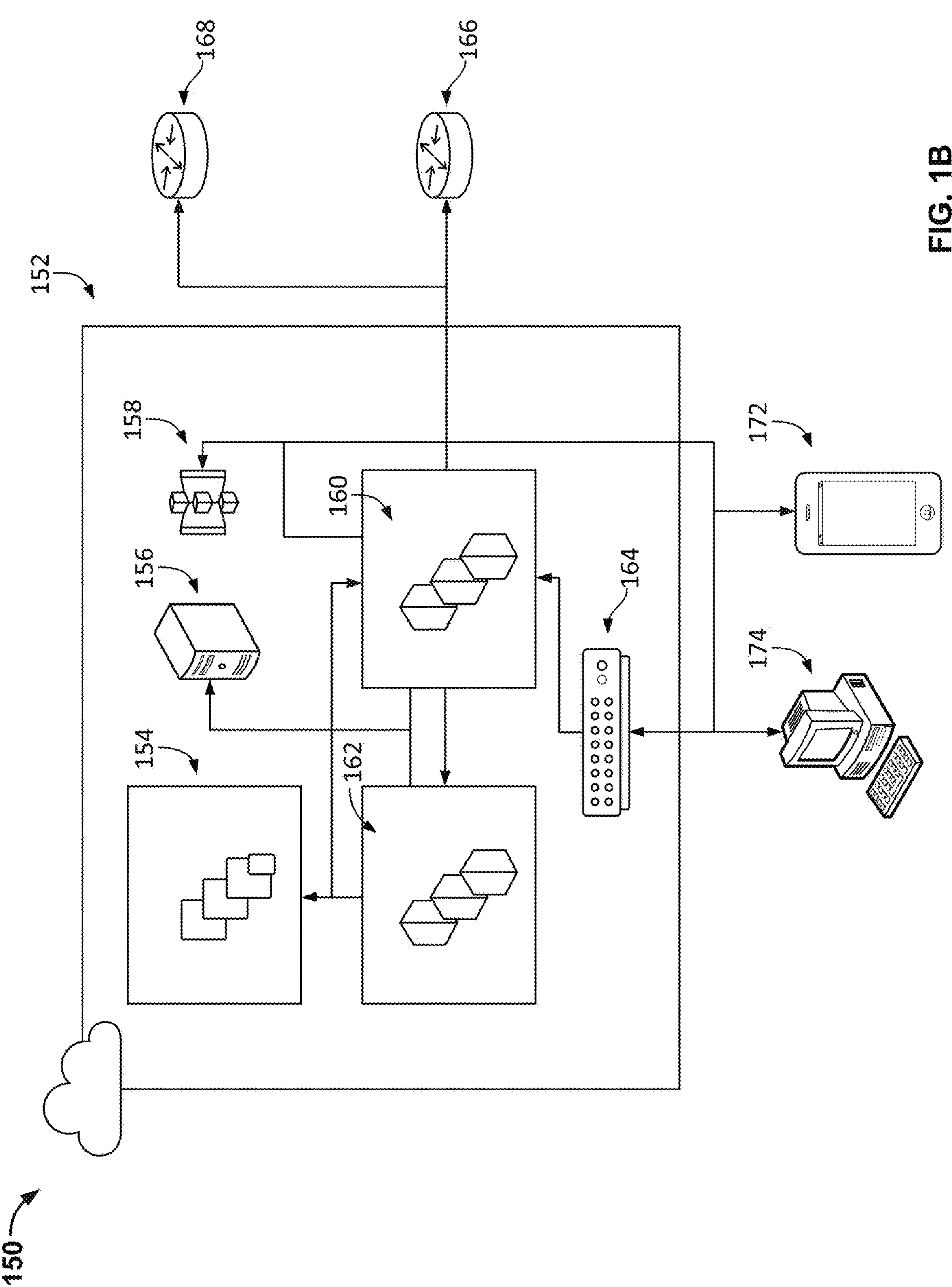

FIGS. 1A-B are diagrams of example activity-sourcing computer systems 100 and 150 that provide platforms for connecting users with sources of outdoor adventure opportunities or other activities. In particular embodiments, the improved platforms can be implemented in a manner that provides guide-pairing computer system configured to pair users seeking a guided adventure, an outdoor activity, a lesson/tour, or other activity (e.g., either a specific, predetermined activity or a spontaneous, previously unplanned or unknown activity) with a variety of filtered sources for such users.

Referring to FIG. 1A, the example system 100 includes an adventure management computer system 102 that can act as a centralized computer system to facilitate connections between activity sources/providers (such as guides in this example) using activity-sourcing computing devices 104 (referred to as guide computing devices 104 in this example) and users employing user computing devices 106.

The computer system 102 can include one or more computing devices, such as a computer server, a desktop computer, a laptop computer, and/or other specially programmed computing devices. For example, the computer system 102 can be a server system and/or a cloud-based computer system. The computer system 102 is programmed to provide a centralized system through which activity sources/providers (such as guides in this example) can register, post proposed outdoor adventures outdoor experiences/trips), receive payments, distribute summaries and media for outdoor adventures to users, and manage user reviews/ratings; and through which users can register, identify and register for particular adventures that are of interest, submit payments for outdoor adventures, provide reviews/ratings, and/or share and receive media and other information related to adventures. Other features are also possible with the computer system 102.

The guide computing devices 104 and the user computing devices 106 can be any of a variety of computing devices that are used by guides and users, respectively. For example, the computing devices 104-106 can be mobile computing devices, peripheral computing devices (e.g., wearable computing devices, virtual reality headsets), laptop computers, desktop computers, and/or other types of computing devices. Guides and users can each be associated with one or more of the computing devices 104-106. The computing devices 104-106 can communicate with the computer system 102 using code that is installed, executed, and/or interpreted on the computing devices 104-106, such as mobile apps, web applications downloaded and run in a web browser application, and/or other applications. The guide computing devices 104 can run the same or different applications/code from the applications/code that is run on the user computing devices 106. For example, the guide computing devices 104 may download a guide-specific mobile app from the computer system 102 (and/or from a separate computer system, such as a computer system providing a mobile app store) and the user computing devices 106 may download a different user mobile app. In another example, the guide computing devices 104 and user computing devices 106 may download the same mobile app, but access different features that are part of the mobile app once logged-in to the mobile app as either a guide or a user.

The computer system 102 and the computing devices 104-106 can communicate over one or more networks 108, such as the internet, local area networks (LAN), wide area networks (WAN), virtual private networks (VPN), wireless networks (e.g., Wi-Fi networks, BLUETOOTH networks), wired networks, fiber optic networks, mobile data networks (e.g., 4G networks), or any combination thereof. The computer system 102 and/or the computing devices 104-106 may be bandwidth/data constrained by their respective internet service providers (ISP), so the computer system 102 and/or the computing devices 104-106 can be programmed to use any of a variety of particular techniques to minimize and make network transmissions more efficient as part of the system 100, such as through caching and/or data compression techniques.

The computer system 102 can include components that are specifically programmed to interface with the guide computing devices 104 and user computing devices 106 to manage and serve requests for each of these types of devices. For example, the computer system 102 includes a guide subsystem 110 with a guide frontend 112 and a guide backend 114 that are programmed to process requests from the guide computing devices 104. For example, the guide computing devices 104 can transmit requests to register, post proposed outdoor adventures, receive payments, distribute summaries and media for adventures to users, and manage user reviews/ratings over the network 108 to the computer system 102. These requests can be directed to the frontend 112 of the guide subsystem 110 (e.g., addressed to a URL associated with the guide subsystem 110, transmitted to a port of the computer system 102 associated with the guide subsystem 110, include a parameter or other identifier associated with the guide subsystem 110), which can invoke one or more portions of the guide backend 114 to determine and process the requests. Responses determined by the guide backend 114 can be served back to the guide computing devices 104 by the frontend 112 over the network 108. Additionally, in particular instances, the guide backend 114 can transmit information and/or commands to the user subsystem 116, such as providing guide's response to a user's message.

Similarly, the example computer system 102 includes a user subsystem 116 with a frontend 118 and a backend 120 that are programmed to process requests from the user computing devices 106. For example, user computing devices 106 can transmit requests to locate particular outdoor guided opportunities, such as searching based on the type of opportunity (e.g., hiking, fishing, hunting), geographic location or region (e.g., city, state, zip code, user-designated geographic region, proximity to the user's current location), availability at one or more dates and times (e.g., specific day and time, range of dates), user-generated reviews or ratings (e.g., reviews and/or ratings from users who previously used a particular guide and/or particular trip), gear requirements (e.g., list of gear that is needed to participate in a particular trip), referrals or recommendations from other users (e.g., recommendations from friends), price (e.g., cost to participate in a guided trip), and/or other fields/information to identify particular guided opportunities. Such requests can be directed to the frontend 118 of the user subsystem 116 (e.g., addressed to a URL associated with the user subsystem 116, transmitted to a port of the computer system 102 associated with the user subsystem 116, include a parameter or other identifier associated with the user subsystem 116), which can invoke one or more portions of the user backend 120 to determine and process the requests. Responses determined by the user backend 120 can be served back to the user computing devices 106 by the frontend 118 over the network 108. Additionally, in particular instances, the user backend 116 can transmit information and/or commands to the guide subsystem 110, such as providing information confirming a user's reservation for an adventure opportunity posted by a guide through the guide subsystem 110.

The computer system 102 accesses and uses a data repository 122 to store information for providing location-based outdoor guide and outdoor adventure services for users and guides. The data repository 122 can include any of a variety of information, such as guide information (e.g., guide name, guide contact information, guide username and password, guide computing device identifier(s), guide skills and experience, guide location(s), photos and videos of guides), user information (e.g., user name, user contact information, user username and password, user computing device identifier(s), user interests, user gear, user location (s)), adventure information (e.g., type of adventure, geo-tagged locations for the adventure, date and time, duration, required gear, recommended commercial gear to purchase for the adventure, skills/experience needed for adventure, skills/experience to be gained, example photos and summaries from similar adventures, reviews/ratings for the adventure), and/or media (e.g., adventure photos and videos shared with users). Other information is also possible.

The data repository 122 can include one or more data schemas that are used for organizing and storing data in a manner that can provide reliable and efficient information retrieval. For example, as described below in more detail with regard to FIG. 2, the data repository 122 can include various tables and data fields that can minimize querying and data record retrieval during run time of the adventure management computer system 102 in serving requests from the user computing devices 106 and/or the guide computing devices 104. Additionally, the adventure management computer system 102 can restrict access to particular user and/or guide information stored in the repository 122 to appropriate times during an adventure-booking process. For example, the user computing devices 106 may not receive guide contact information (e.g., email, phone number) until an adventure for a guide has been booked and/or proceeded past a cancelation period. Such features can preserve user privacy and can also ensure that the adventure management computer system 102 serves as a central hub of adventure related interactions among guides and users.

The adventure management computer system 102 can additionally facilitate on-duty adventure bookings between the user computing devices 106 and the guide computing devices 104. For example, guide computing devices 104 can activate on-duty adventures at various points in time via the guide subsystem 110 and the data repository 122, which can cause information on the on-duty adventures to be transmitted to the user computing devices 106 via the user subsystem 116.

The example system 100 additionally includes other computer systems 124, such as social media computer systems hosting social media platforms, merchant computer systems hosting merchant sites, and/or other systems. The other computing systems 124 can be used and accessed in any of a variety of ways. For example, the other computing systems 124 and include social media computer systems can be used to provide login credentials for the adventure management computer system 102 and to obtain baseline user information to facilitate both user and guide on-boarding. In another example, the other computing systems 124 can include merchant computer systems that can be linked to by URLs included in content provided to the user computing devices 106. The URLs can link to web pages (or other online-accessible interfaces) for products that are recommended by guides, such as products includes in a gear kit that a guide recommends for a particular outdoor adventure.

While this document describes examples of activity sources/providers as guides, other activity source/providers are also possible with the disclosed technology, such as people and/or entities providing any of a variety of services, such experts providing demonstrations, instructors providing lessons, equipment owners/managers providing equipment/gear for use/rental, property/facility owners/managers providing use of a property (e.g., building, land, sports field), and/or other appropriate services. Similarly, guide services and outdoor activities are provided as examples of available activities, and other activities are also possible with the disclosed technology, such as equipment use/rental, property use/rental, instructions, lessons, demonstrations, professional services, and/or other activities. Additionally, guide computing devices are examples of activity-source computing devices and other types of activity-source computing devices are also possible with the disclosed technology, such as computing devices used by experts, instructors, equipment owners/managers, property owners/managers, and/or other people and/or entities. The disclosed technology (as described throughout this document) can be extended and/or adapted to other activity sources/providers, other available activities, and/or other activity-source computing devices not explicitly described in the examples in this document.

Referring to FIG. 1B, the system 150 includes a cloud-based server system 152 that interfaces with an example mobile computing device 172 and an example desktop computing device 174. The cloud-based server system 152 is an example implementation of the adventure management computer system 102 described above with regard to FIG. 1A. The example computing devices 172 and 174 are examples of the guide computing device 104 and/or the user computing devices 106.

The cloud-based server system 152 includes a load balancer 164, an extensible and scalable web server group 160

(e.g., AMAZON Elastic Compute Cloud (Amazon EC2)), an extensible and scalable app server group 162 (e.g., AMAZON EC2), an extensible and scalable cache group 154 (e.g., AMAZON ElastiCache), a cloud storage service 158 (e.g., AMAZON Simple Storage Service (S3)), a backend server 156, and underlying data storage systems 166-168. The cloud-based server system 152 can provide the adventure management features described above with regard to FIG. 1A (and throughout the rest of this document) in an extensible and scalable manner so that the system 152 is able to handle spikes and variation in traffic and performance. Other implementations of the adventure management computer system 102 are also possible.

Figure 2:
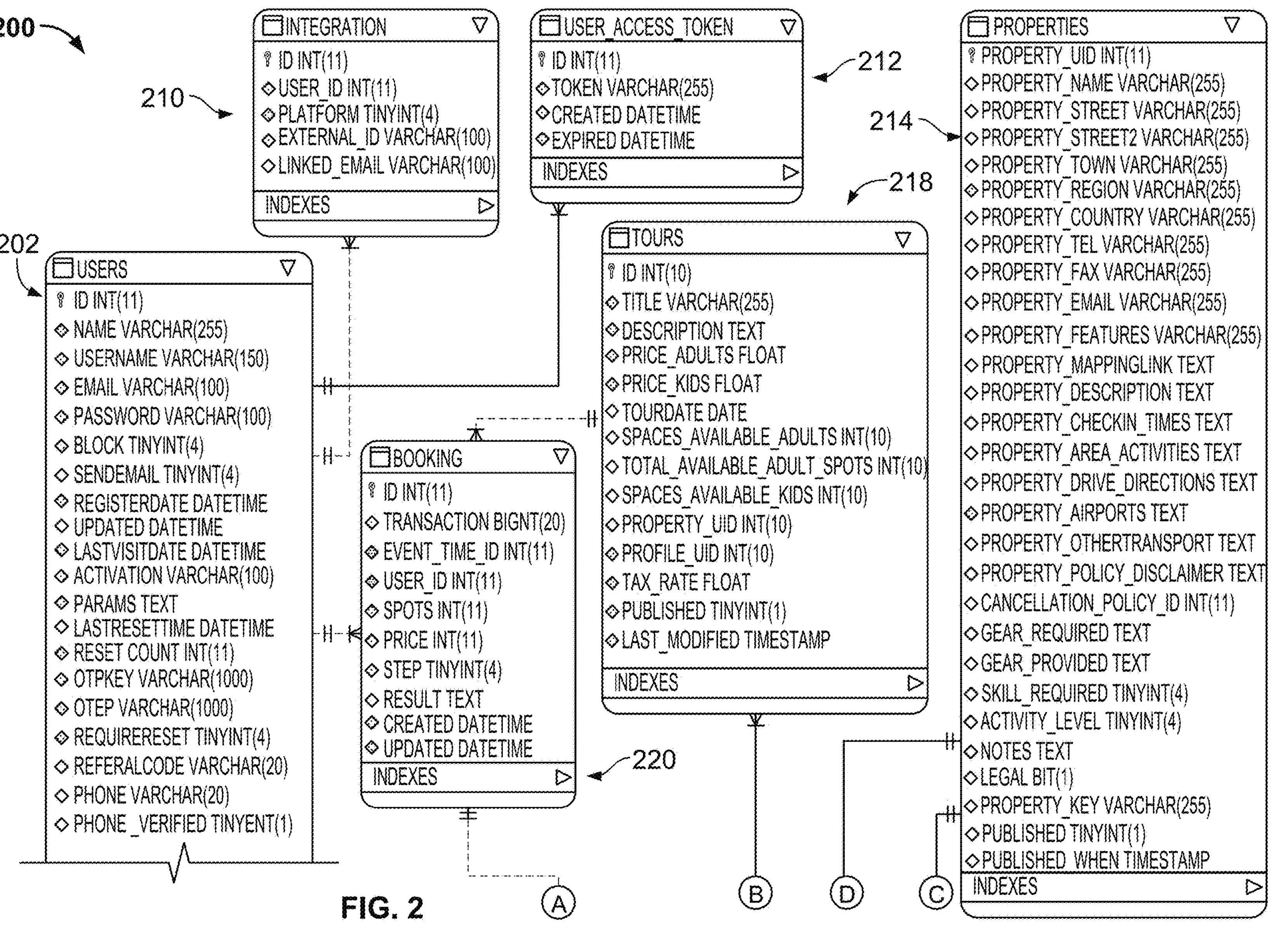
FIG. 2 depicts an example database schema that can be used by an adventure management computer system.
Figure 2:
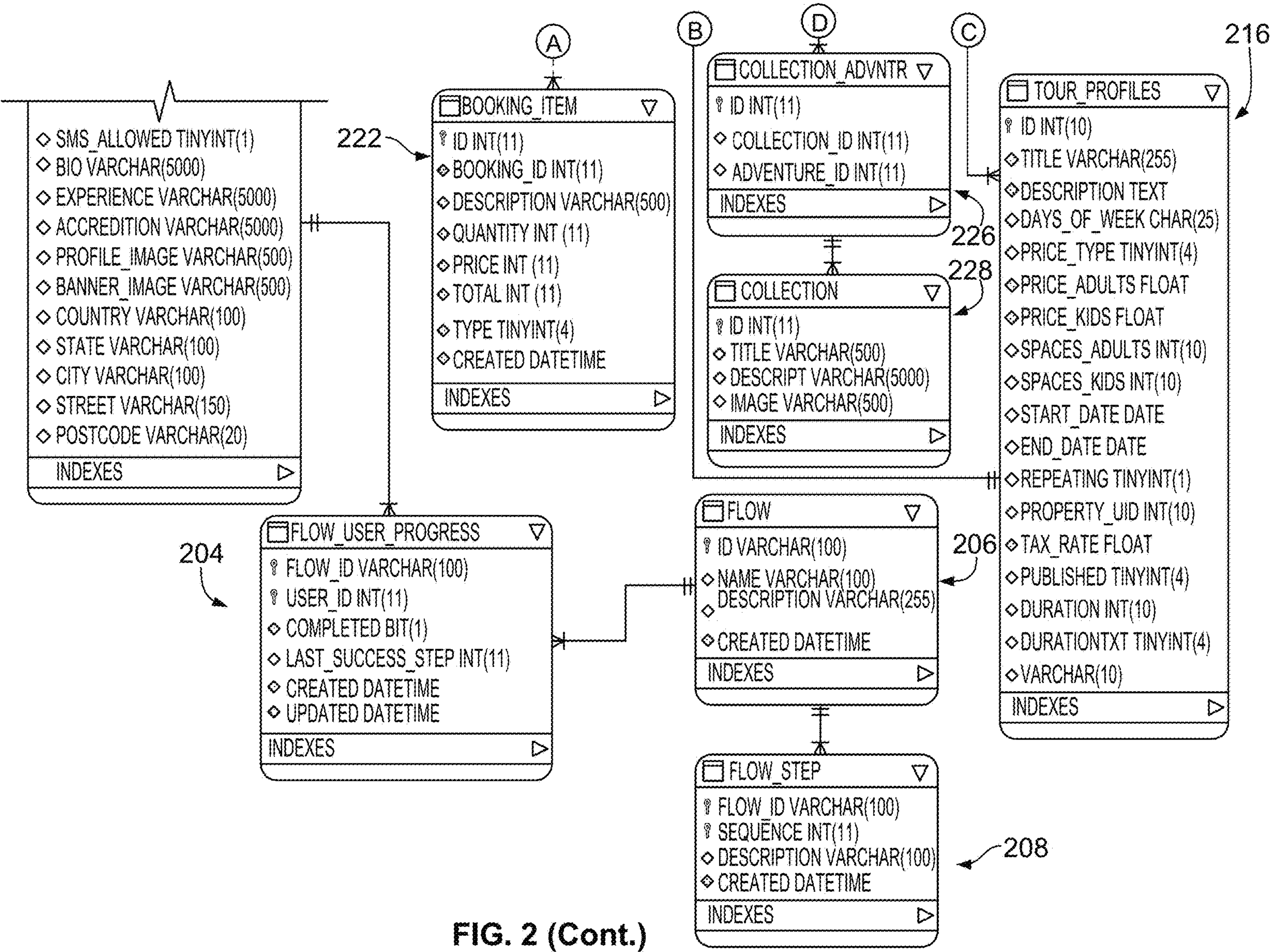

FIG. 2 depicts an example database schema 200 that can be used by an adventure management computer system to provide reliable and efficient data storage and retrieval. The example database schema 200 can be used, for example, to store information in the data repository 122, the cloud storage service 158, and/or the underlying data storage system 166-168. Storing data in any of the data storage systems using the schema 200 can permit for low latency data retrieval based on minimizing the number of queries, read operations, and comparison operations that are performed to obtain and serve the relevant data.

For example, the adventure management computer system 102 can frequently make calls to the data repository 122 for adventure opportunities that have availability for user participation when serving information on available opportunities to user computing devices. Such dynamically changing and frequently used data can be optimized, for example, using the data schema 200 by including a data record for the current number of remaining slots in an adventure opportunity, instead of having to dynamically recreate that value from records of adventure bookings (conventional approach). The adventure management computer system 102 can be programmed to automatically update and ensure the accuracy of data records identifying the number of remaining slots. Additional and/or alternative data elements that dynamically change can be optimized for efficiency in the schema 200 as well.

In the example schema 200, a users table 202 includes a variety of data fields pertaining to users of the adventure management computer system 102, such as name, username, password, contact information (e.g., phone, email), and other pertinent details. The table 202 can be used for both guides and adventure participants (also referred to as users), which can provide for simplicity and can allow for guides and participants to change roles seamlessly (e.g., some guides may participate in other adventures). To provide for efficient and streamlined on-boarding of users, the adventure management computer system 102 can allow for a user's record to be created in the table 202 with some of the fields missing, which may be filled out at later date.

A flow_user_progress table 204 can be used to store user progress across a number of different process flows, including profile creation/modification, adventure opportunity creation/modification, adventure booking, and/or other flows that may be used throughout the adventure management computer system 102. Each of the process flows can be stored in the flow table 206, which can be enumerated by one or more steps that are stored in the flow_step 208 table.

Integration with user accounts on other platforms, such as social media platforms (e.g., FACEBOOK, TWITTER, INSTAGRAM, SNAPCHAT), can be stored and maintained through the integration table 210. Such integrations and authorizations with other platforms can assist with the on-boarding process by allowing the adventure management computer system 102 to obtain user data from these other sites without having to ask the user to enter them.

User logins and other recurring access to the site can be managed through the user_access_token table 212.

Properties can be designated through the properties table 214, which includes fields through which properties, such as adventures, adventure locations, and combinations thereof, can be designated. The properties table 214 includes a property_uid field that uniquely identifies each property, which can be referenced across other tables, such as the tour_proviles table 216 and the tours table 218 described below, which define adventures being offered by guides and presented to users for reservation. For example, each tour and tour_profile can reference a property to which an adventure pertains, and each of the properties can be referenced across multiple different adventures.

Each guide can create one or more adventure opportunities that are represented by data records in the tour_profiles table 216, which can specify the following information for an adventure: title, description, day of week, price (kids, adults), spaces (kids, adults), an indication of whether it is repeating, start and end dates if it is repeating, duration, and other information.

The tour_profiles table 216 can store templates that are used to define specific adventure opportunity instances that are stored in the tours table 218, which can include much of the same information as in the tour_profiles table 216 as well as a specific date for each adventure, a running tally of the spaces available on the adventure, and other details. By duplicating some details from the tour_profiles table 216 into the tours table 218, the adventure management computer system 102 can reduce the number of queries and comparisons that are performed by simply needing to retrieve a record from the tours table 218 instead of additionally having to retrieve a record from the tour_profiles table 216. Such minimization of table queries can improve efficiency and reduce latency when serving requests. Additionally, the running tally of spaces available in the tours table 218 can reduce latency by avoiding calls to other tables to dynamically determine the availability.

Bookings for tours by users can be represented by the booking table 220, which can indicate the adventure (event_time_id) that the booking pertains to, the user who make the booking, the number of spots being booked, the price, the current step in the booking process, and other details. Each booking can have one or more items that are stored in the booking_item table 222, which can list the components of the booking.

Collections of adventures can be designated via the collection_advntr table 226 and the collection table 228. The collection table 228 can define adventure collections, including a collection title, description, image, and unique collection identifier. Individual adventures can be added to specific collections via the collection_advntr table 226, which can include entries cross-referencing collection identifiers and adventure identifiers.

Figure 3:
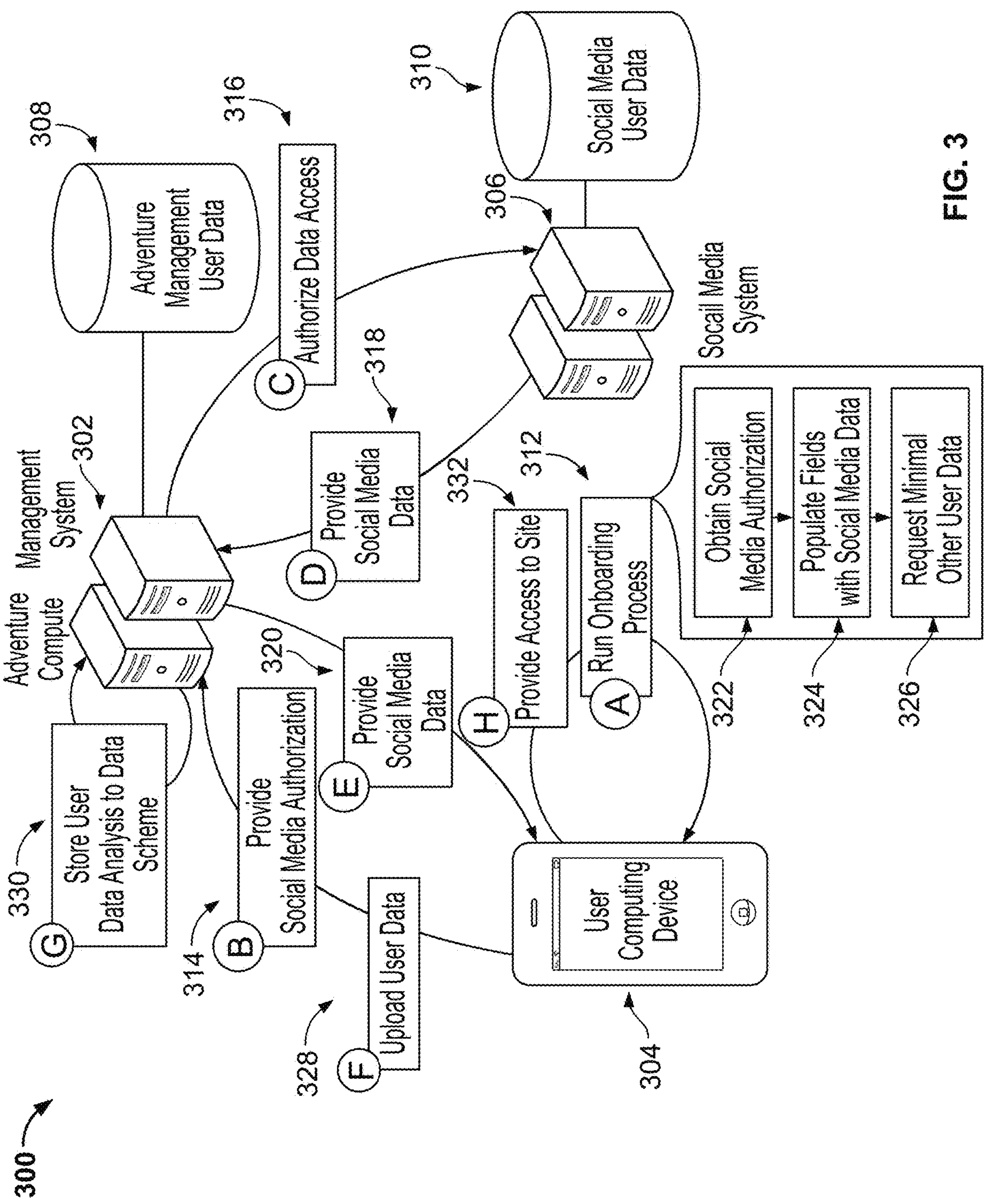
FIG. 3 is a conceptual diagram of an example system for efficiently on-boarding a user and/or guide to an adventure management computer system.

FIG. 3 is a conceptual diagram of an example system 300 for efficiently on-boarding a user and/or guide to an adventure management computer system 302. The adventure management computer system 302 can be similar to the adventure management computer system 102 described above with regard to FIG. 1A. In the depicted example, a user computing device 304 (similar to the computing devices 104-106) is progressing through an onboarding process for users and/or guides. The adventure management computer system 302 can maintain a user database 308 (e.g., using the database schema 200), which can be populated, at least in part, with information from a social media system 306 (example of other computer systems 124).

As indicated by step A (312), an onboarding process is started on the user computing device 304 (example flow from the flow table 206). As part of the onboarding process, the user computing device 304 can obtain social media authorization for the adventure management client device on the user computing device 304 and/or the adventure management computer system 302 to obtain access so social media data for the user, which can be stored locally on the user computing device 304 and/or remotely on the social media system 306, such as in the social media user data repository 310. As an example of this first portion of the onboarding process, the user computing device 304 can transmit social media authorization to the adventure management computer system 302 (step B, 314), which can authorize access to the user data with the social data with the social media system 306 (step C, 316). Once authorized, the social media system 306 can provide the social media data to the adventure management computer system 302 (step D, 318), which can relay the social media data back to the user computing device 304 (step E, 320). Alternatively and/or additionally, the user computing device 304 can locally retrieve social media data from the device 304 using the authorization.

Once the user computing device 304 has the social media data, the user computing device 304 can populate fields of for the onboarding process from the social media data (324). By doing this as an initial step, the user computing device 304 can attempt to fill as many fields as possible for the user with readily accessible social media data rather than asking the user to provide that information another time. For example, the user computing device 304 can populate name, email address, location, and/or other information that a user may have provided as part of his/her social media account. The user computing device 304 can use various mappings to correlate the social media data to appropriate fields for the adventure management computer system 302.

With the social media data populating fields, the user computing device can request minimal other user data (326). For example, with a user account, the user computing device 304 may not request any additional information from the user after the social media data has been populated into the fields. With a guide, the user computing device 304 may register the guide as a user initially and then request that the guide enter in an initial adventure via the system. Either way, the user computing device 304 can request a minimal amount of data from the user, which can streamline the on-boarding process.

The data entered by the user can be uploaded in an ongoing or bulk fashion, as indicated by step F (328). The adventure management computer system 302 can store the data according to the data schema for the database 308, as indicated by step G (330). Once the user has been on-boarded, the user can be provide with access to the site, as indicated by step H (332).

Figure 4A:
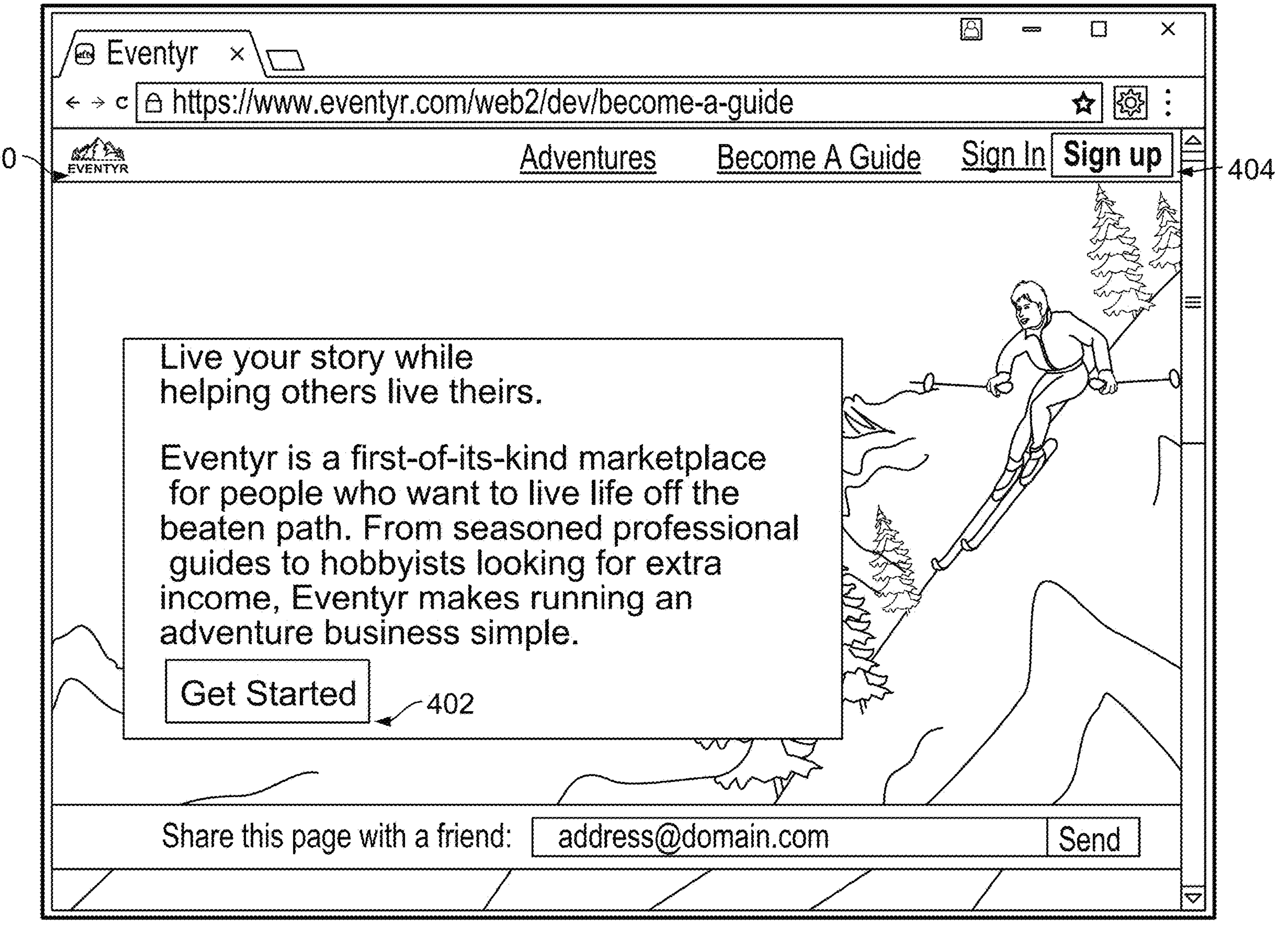
FIGS. 4A-S are a set of example screenshots for on-boarding a guide to an adventure management platform.
Figure 4B:
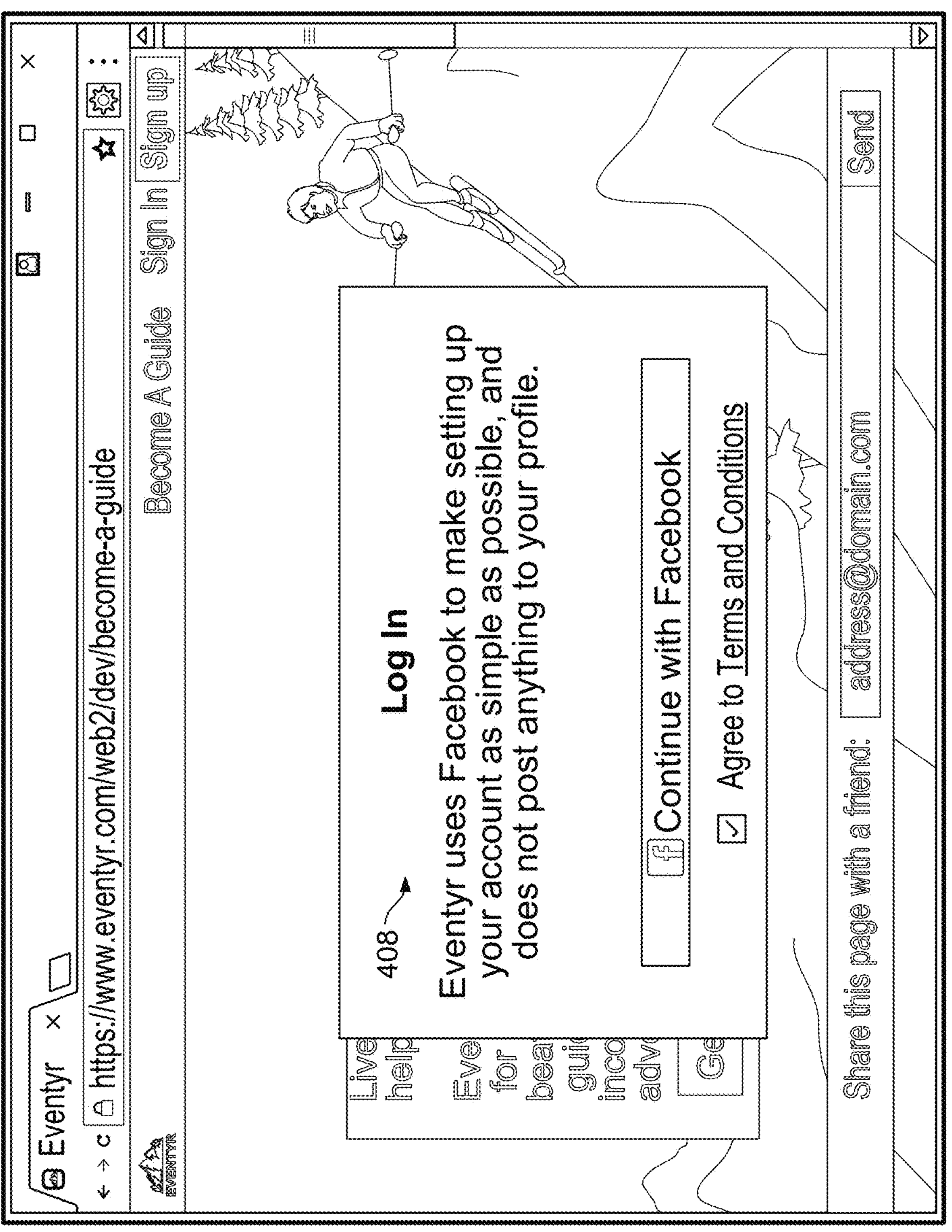
Figure 4C:
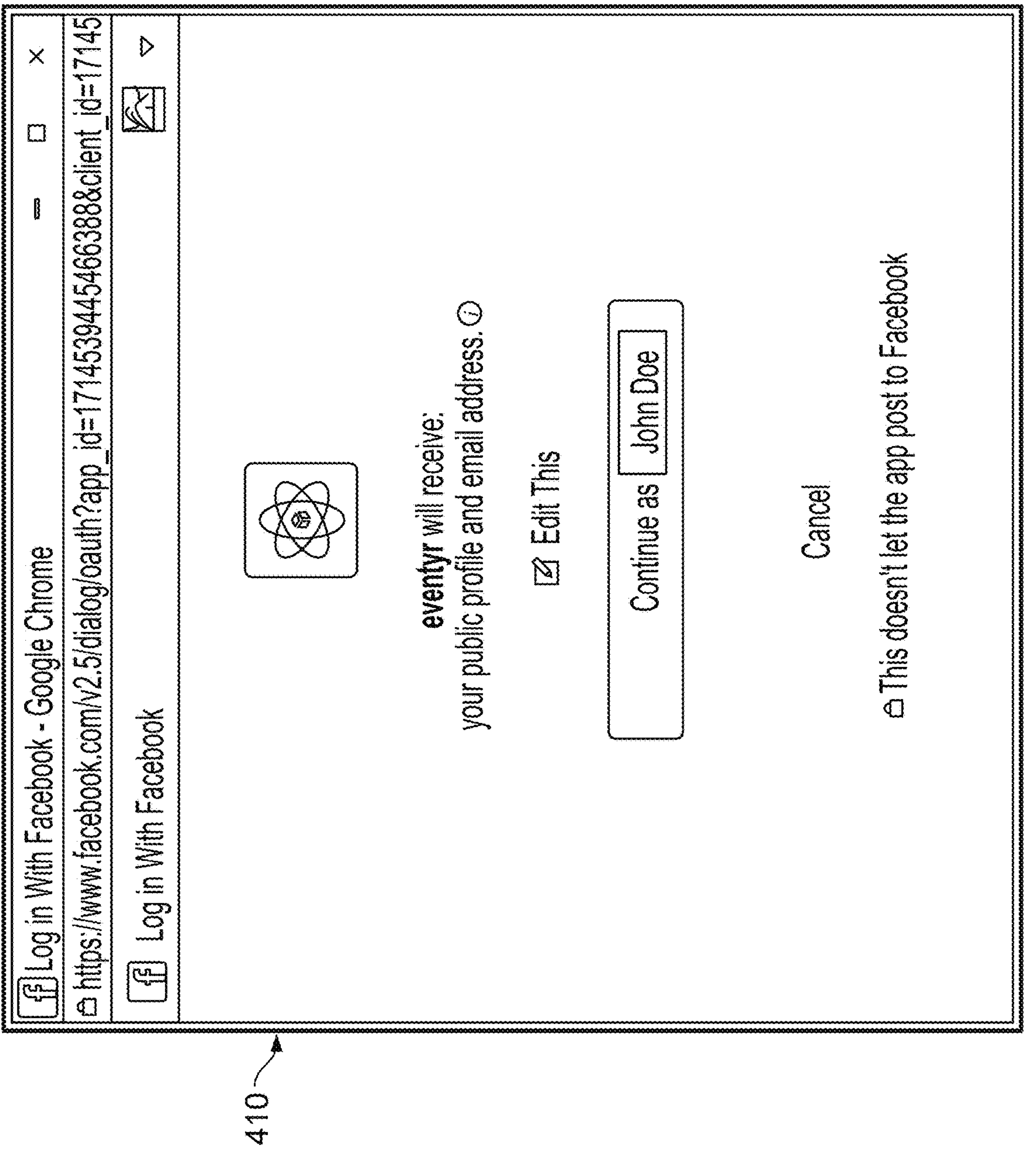
Figure 4D:
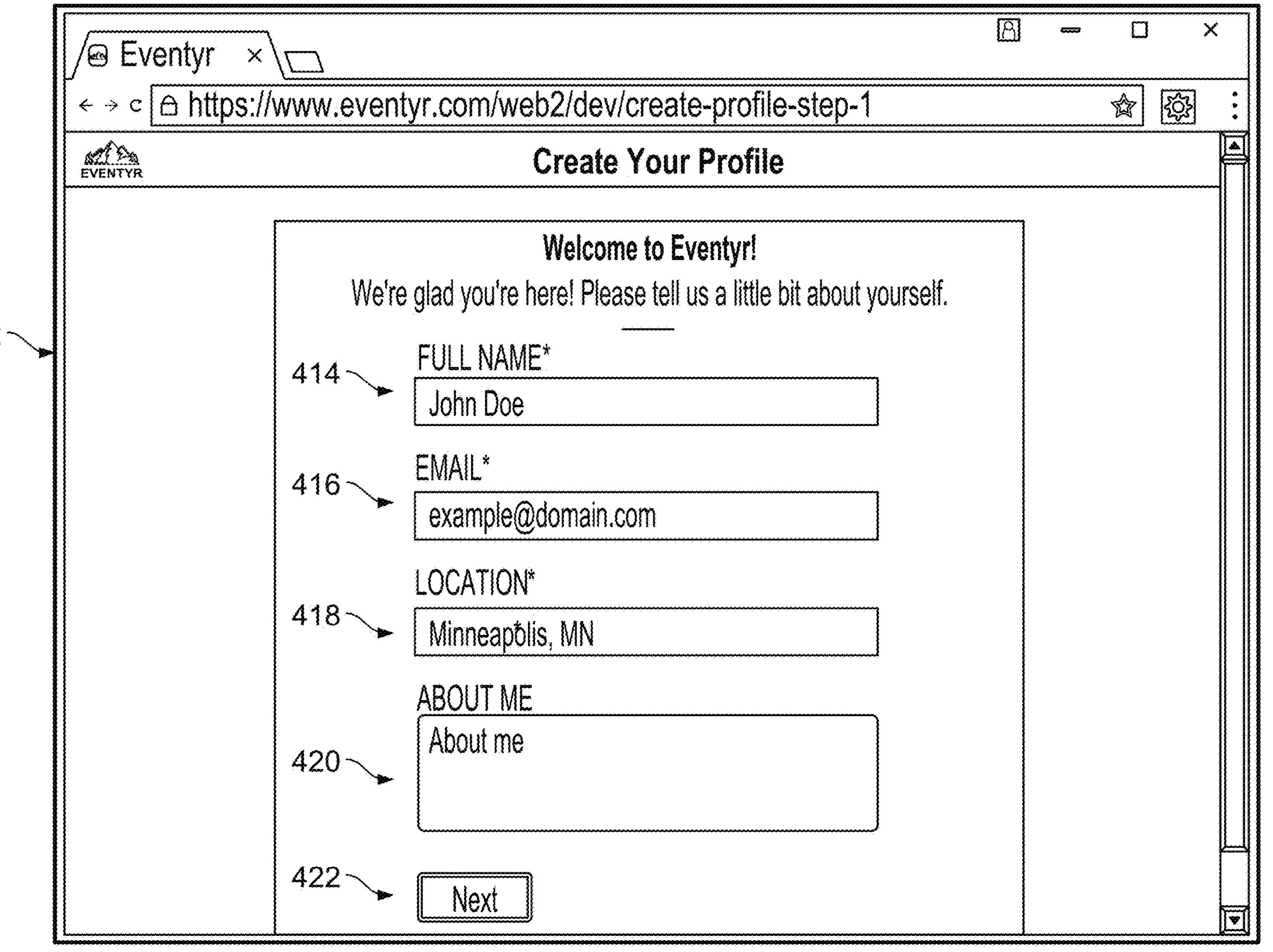
Figure 4E:
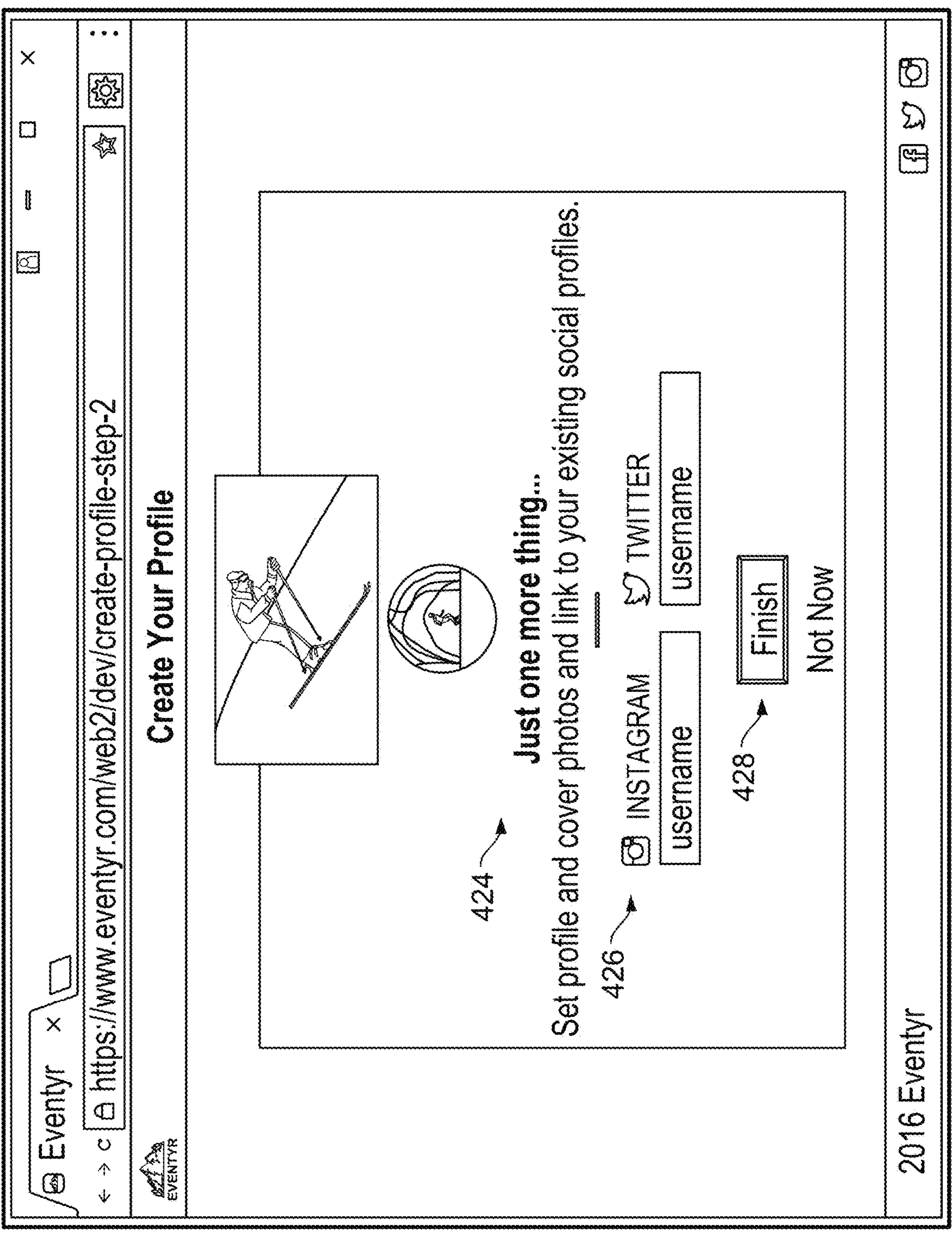
Figure 4F:
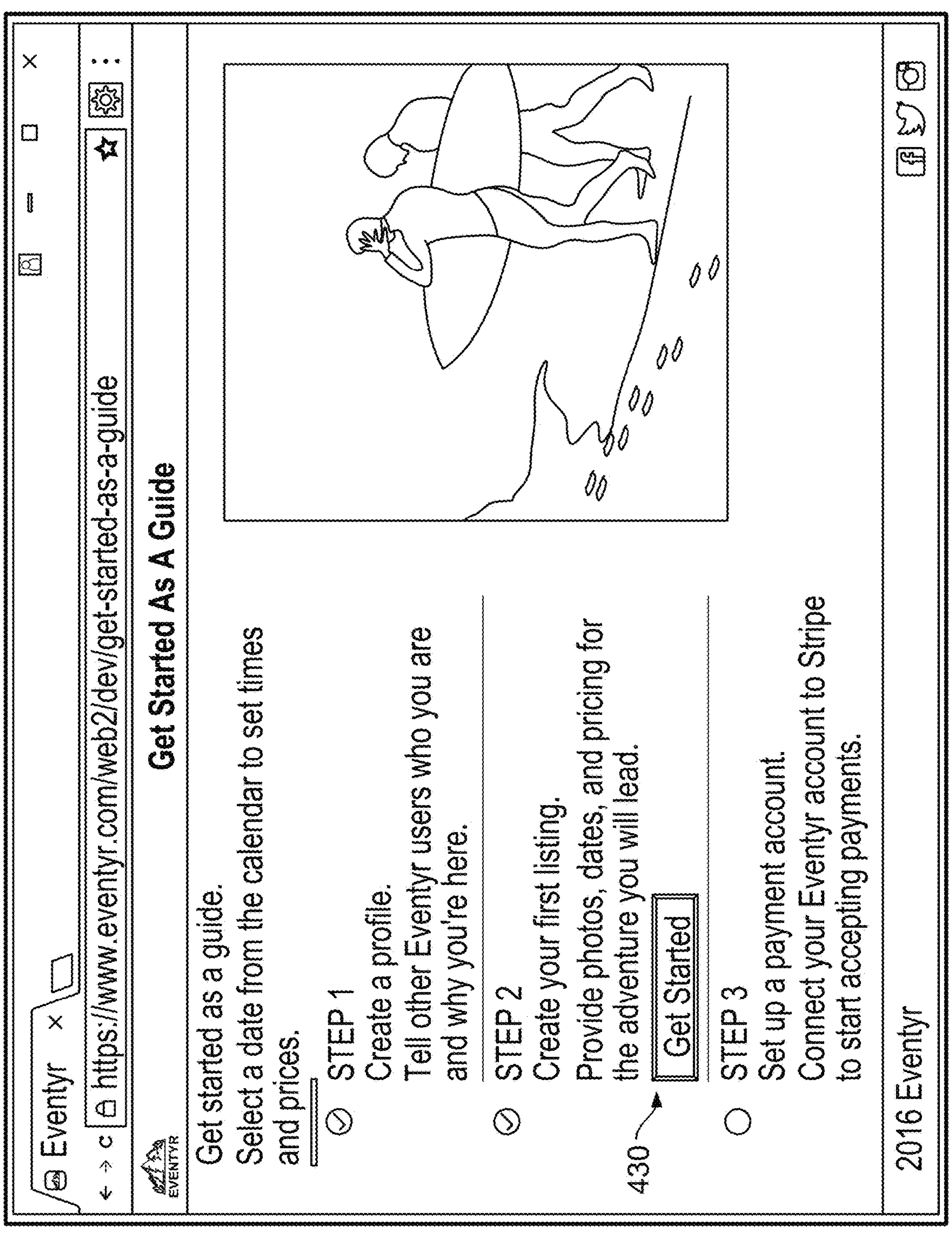
Figure 4G:
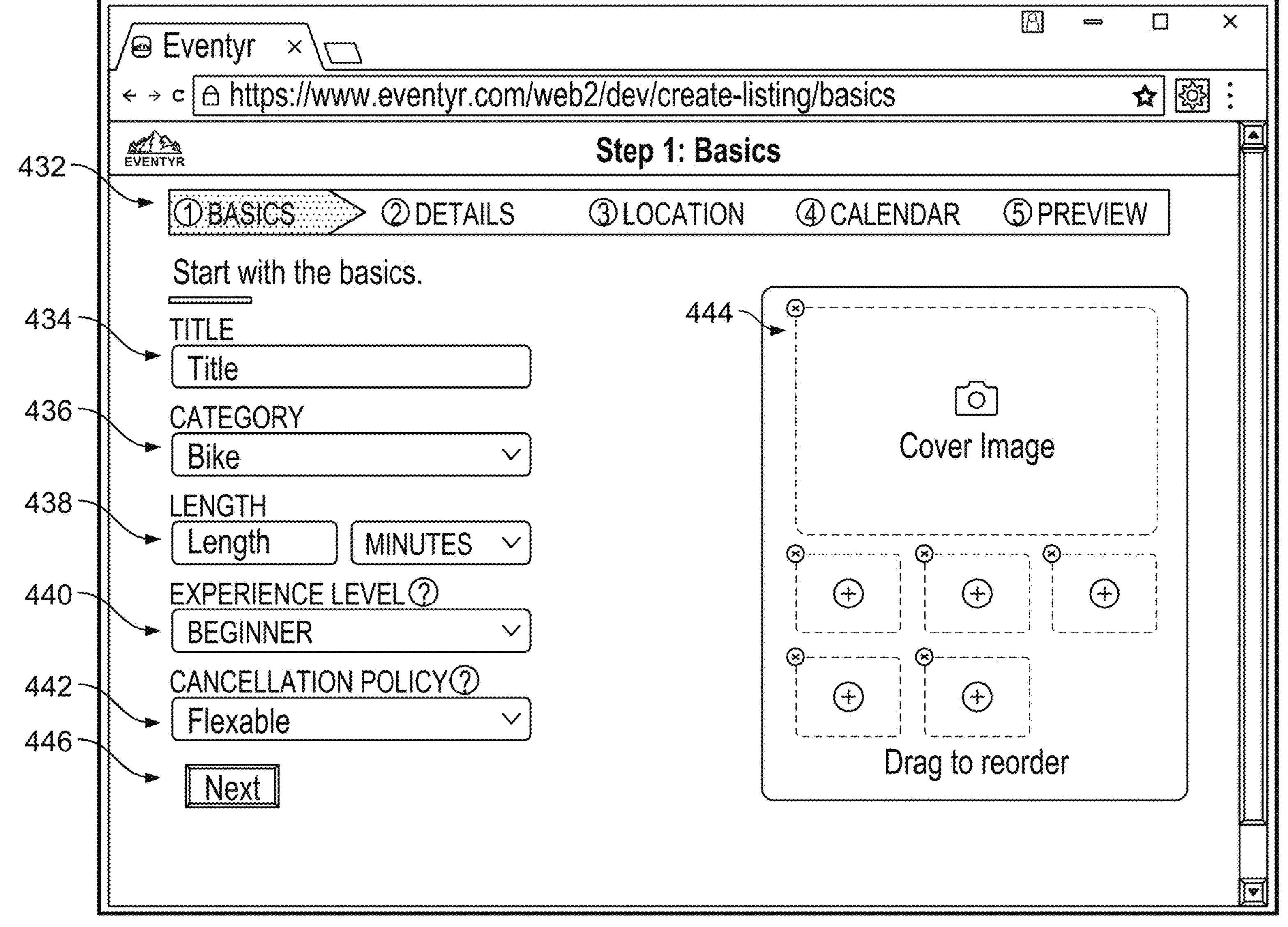
Figure 4H:
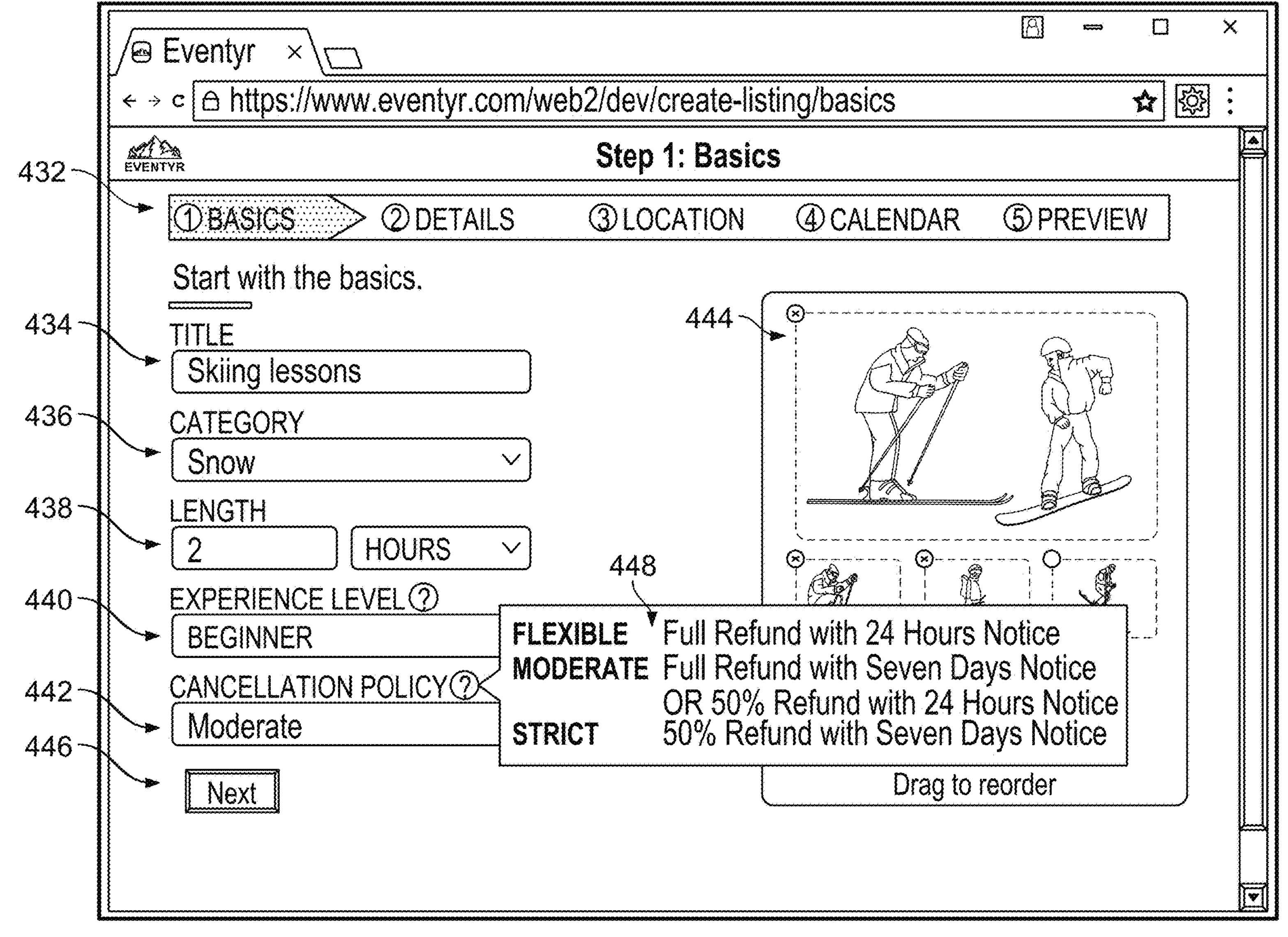
Figure 4I:
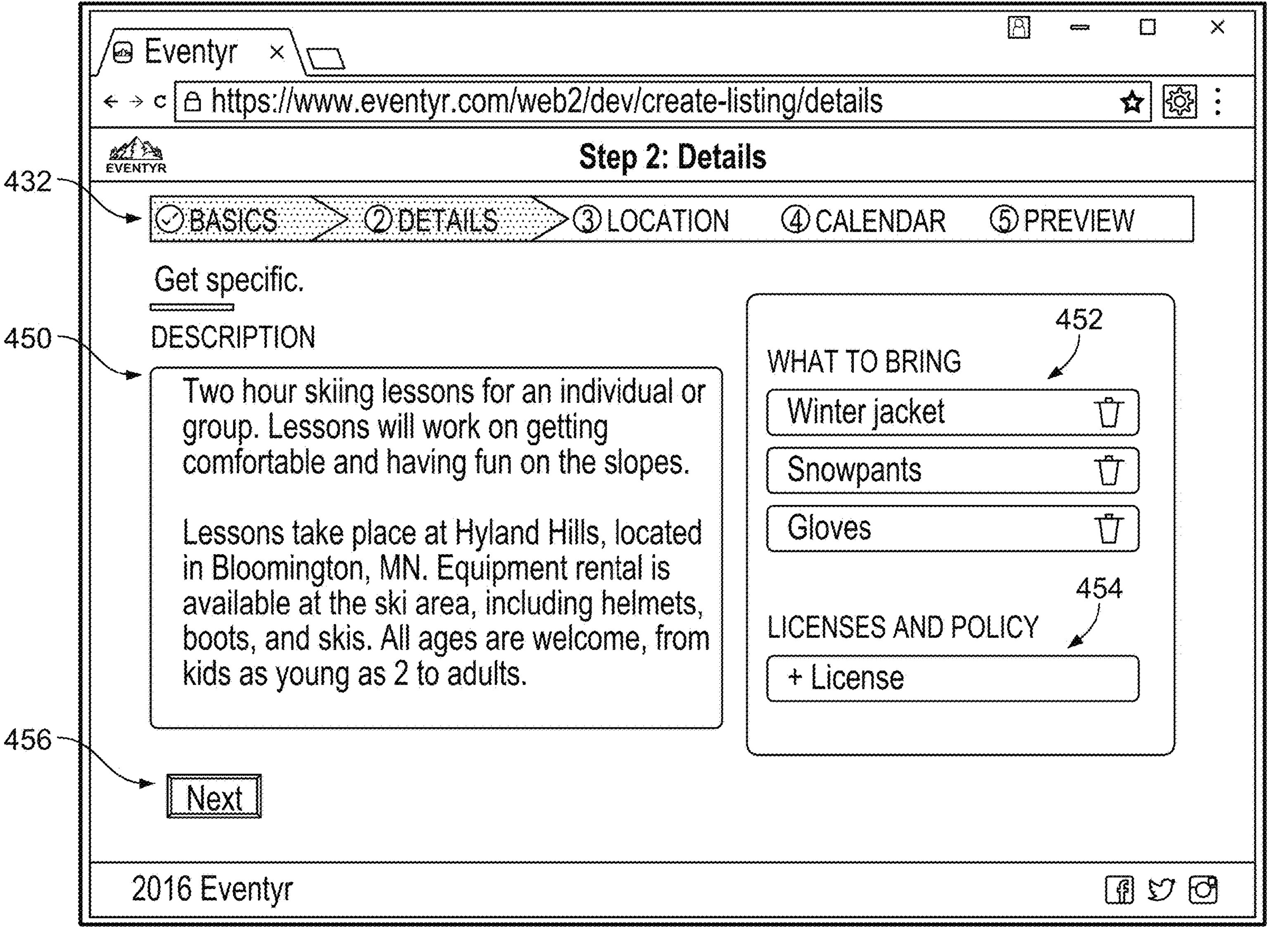
Figure 4J:
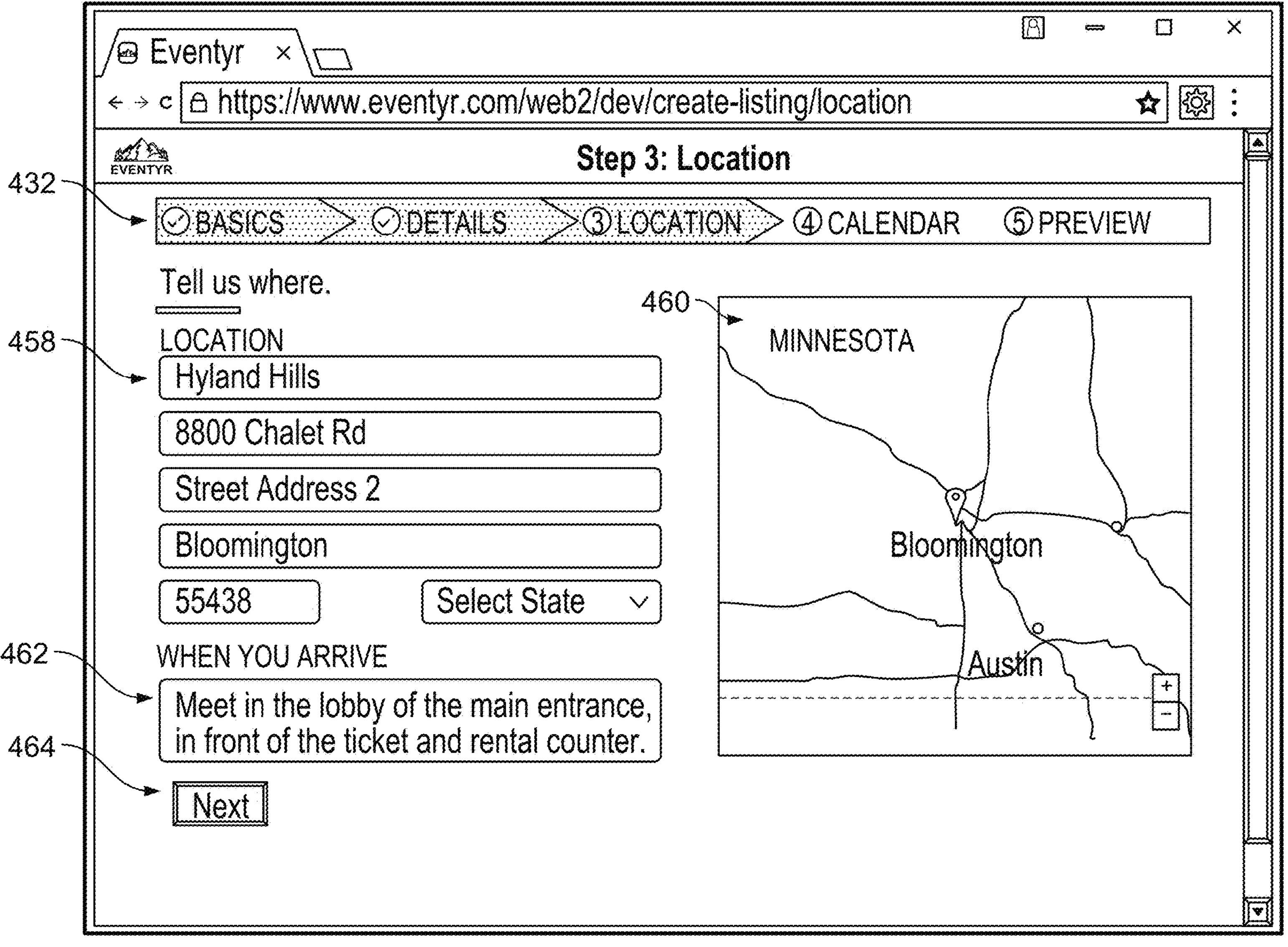
Figure 4K:
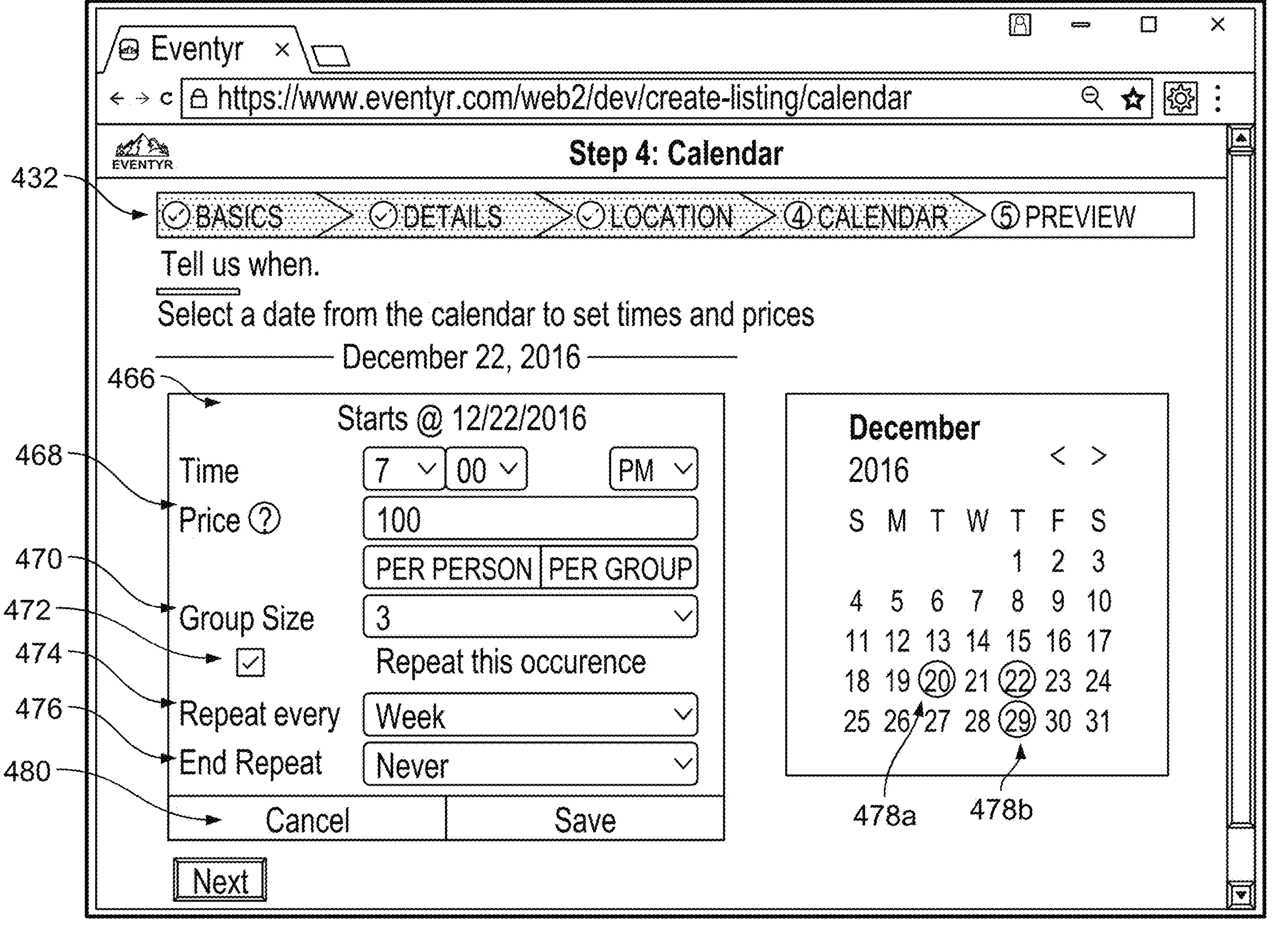
Figure 4L:
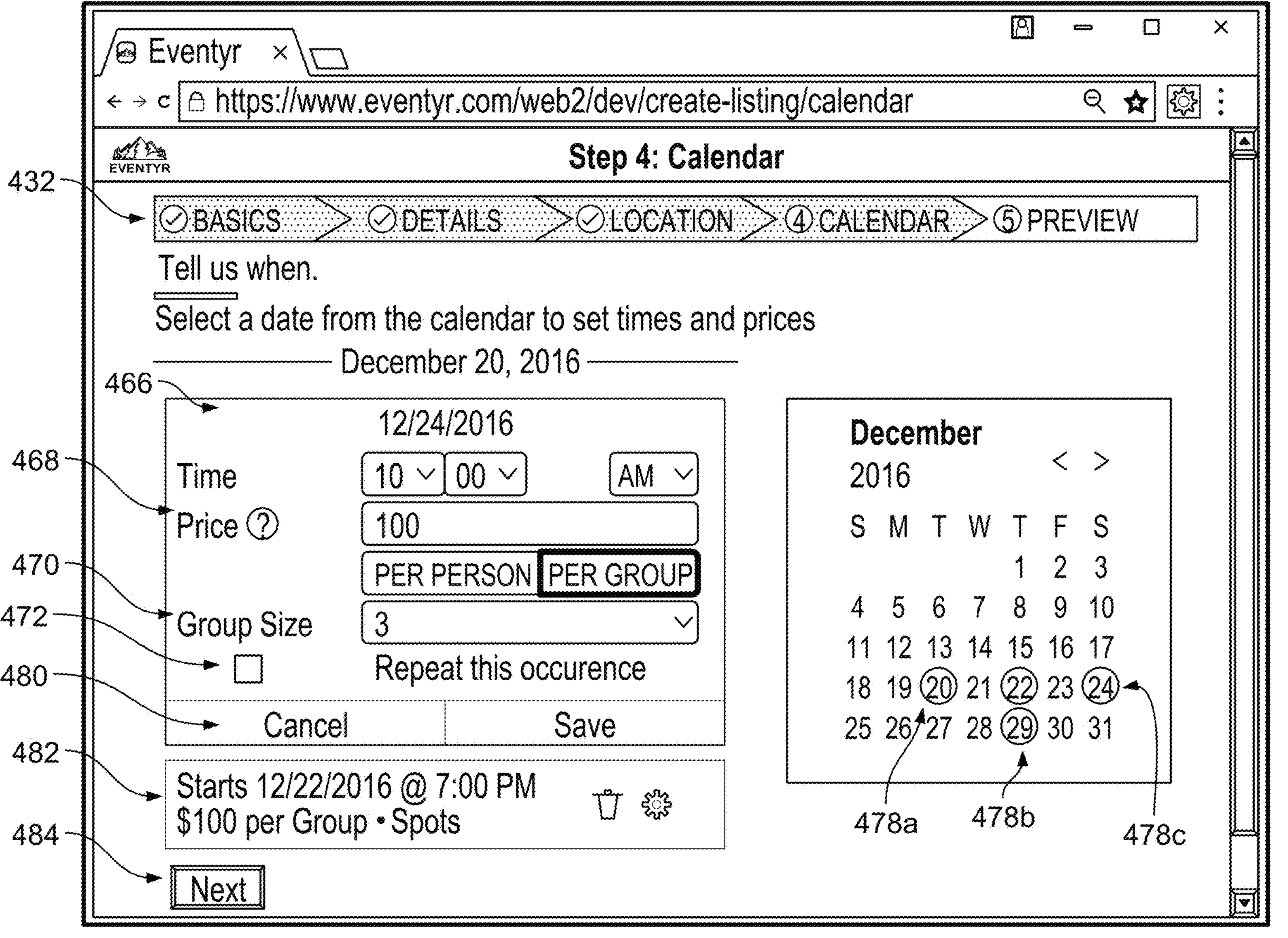
Figure 4M:
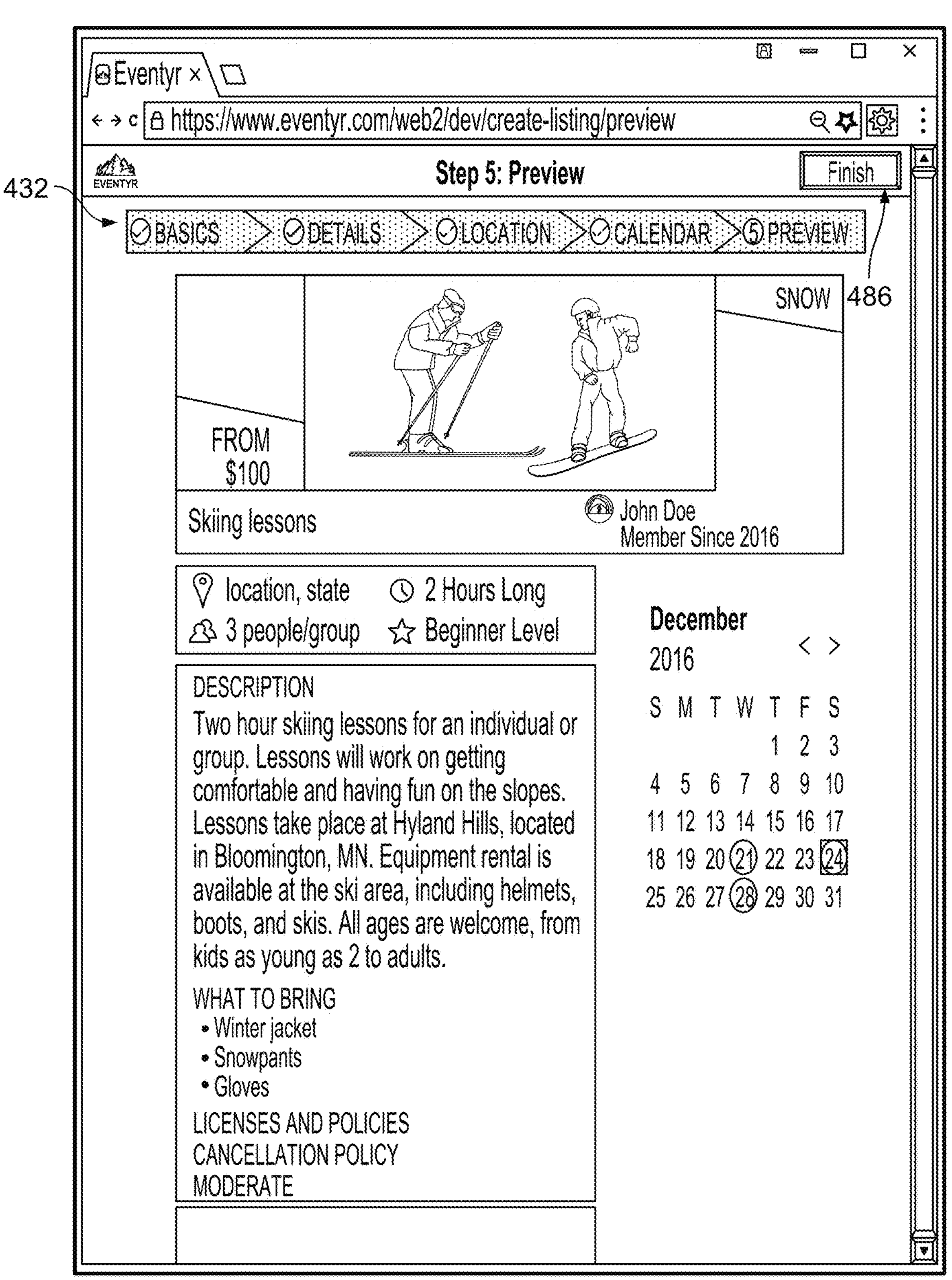
Figure 4N:
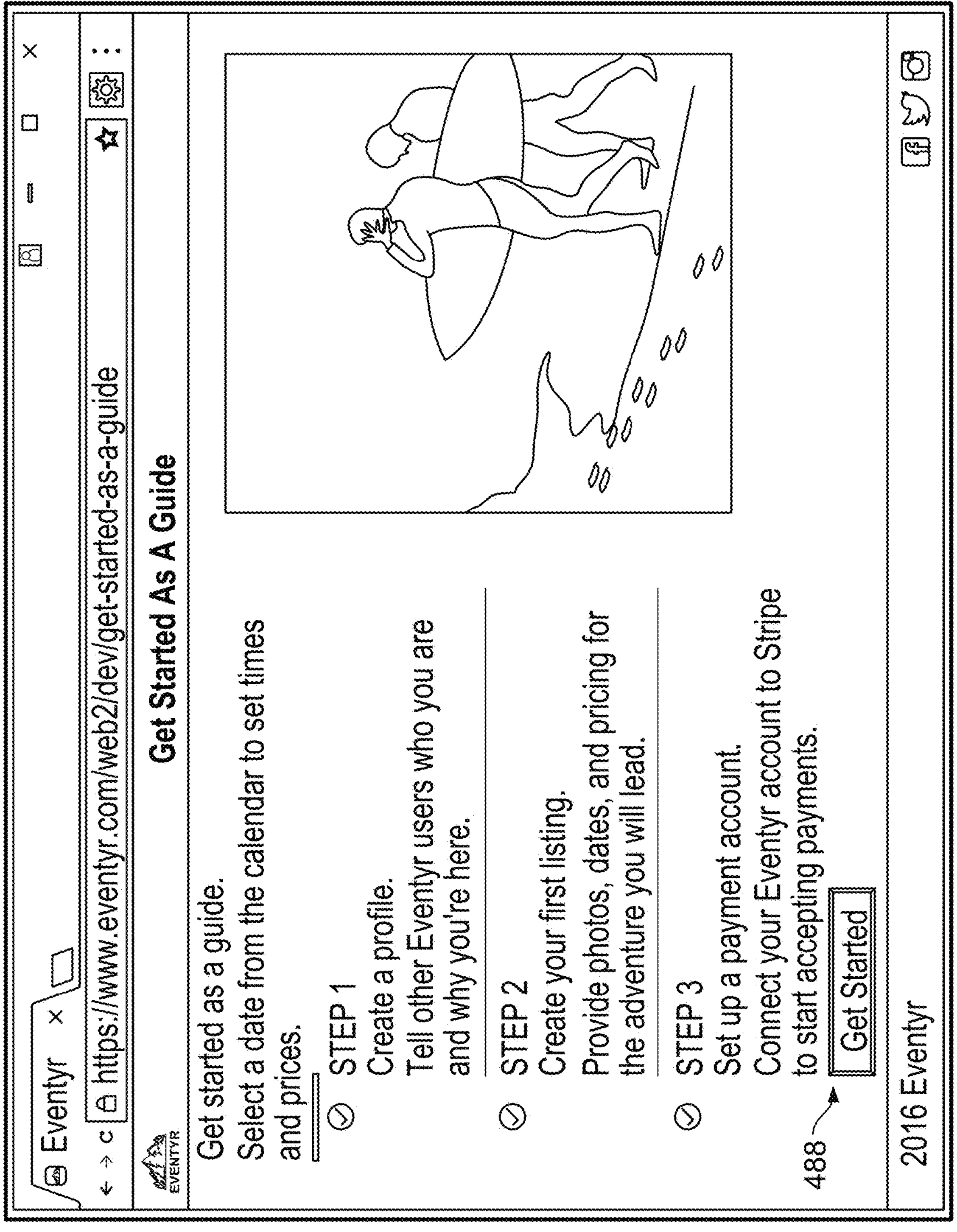
Figure 4O:
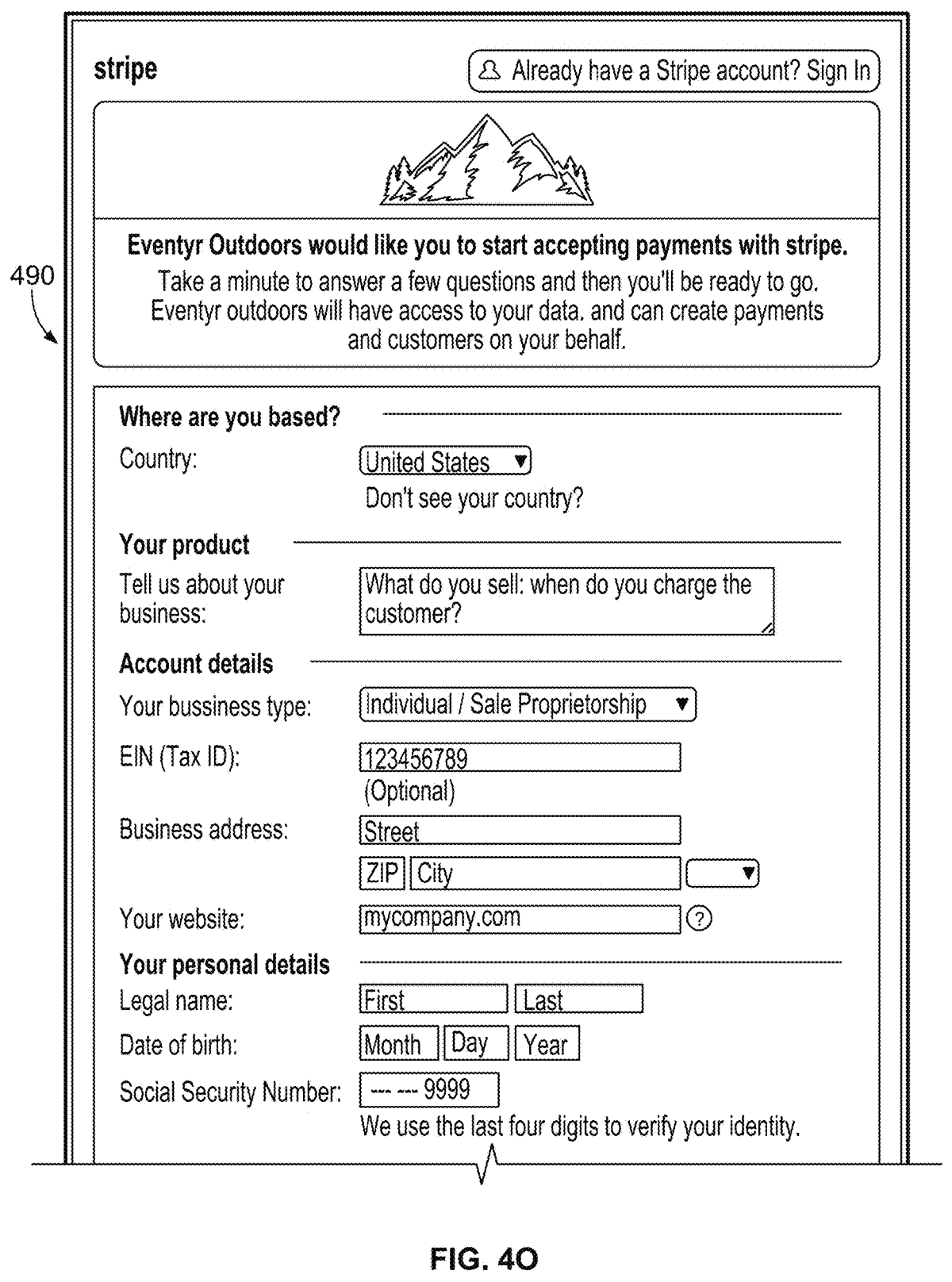
Figure 4O:
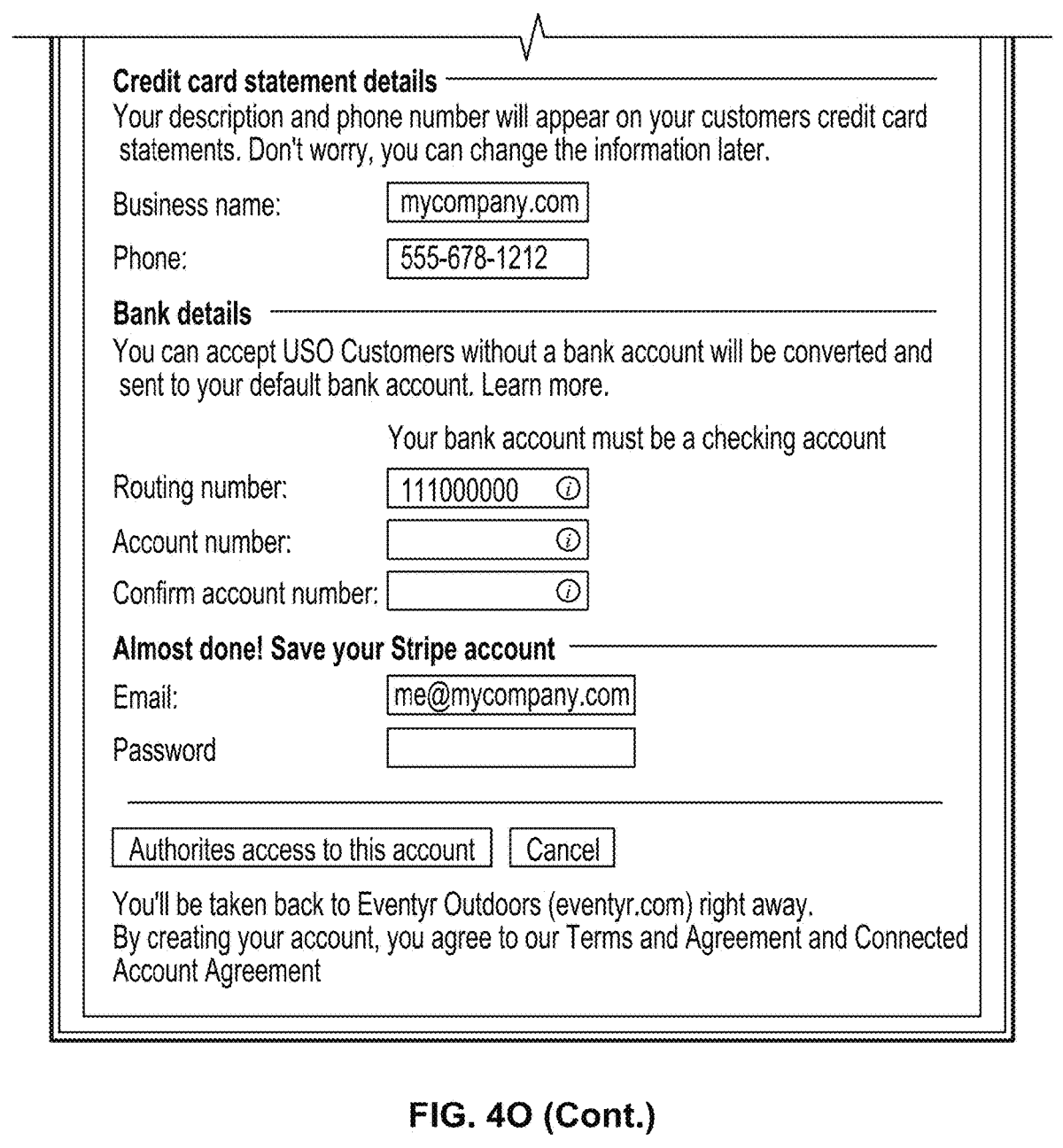
Figure 4P:
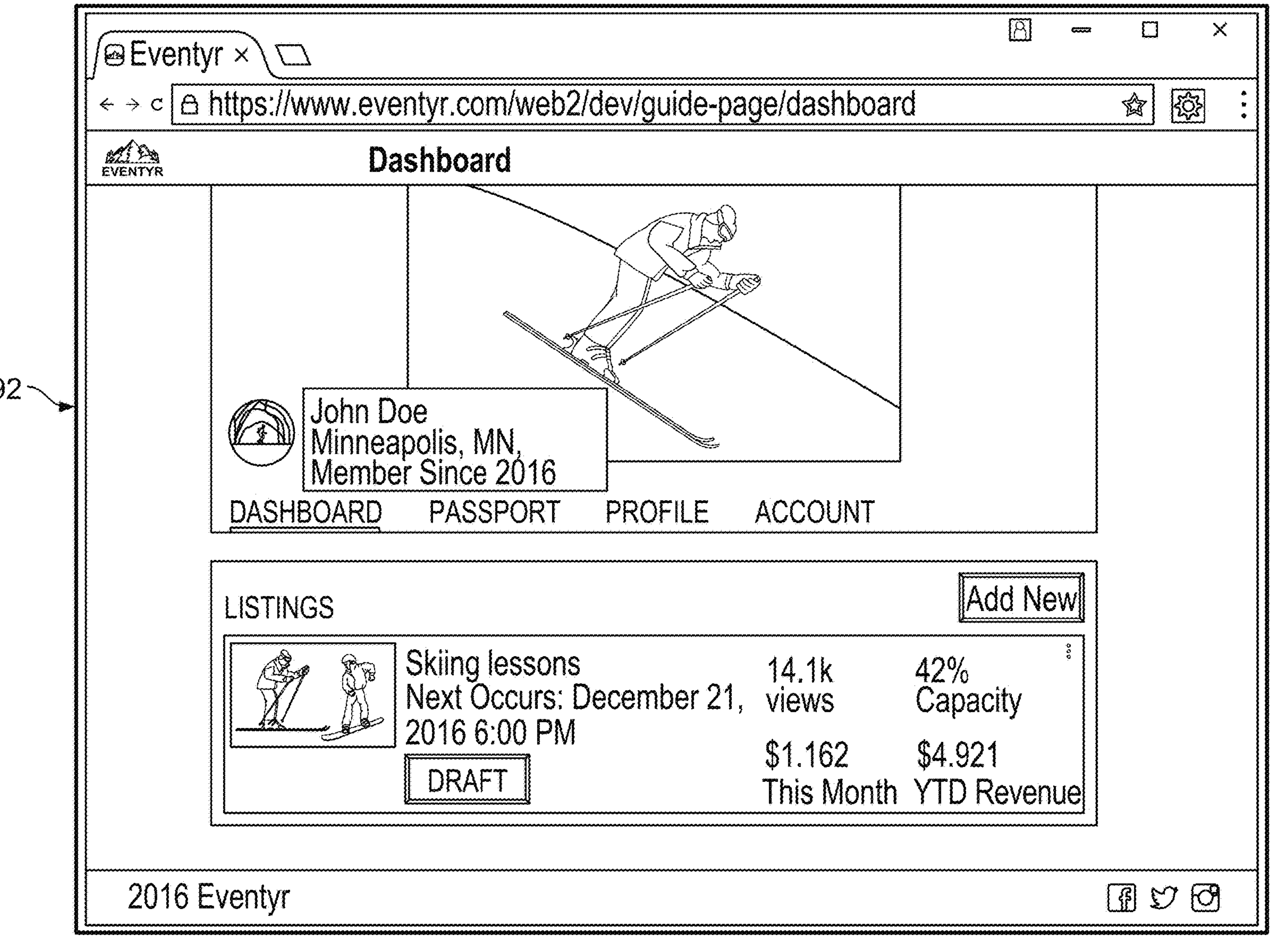
Figure 4Q:
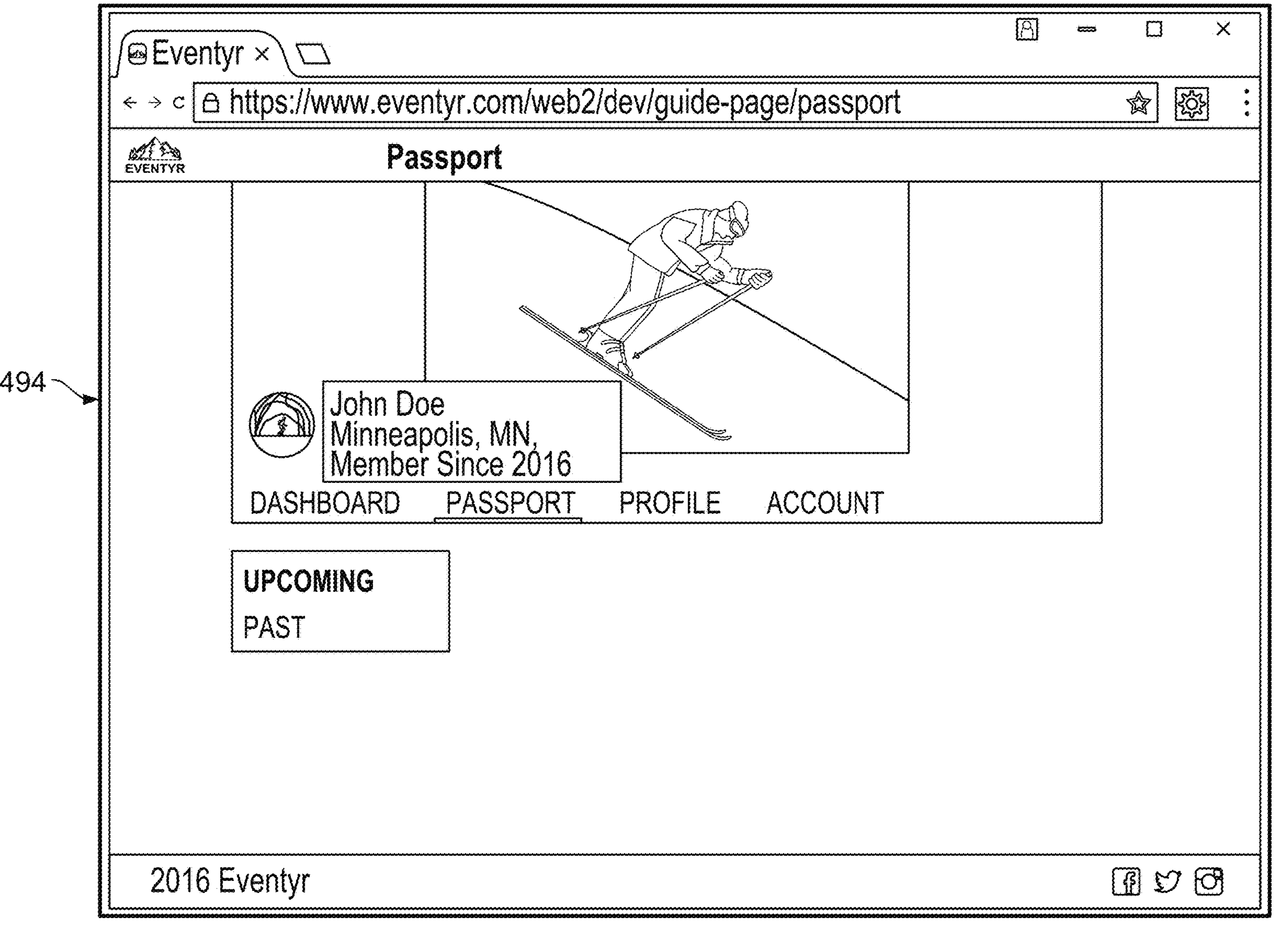
Figure 4R:
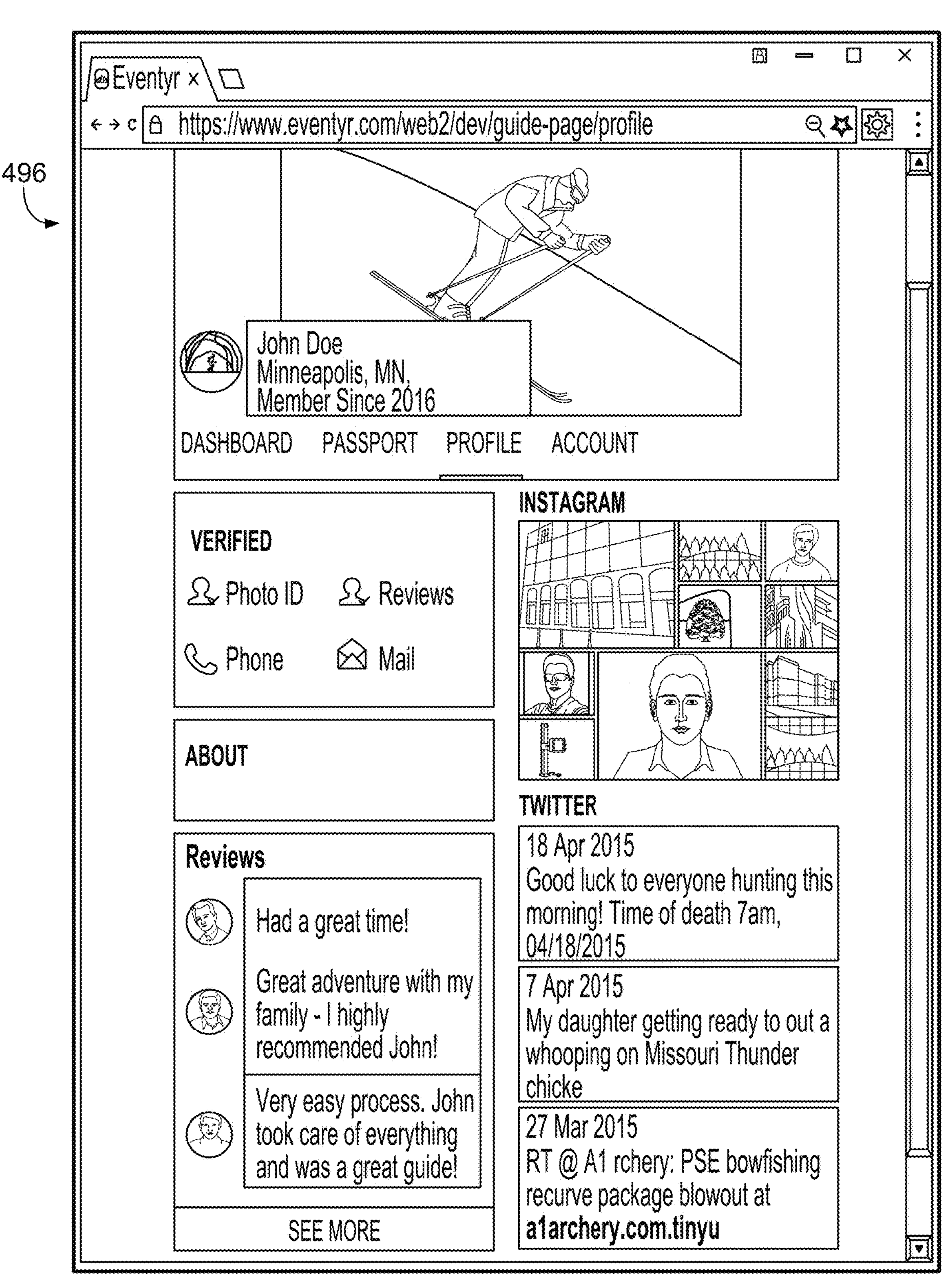
Figure 4S:
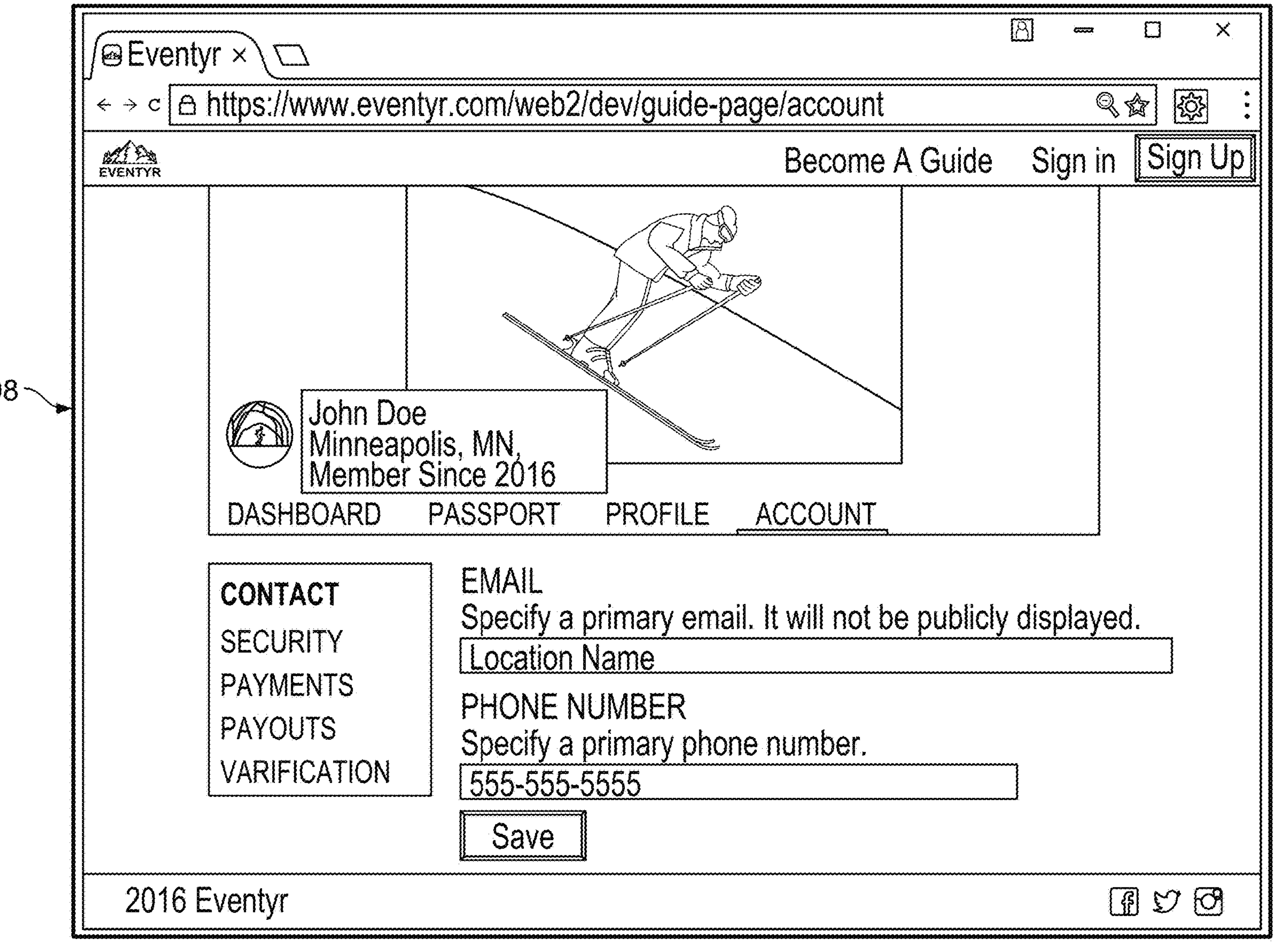

FIGS. 4A-S are a set of example screenshots for on-boarding a guide to an adventure management platform, such as the adventure management computer system 102 and/or 302. The example GUIs can be provided on example guide computing devices, such as the guide computing devices 104. The depicted GUIs are example web applications that can be provided through web browsers (e.g., GOOGLE CHROME, SAFARI, INTERNET EXPLORER) being executed on, for example, the guide computing devices 104 using web pages downloaded from the computer system 102 over the network 108. The example web pages can include one or more types of code (e.g., markup code, scripts) that are executed/interpreted by the guide computing devices 104 to provide an interactive web application on the guide computing devices 104 through synchronous and/or asynchronous requests transmitted to the computer system 102 over the network 108. Although the example GUIs depicted in FIGS. 4A-S are depicted as web applications, they can additionally and/or alternatively be implemented in other formats, such as for mobile apps specifically programmed for one or more mobile computing devices (e.g., IOS smartphones, ANDROID smartphones, tablet computing devices).

Referring to FIG. 4A, a first example GUI 400 through which a guide can initially register with an adventure management computer system (e.g., the computer system 102) is depicted. In this example, the guide is provided with a number of selectable buttons 402, 404 through which the guide can initiate the on-boarding process. The GUI 400 also provides other navigational links through which the user can access other features, such as the "Adventures" link to access, search for, and reserve adventures, the "Become A Guide" link to access information describing the process and conditions for becoming a guide, and the "Sign In" link for users who have previously created an account to login. Referring now to FIG. 4B, in response to selecting one of the selectable buttons 402, 404, the guide can be provided with a prompt 408 to continue the login using credentials for an example social media platform (FACEBOOK). The prompt 408 can include an option to opt-in to the terms and conditions for using the site, which can be presented to the user in their entirety by selecting the "Terms and Conditions" link. Referring now to FIG. 4C, in response to selecting the "continue" button in the prompt 408 (and opting into the terms and conditions), the guide can be presented with information 410 describing the implications of continuing to login via the social media account (e.g., providing the adventure management computer system with information from the guide's public profile and email address) and the option to consent to the authorization.

In response to authorizing the adventure management computer system to access the social media information, that social data for the guide can be retrieved and used to populate an initial form 412 with fields 414-420 for the guide's profile, as depicted in FIG. 4D. In this example, the guide's name and contact information are prepopulated into the fields 414 and 416. The other fields 418-420 would be populated as well if the social data for the guide had included those details. Once the guide has entered sufficient information through the form 412, the guide can select the next button 422.

Referring now to FIG. 4E, the guide can be prompted to select/set profile and cover photos (424) that have been populated from the social media data for the guide, and can be asked to identify other social media accounts that are associated with the user (426). These can be optional fields that a user can fill out. Once ready, the guide can select the finish button 428.

Referring now to FIG. 4F, the guide can be prompted to create his/her first adventure listing, as indicated by the button 430. A user who is not intending to initially act as a guide (but is not precluded from doing so at a later date) would not be presented with the option 430. In response to selecting the button 430, a first step in creating an adventure listing (identified in the status bar 432 as "basics") is presented to the guide with fields 434-444, as depicted in FIG. 4G. Where possible, the fields 434-444 include shorter lists of enumerated values that can be readily selected by a user, to simplify the guide on-boarding process. For example, the categories 436 can be enumerated to a few high-level categories (e.g., bike, hike, hunt, fish, snow), the experience level 440 can be enumerated as three categories (e.g., beginner, intermediate, expert), and the cancellation policy can be simplified to a few categories of pre-determined cancellation policies (e.g., flexible, moderate, strict). The photos 444 can be selectable from any local and/or remote image source that is authorized for the user of the device.

Referring now to FIG. 4H, example values and photos have been selected for each of the fields 434-444. In this example, a ski lesson adventure is being created by the guide. Additionally, example annotations describing different cancellations policies are depicted in the popup 448. Once ready, the guide can select the next button 446.

Referring now to FIG. 4I, additional details for the adventure are requested via the fields 450-454. In this example, the guide has provided a description of the example adventure (450) and has identified what a user should bring (452). Once ready, the guide can proceed to the next step by selectin the next button 456.

Referring now to FIG. 4J, location information for the adventure can be provided via the fields 458-462. The location can either be designated in the textual location fields 458 or through the interactive map 460. Once one is populated, the other can be determined and automatically populated as well. The location can be the starting location where participants are to meet the guide to participate in the adventure, with more granular instructions on where to physically meet the guide when they arrive at the location. Once ready, the guide can select the next button 464 to proceed to the next step.

Referring now to FIG. 4K, calendar information for the adventure can be provided via the fields 466-480. In the depicted example, the guide is able to designate a starting date and time (466), a prices (468), a maximum group size (470), whether it is a repeating adventure (472), and if it is repeating, the frequency of repetition (476) and the end date for the adventure (476). The pricing features 468 include, for example, selectable options to designate the pricing type (e.g., "per person" pricing type, "per group" pricing type) and a field to enter a price (e.g., $100) for the designated pricing type. In some implementations, prices can be entered and recorded for multiple pricing types, such as entering a first price for a per person pricing type and a second price for a per group pricing type. In such implementations, the guide may designate conditions under which one or both pricing types are provided and made available for reservation by users (e.g., guide can designate that both options are concurrently available for reservation, guide can designate that the per user option only becomes available for reservation when the per group option has not yet been reserved within a threshold time period of the adventure (e.g., not reserved within 1 week of the adventure), guide can designate that the per group option only becomes available for reservation when the per person option has not yet been reserved within a threshold time period of the adventure (e.g., not reserved within 1 week of the adventure)). The calendar icon 478*a* indicates a current day and the calendar icons 478*b* indicate the dates for the adventure as designated. Once ready, the user can select the save or cancel button 480. Once saved, the user can enter another set of calendar dates for the same adventure, as indicated by FIG. 4L, which depicts the repeating dates designated in FIG. 4K (482) and a new occurrence for the activity (478*c*). Once ready, the user can select the next button 484.

Referring to FIG. 4M, the user can then preview the adventure and, when ready, can select the finish button 486. Once uploaded and completed, the adventure may undergo automatic and/or human review before being officially approved and going live on the site.

Referring now to FIG. 4N, once the initial listing has been created, the guide can be prompted to setup a payment account so that he/she can be electronically and automatically paid for his/her services. Selecting the button 488 can initiate the account payment setup process, which can be a single interface 490 provided by a third party and automatically linked to, as indicated by FIG. 4O.

Once the onboarding process (FIGS. 4A-O) for the guide has been completed, the guide can view a customized view of his/her account on the site. Referring to FIG. 4P, a dashboard interface 492 can be presented that includes a listing of all adventures that the guide has created along with statistics, revenue, and other information, along with a button to create another adventure.

Referring to FIG. 4Q, a passport interface 494 can be presented, which provides the guide with a list of adventures in which the guide has been a participant on another guide's adventure. The passport interface 494 includes upcoming adventures (booked adventures) and a history of adventures.

Referring now to FIG. 4R, a profile interface 496 can be presented to the guide through which the guide can view his/her profile, associated photos and social media content, and reviews from past participants. The guide can use the profile interface 496 to manage his/her public image/presentation to potential participants. Some of all of the information in the interface 496 can be accessible to the public.

Referring now to FIG. 4S, an account interface 498 can be presented through which a guide can manage his/her account settings, which can include contact information, security, payment information, payouts, and verification features.

Figure 5:
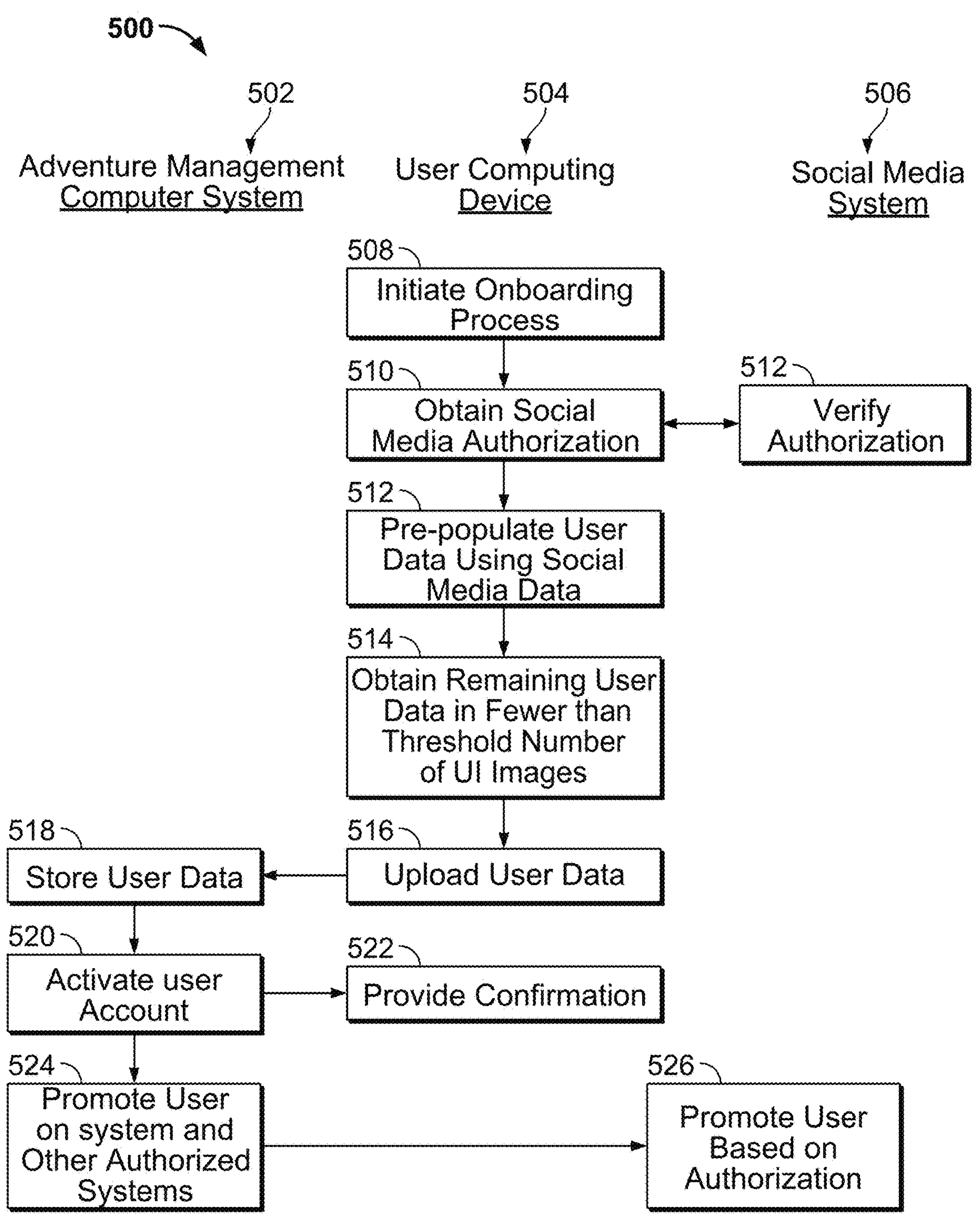
FIG. 5 is a flowchart of an example technique for on-boarding a user on an example adventure management platform provided via an adventure management computer system.

FIG. 5 is a flowchart of an example technique 500 for on-boarding a user on an example adventure management platform provided via an adventure management computer system 502. The technique 500 can be performed, in-part, by the system 502 (similar to the systems 102, 302), a user computing device (similar to the computing devices 104-106, 304), and a social media system 508 (similar to the other systems 124, 306).

The technique 500 include the computing device 504 initiating an on-boarding process (508), which includes obtaining social medial authorization for the adventure management system to have access to social media data for the user (510). The computing device 504 can verify and/or record the authorization with the social media system 506 (512), and, once verified, can obtain social media data for the user. The social media data can be obtained locally from the computing device 504 and/or via communication with the social media system 506. Using the social media data, the user data for the on-boarding process can be pre-populated using the social media data (513) and the user can be prompted to provide the remaining user data in a threshold number of UI pages of less (514). For example, the non-guide onboarding process depicted with regard to FIGS. 4A-E included two UI pages (FIGS. 4D and 4E) once the social media authorization was obtained. For guide onboarding processes, the UI pages can include the two pages for user on-boarding (FIGS. 4D and 4E) as well as the five UI pages for creating and approving an adventure listing (FIGS. 4G-M), and the one payment account enrollment UI (FIG. 4O)—for eight UI pages from start to finish for a guide to be up and running with a fully functional e-booking system. Other configurations and UI arrangements are also possible.

UI pages can include interfaces that present a limited amount of information/fields that require navigation to another page to view additional information/fields.

Once the user data has been obtained, it can be uploaded to the system 502 (516), which can store the user data (518) and activate the user account (520). The user device 504 can receive confirmation of the activation (522). Once enrolled, the system 502 can also promote the user and his/her adventures on the system 502 and on other authorized systems, such as the system 506 (524), which can present information promoting the user and/or his/her adventure listings (526).

Figure 6:
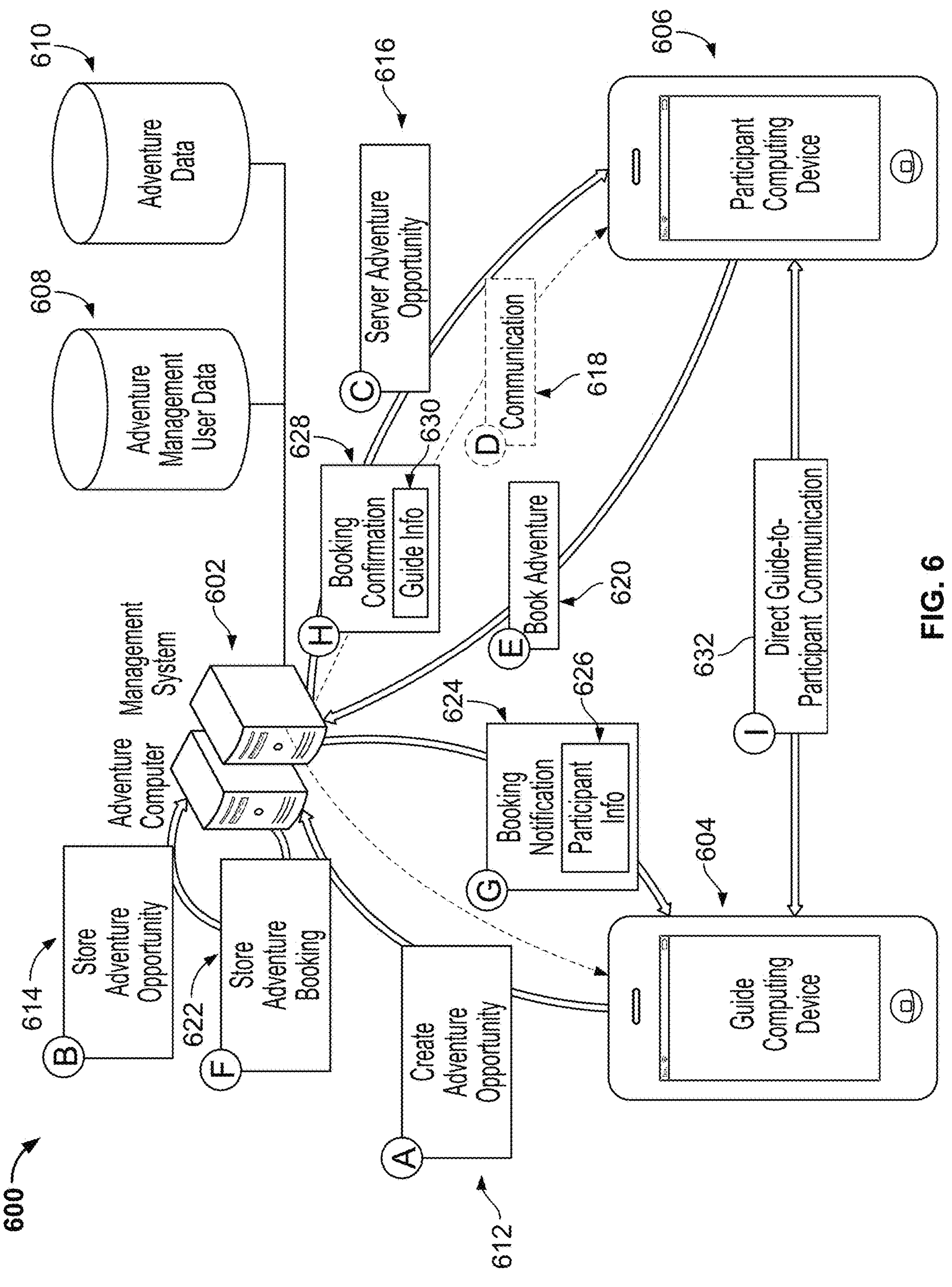
FIG. 6 is a conceptual diagram of an example system for restricting access to guide and participant information on an example adventure management platform.

FIG. 6 is a conceptual diagram of an example system 600 for restricting access to guide and participant information on an example adventure management platform 602. The adventure management platform 602 can be similar to the adventure management computer systems 102, 302, and 502 described above with regard to FIGS. 1A, 3, and 5. In the depicted example, a participant computing device 606 (similar to the user computing devices 106) books an adventure with a guide associated with the guide computing device 604 (similar to the guide computing devices 104) and the adventure management computer system 602 restricts access to some participant and guide information until the booking has been confirmed, has progressed past a point of cancellation, and/or other factors. The adventure management computer system 602 can maintain a user database 608 and an adventure database 610 (e.g., using the database schema 200), which can store participant and guide information, such as contact information.

Referring to step A (612), the guide computing device 604 can create an adventure opportunity with the adventure management computer system 602, which can store the adventure opportunity in the adventure database 610 (step B, 614). The participant computing device 606 can be served with adventure opportunities by the system 602 (step C, 616), which can include information describing the adventure opportunity created by the guide computing device 604. Such information may not include direct contact information for the guide computing device 604, such as the guide's email address, phone number, direct messaging user names, and/or other features through which the participant could directly contact the guide. In some implementations, the system 602 may permit communication between the guide and the participant in advance of the adventure being booked by the participant so long as it flows through and is moderated by the system 602 (step D, 618). Such moderation can include, for example, human facilitators and/or automated bots that anonymize guide and participant identities, review the message for direct contact information, and/or other content filters.

As indicated by step E (620), the participant computing device 606 can book the adventure with the system 602, which can store the adventure booking in the database 610 (step F, 622). After the booking has been stored, the system 602 can transmit a booking notification to the guide computing device 604 that can include previously restricted participant information 626 (step G, 624). Similarly, the system 620 can transmit a booking confirmation to the participant computing device 606 that can include previously restricted guide information 630 (e.g., email, phone number, other contact information). Using the previously restricted information, the guide and the participant devices 604 and 606 can be put in direct communication with each other, as indicated by step I (632). In some implementations, such information 626 and 630 may not be provided to the devices 604 and 606 until the booking has progressed beyond a point of cancellation. Prior to the cancellation period expiring, the communication may need to flow through the system 602 (step D, 618).

Figure 7B:
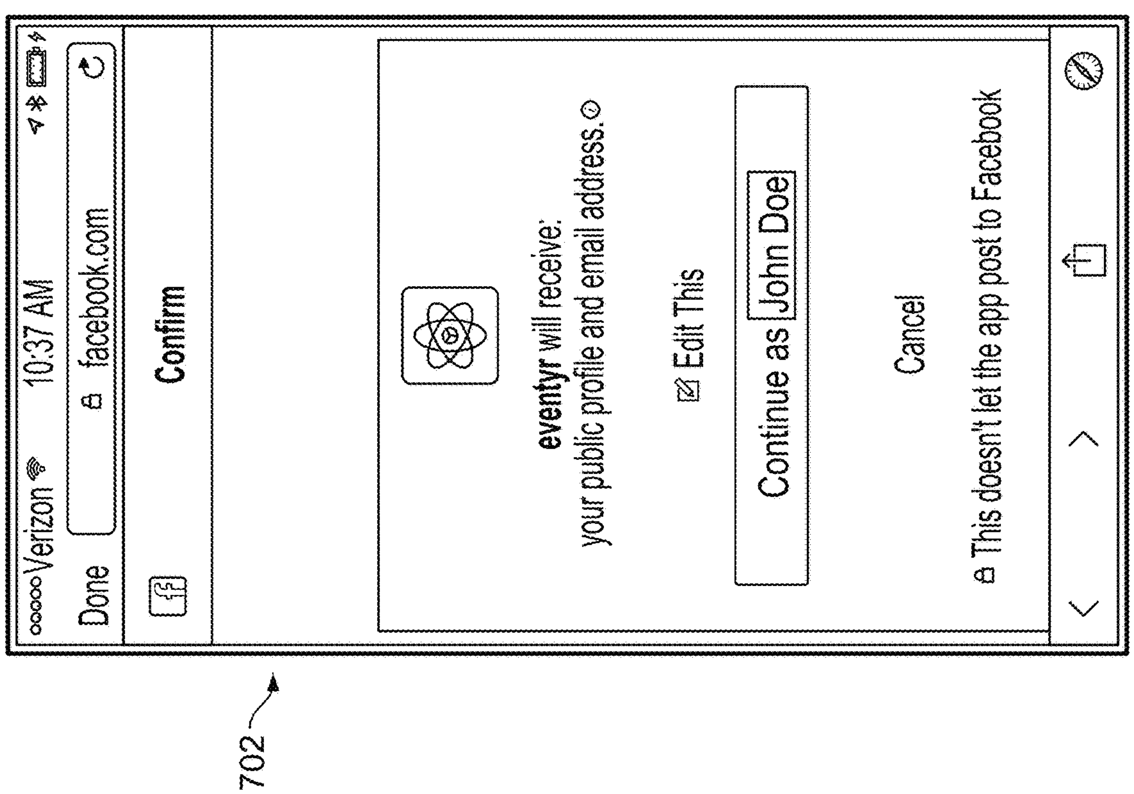
FIGS. 7A-O are a set of example screenshots for restricting access to guide information until an adventure has been booked by a user on an adventure management platform.
Figure 7A:
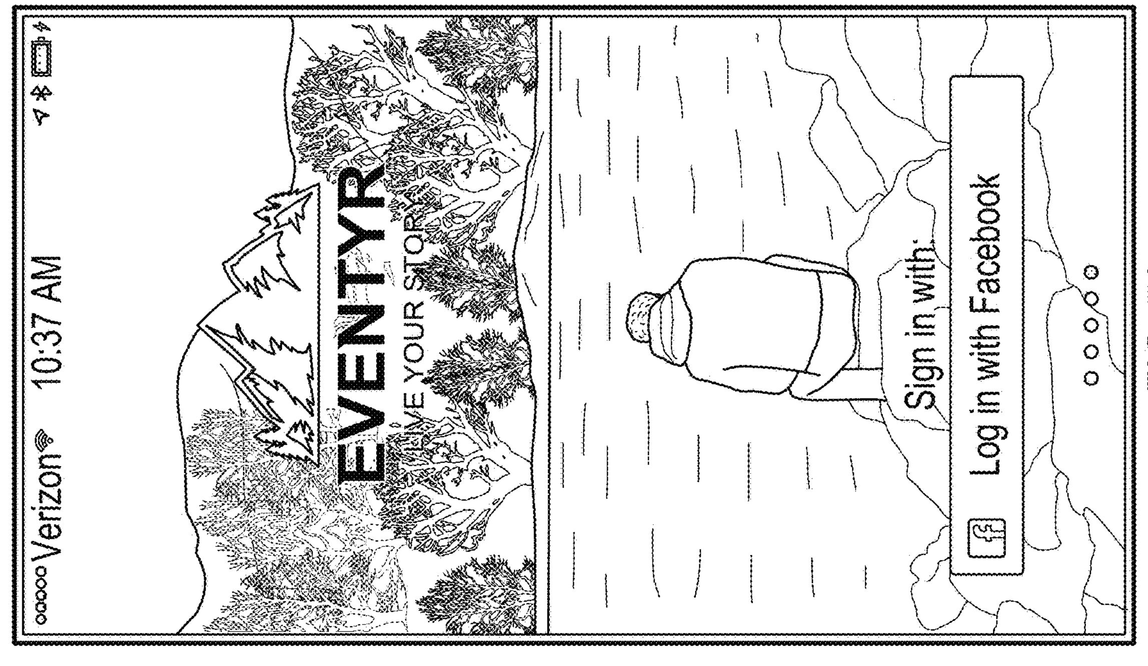
Figures 7C, 7D:
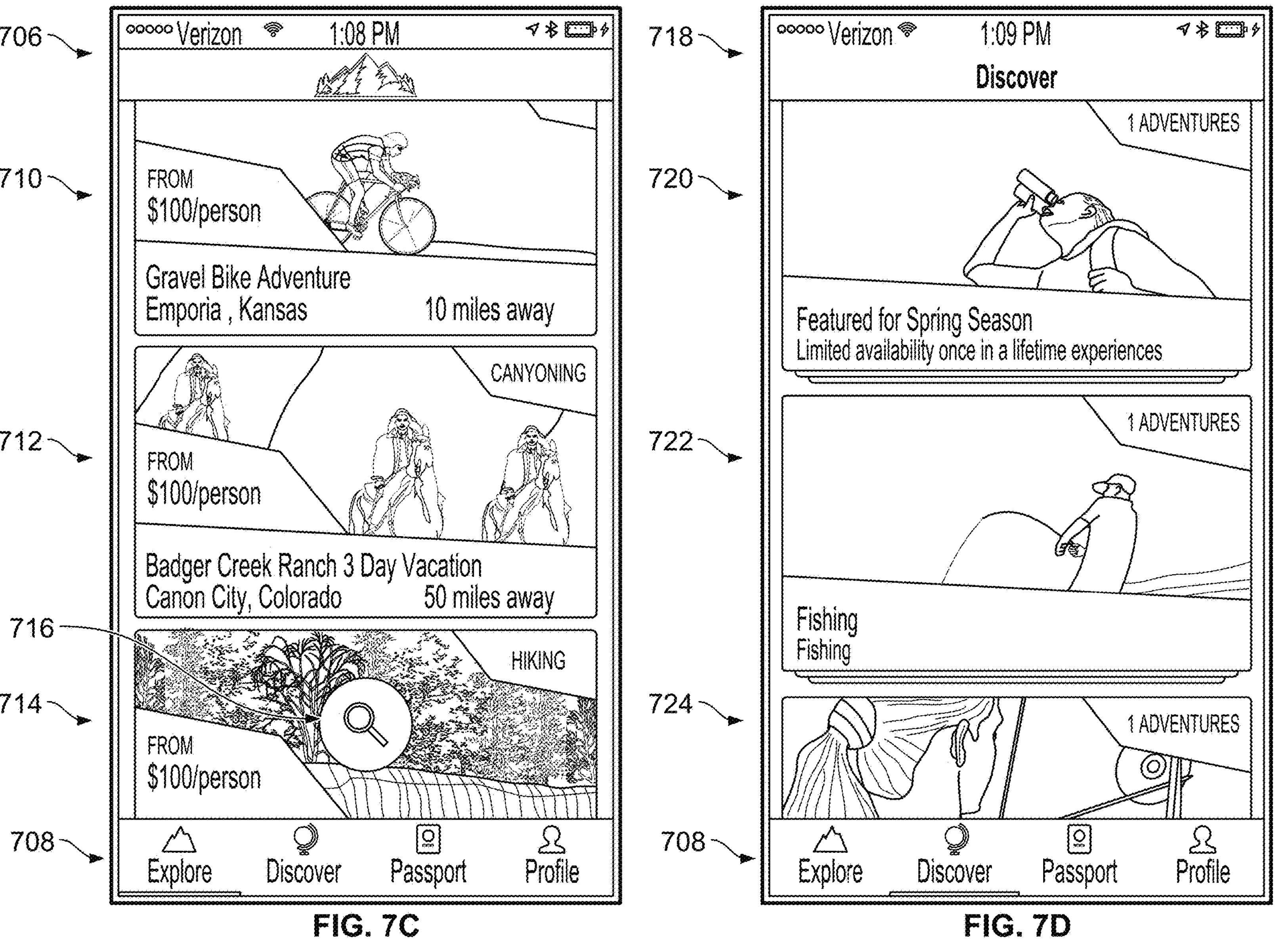
Figures 7E, 7F:
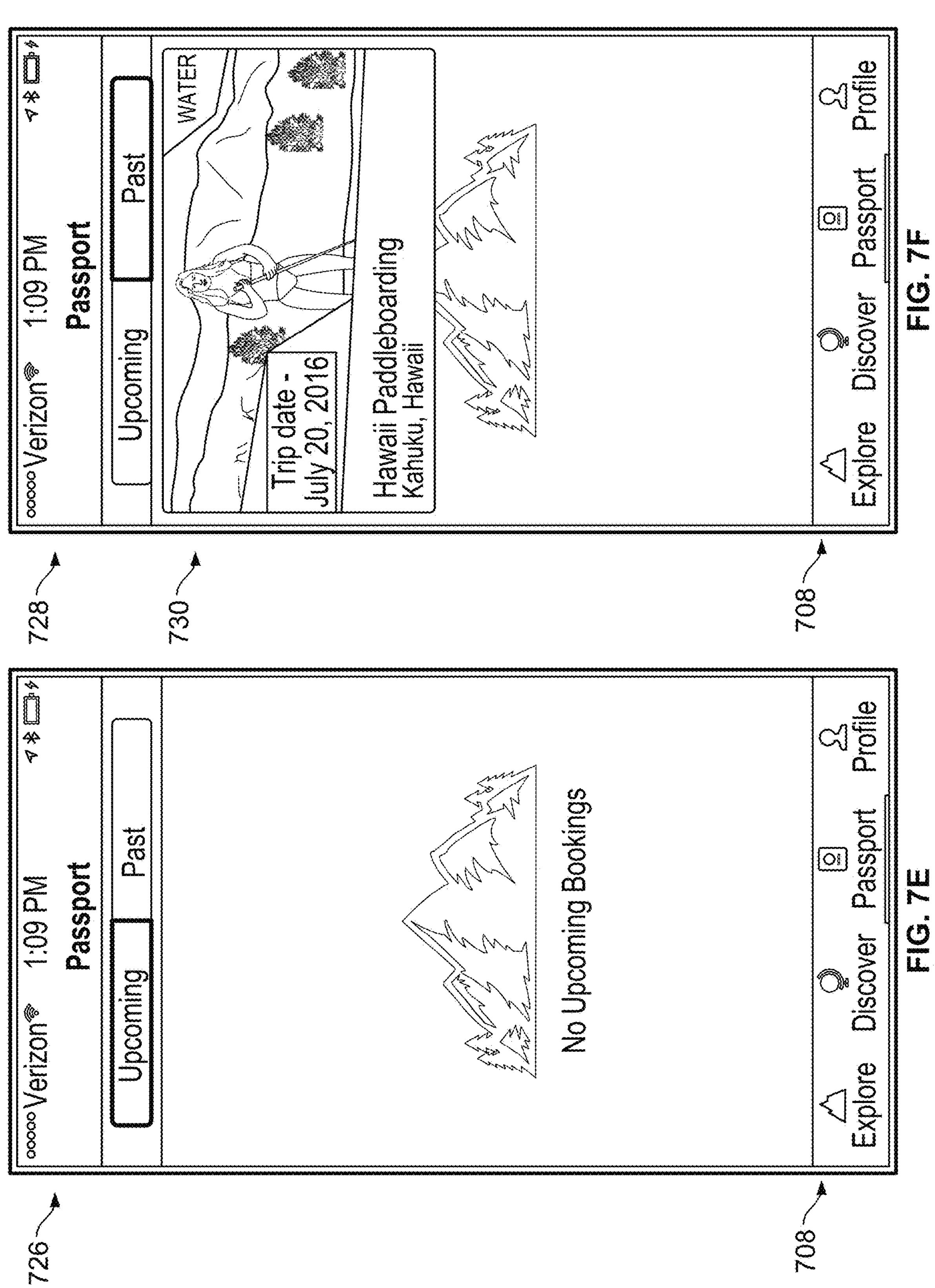
Figures 7G, 7H:
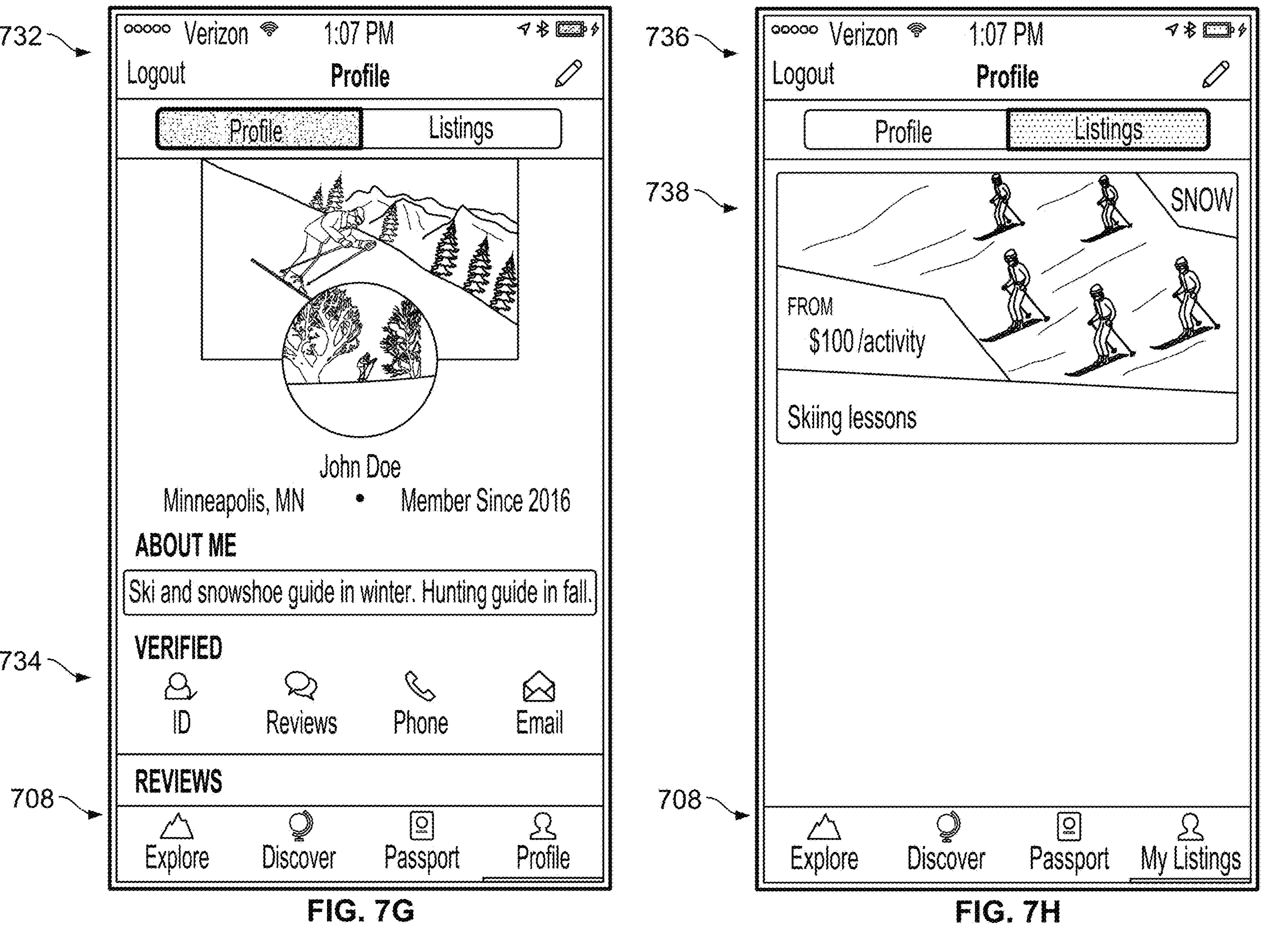
Figures 7I, 7J:
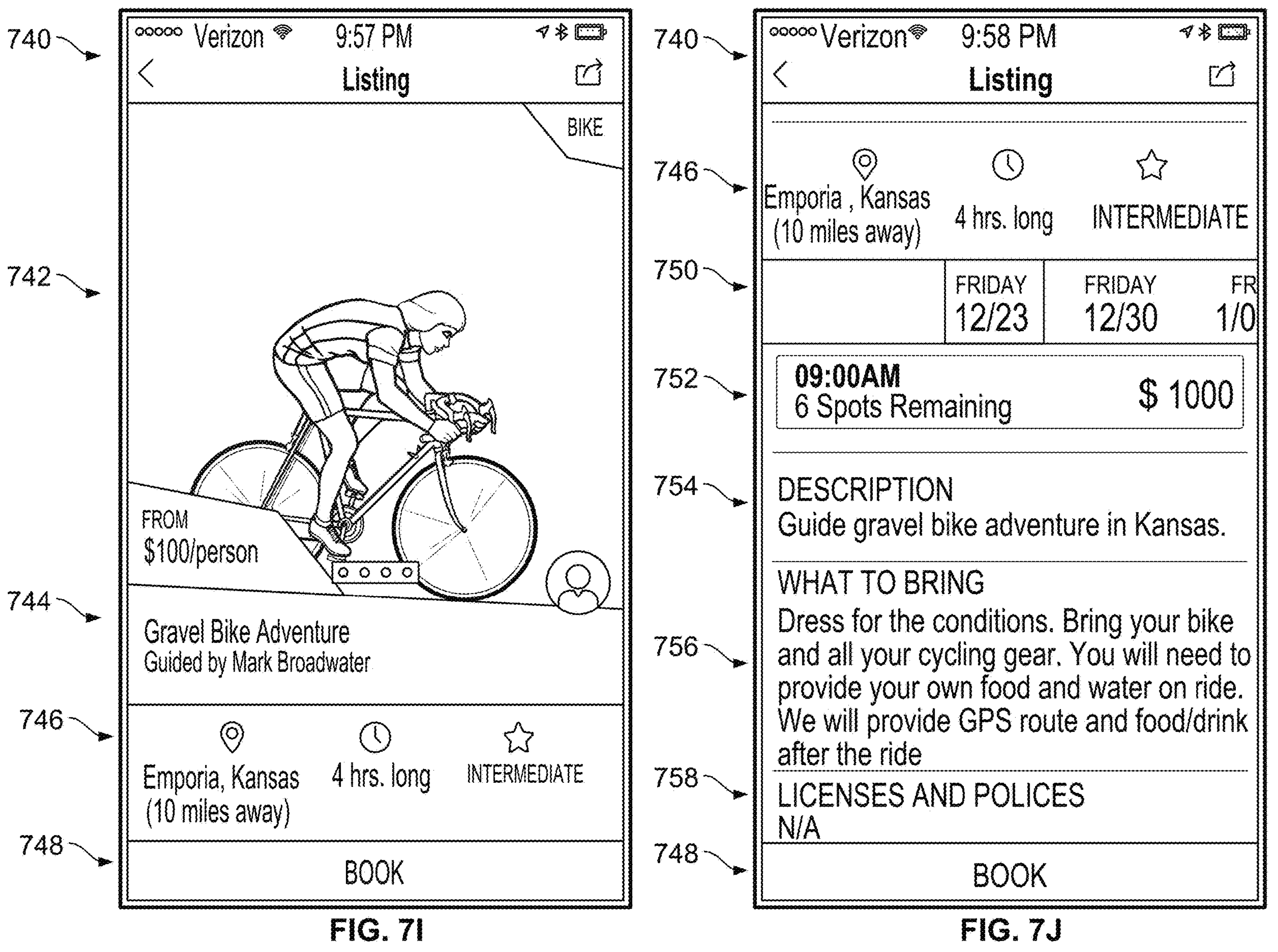
Figure 7O:
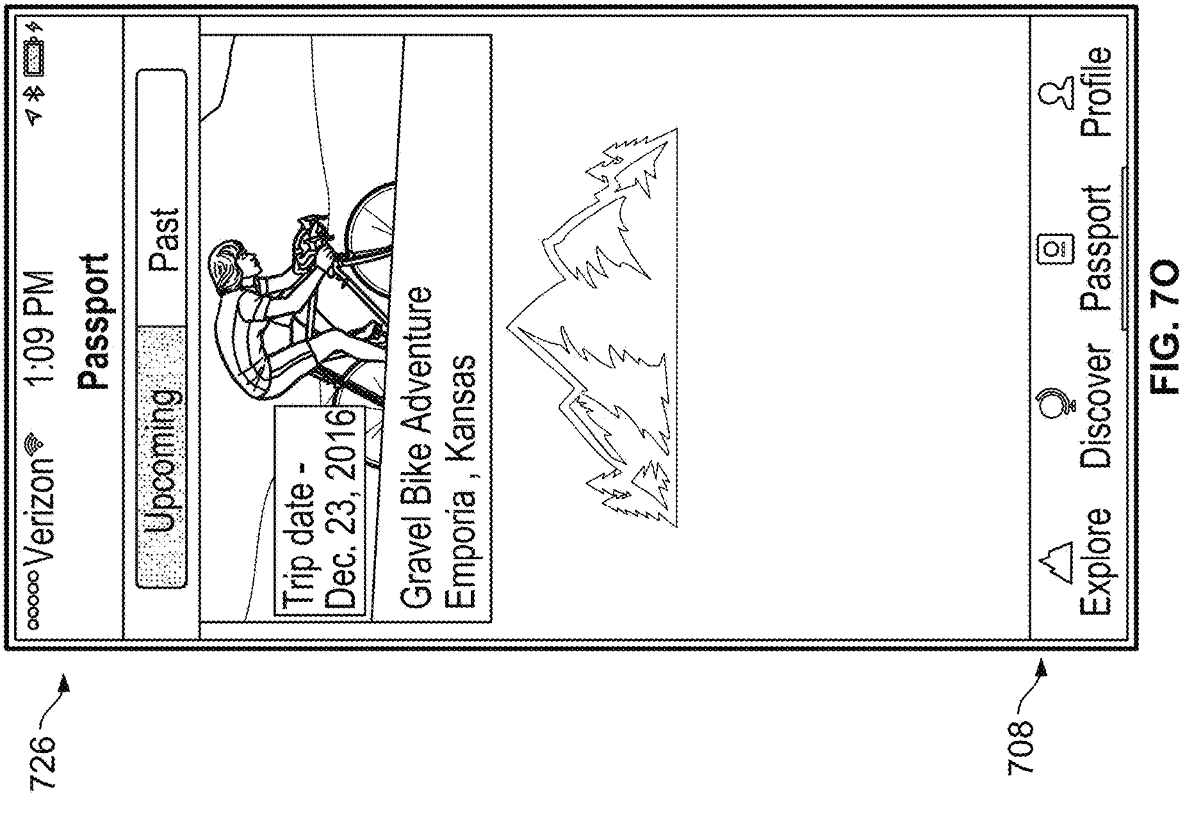

FIGS. 7A-O are a set of example screenshots for restricting access to guide information until an adventure has been booked by a user on an adventure management platform, such as the adventure management computer system 102 and/or 302. The example GUIs can be provided on example guide computing devices, such as the user computing devices 106 and/or the participant computing device 606. Although the example GUIs are mobile apps specifically programmed for one or more mobile computing devices (e.g., IOS smartphones, ANDROID smartphones, tablet computing devices), they can additionally and/or alternatively be provided via other interfaces, such as through web browsers providing we applications.

Referring to FIG. 7A, an initial screen 700 is presented to a mobile app user requesting that the user log in via a social media account (e.g., FACEBOOK). In response to selecting the button, an on-boarding process for the user can start similar to the one described above for guides with regard to FIGS. 4A-E, as indicated by FIG. 7B and the screen 702. Once the onboarding process is complete (e.g., additional screens can be presented similar to those in FIGS. 4A-E, the initial on-boarding process for the user may be limited to just the screen 702), the user can be presented with the explore interface 706 through which the user can be presented with a number of available adventures 710-714 that are relevant to the user (e.g., relevant in terms of proximity to the user, interests of the user), as indicated by FIG. 7C. The adventures 710-714 can be presented in the interface 106 with various information, such as images depicting the adventure, a description of the adventure, a location for the adventure, pricing for the adventure, a pricing type for the adventure (e.g., per person pricing, per group pricing), and a distance from the user's current location (e.g., location determined for the user's mobile device, such as a current location determined via GPS and/or Wi-Fi location processing). The adventures 710-714 can be automatically ordered based on any of a variety of factors, such as being ordered based on proximity to the user's current location (e.g., ordered from closest to furthest away adventure), a matching score indicating how well the adventure matches one or more search criteria (e.g., adventure type, price, schedule), and/or combinations thereof. A search interface 716 is also presented through which the user can search for adventures along one or more parameters (e.g., location, type of adventure, duration, date, price, spots available). The user can toggle to different interfaces through the footer 708.

Referring to FIG. 7D, a discover interface 718 is presented that includes adventures presented in different categories 720-724 that the user can select and explore in greater detail. Referring to FIG. 7E, an upcoming passport interface 726 (the "upcoming" tab selected) is presented, which depicts upcoming/booked adventures for the user. Referring to FIG. 7F, a past passport interface 728 (the "past" tab selected) is presented, which depicts previous adventures 730 that the user has taken. Referring to FIG. 7G, a profile interface 732 is presented which includes information about the user, including profile status information 734 indicating what information has been provided to the adventure management system for the user, such as the user's phone number, email, and social media accounts/feeds (e.g., TWITTER feed, INSTAGRAM feed). Referring to FIG. 7H, a listings interface 736 is presented which provides a list of adventures 738 that the logged-in user has created.

Referring to FIGS. 7I-J, in response to the user selecting the adventure 710 for the "gravel bike adventure," the interface 740 is presented, which includes detailed information on the adventure and features to book the adventure. For example, the interface 740 includes a larger image 742, a description of the adventure 744, location/duration/skill level information 746, date and time information 750, remaining spots and price 752, a description 754, instructions on what to bring 756, licenses for the trip 758, and a button 748 to book the adventure. As depicted in the interface 740, contact information for the guide or other mechanisms through which the user could communicate directed with the guide are not presented at this point in the booking process. Referring to FIG. 7K, the user selects the reservation button 752 and toggles the reservation up to 2 spots, and selects the book button 748.

Referring to FIG. 7L, an interface 760 with a summary of the adventure booking is presented with fields 762-774 summarizing various aspects of the reservation to be made. The user is presented with a radio button 770 to agree to the licensing requirements (and other requirements) for the adventure, and an option 772 is presented for providing a method of payment. Referring to FIG. 7M, an interface 778 to provide payment information is presented in response to selection of the option 772. The interface 778 can include fields 780 and 782 through which the user can provide contact and payment information, which were not required or collected previously by the system during the on-boarding process but which can be added to the user's profile as they are collected.

Referring to FIG. 7N, after the payment information has been provided and the pay button 776 has been selected, confirmation of the booking can be provided to the user via the interface 784, which can include a summary of the reservation 762-768, 786 as well as previously restricted information 788-790. In this example, the previously restricted information includes the specific meetup location 788 and the guide contact information 790. Referring to FIG. 70, in response to the adventure being booked, the adventure can be presented in the upcoming passport interface 726 so that the user can readily track his/her schedule.

Figure 8:
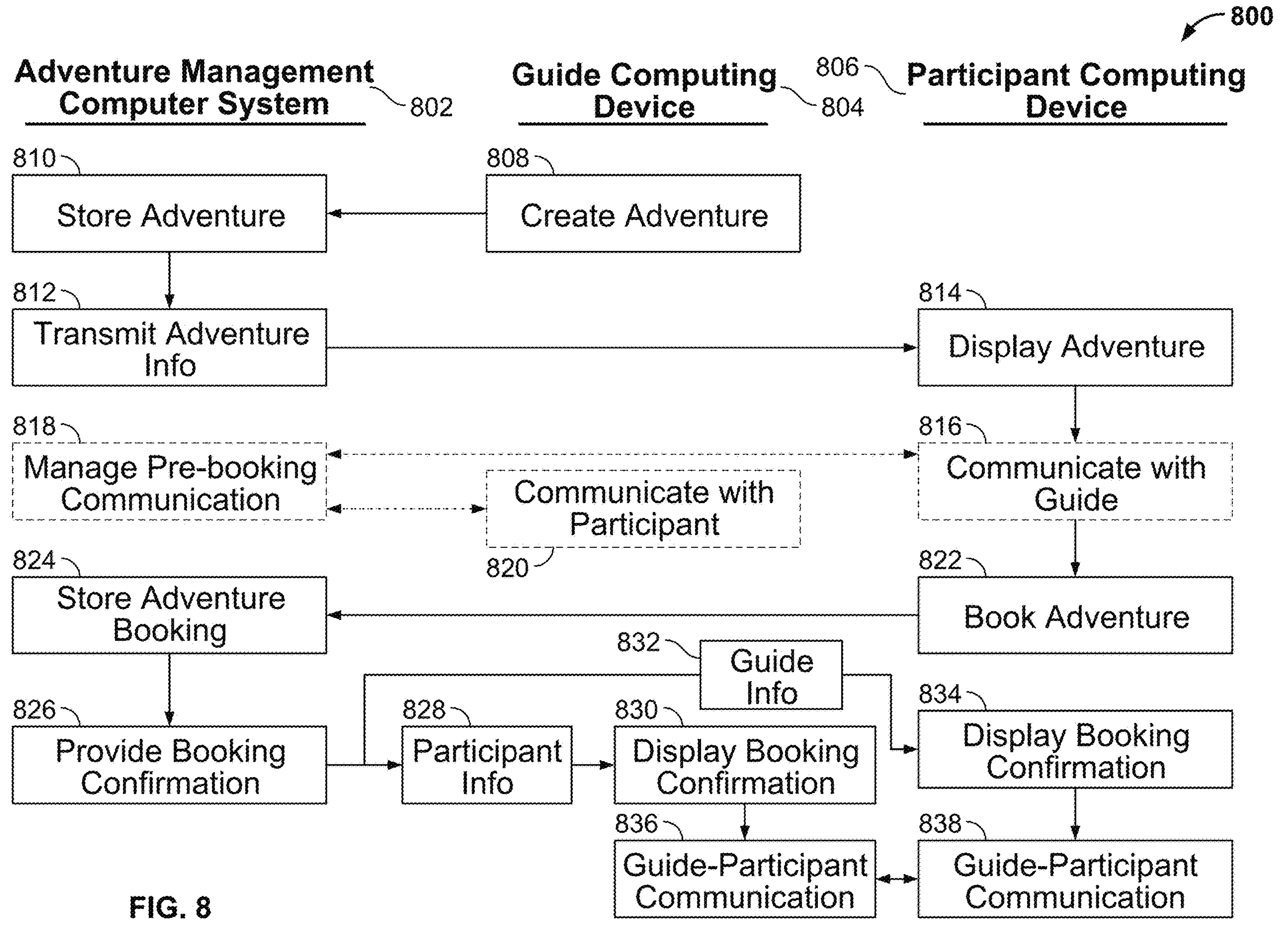
FIG. 8 is a flowchart of an example technique for restricting access to participant and/or guide information until an adventure has been booked.

FIG. 8 is a flowchart of an example technique 800 for restricting access to participant and/or guide information until an adventure has been booked. The technique 800 can be performed, in-part, by an adventure management system 802 (similar to the systems 102, 302, 502), a guide computing device 804 (similar to computing devices (similar to computing devices 104, 304), and a participant computing device 806 (similar to the computing devices 106, 304, 506).

The guide computing device 804 can create an adventure (808) that is transmitted to and stored by the system 802 (810). The system 802 can transmit the adventure information to the participant computing device 806 (812), which can display the adventure (814). The information provided to the participant computing device 806 can be restricted so as to not include any contact information for the guide or other information that could be used to circumvent the system 802. Optionally, the participant computing device 806 can initiate communication with the guide (816, 820) via a pre-booking communication session managed and monitored by the system 802 (810).

The participant device 806 can book the adventure with the system 802 (822), which can store the adventure booking (824) and proceed to provide booking confirmation (826). The booking confirmation can include the participant information 828 being provided to the guide computing device 804, which can display the confirmation (830), and can include the guide information 832 being provided to the participant computing device 805, which can display the booking confirmation (834). Using the guide and participant information (828, 832), the guide and participant can engage in direct communication with each other (836, 838).

Figure 9:
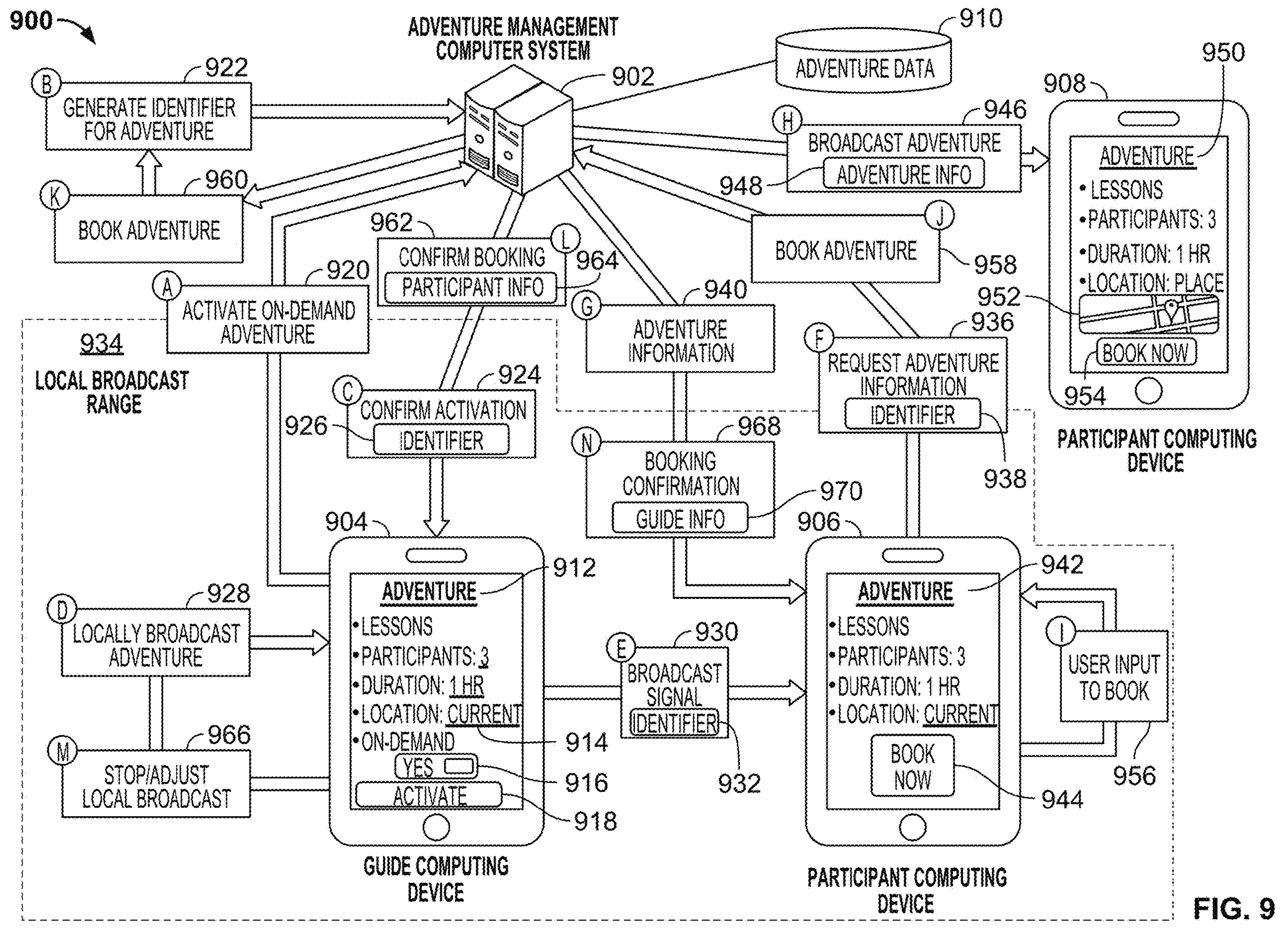
FIG. 9 is a conceptual diagram of an example system for providing on-duty adventure services.

FIG. 9 is a conceptual diagram of an example system 900 for providing on-duty adventure services. The adventure management platform 902 can be similar to the adventure management computer systems 102, 302, 502, 602, and 802 described above with regard to FIGS. 1A, 3, 5, 6, and 8. In the depicted example, a guide computing device 904 (similar to the guide computing device 104) activates an on-duty adventure (which may have been previously created and permits the guide to activate/deactivate), which is broadcast to participant computing device 906 and 908 (similar to the user computing devices 106). The system 902 manages the booking of the on-duty adventure using the adventure database 910 (e.g., using the database schema 200).

The guide computing device 904 can present an interface 912 for the guide to view, modify, and activate a previously created adventure so that it is provided on-duty. For example, the guide can navigate to the interface 736 to and can select an adventure to activate on-duty. As depicted in the example interface 912, the location field 914 for the adventure can be set to the current location of the guide computing device 904, the on-duty slider 916 can be set to "yes" (meaning that the adventure is being provided on-duty), and the activate button 918 can be pressed to activate the on-duty adventure. Activating the on-duty feature can cause the guide computing device 904 to locally broadcast the adventure to other nearby devices and for the system 902 to broadcast the adventure to participant computing devices that are located nearby and/or are interested in the adventure.

In response to the user selecting the activate button 918, the guide computing device 904 can transmit a request to activate the on-duty adventure to the system 902 (step A, 920). In response to receiving the on-duty activation request, the system 902 can generate an identifier for the adventure (step B, 922), which can be stored in the adventure database 910 and transmitted back to the guide computing device 904 (step C, 924-926). The identifier can uniquely identify the adventure on the system 902 and/or universally (e.g., UUID, URL). The guide computing device 904 can locally broadcast the on-duty adventure by embedding the identifier 926 in the local broadcast (step D, 928). For example, the device 904 can transmit a broadcast signal that includes the identifier 932 in the payload of the broadcast signal (step E, 930). Such a signal can be, for example, a beacon signal that can be passively monitored for and detected by other devices that are within a local broadcast range 934 for the signal, such as the participant computing device 906 that is located within the range 934. Any of a variety of appropriate wireless protocols and chipsets can be used for the broadcast signal 930, such as standardized and widely adopted wireless protocols on mobile devices like BLE, Wi-Fi, and NFC. The range 934 can depend on the chipset and wireless protocol that is used for the broadcast signal. For example, if the broadcast signal is transmitted using the Wi-Fi standard and chipset, the local broadcast range 934 can be up to 30 m-40 m. Given the physical limitations of local wireless broadcasts from the guide computing device 904, the guide may have the best success of his/her broadcast being received by another user who is interested in an on-duty adventure opportunity if the guide positions the device 904 in a location with a larger group of people. For example, a guide offering on-duty ski lessons may want to position himself/herself with the device 904 in a crowded lodge, hotel, or ski lift at the ski area. Additionally, the guide computing device 904 can be programmed to transmit the broadcast signal over multiple different wireless protocols (e.g., both Wi-Fi and BLE) to enhance the opportunity that the signal will be received by a nearby listener.

The participant computing devices 906 and 908 can both be programmed to passively monitor for adventure-related broadcast signals over one or more wireless protocols and, when detected, to request additional information for the on-duty adventure from the system 902 using the identifier 932. Adventure-related broadcast signals can be encoded with one or more flags (e.g., in the header, in the payload) so that they can readily be identified as an adventure-related broadcast signal and acted upon by the devices 906 and 908. By using flags, the devices 906 and 908 can minimize the number of requests that are transmitted for additional information related to the signals, which can conserve computing resources. Additionally, user settings on the devices 906 and 908 can allow for users to designate whether they want to monitor for and present nearby on-duty adventures. If a user does not want to receive/view on-duty adventures, the devices 906 and 908 will not monitor for broadcast signals. However, if the devices 906 and 908 have user settings to monitor for on-duty adventures, then the devices 906 and 908 can register event listeners and can passively monitor for adventure-related broadcast signals.

For example, the guide computing device 904 can run a mobile app that is programmed to use one or more wireless beacon protocols (e.g., APPLE's iBeacon, AltBeacon, URI-Beacon, GOOGLE Beacons) to transmit BLE beacon signals that include the identifier 932 in the payload of the beacon message. The participant computing devices 906 and 908 can run the same or similar mobile app that is programmed to passively monitor for BLE beacon signals and, when detected, to request additional information from the adventure management computer system 902. The BLE beacon signals can include one or more header fields and/or payload bits that both the guide computing device 904 and the participant computing devices 906, 908 are programmed to recognize as an adventure-related beacon signal, which can help filter beacon signals at the device level instead of having to reconcile the beacon signal with a remote system, such as the system 902 and/or a beacon platform that translates beacon identifiers into additional beacon-related data.

In the depicted example, the participant computing device 906 detects the broadcast signal and the identifier 932 from the guide computing device 904, and proceeds to request adventure information from the system 902 by retransmitting the identifier 938 (step F, 936). The adventure management system 902 can use the identifier to retrieve information for the adventure from the database 910 and can serve the adventure information to the participant computing device 906 (step G, 940). The participant computing device 906 can present the adventure information in an interface 942 that includes information for the adventure and an option to book the adventure (book now button 944), similar to the interfaces described above with regard to FIGS. 7I-K. User input can be received to book the adventure (step I, 956), which can be transmitted to and processed through the system 902 (steps J-K, 958-960). The confirmation of the on-duty booking can be transmitted to both the guide and participant devices 904-906 with corresponding participant and guide information 964 and 970 (steps L, 962 and N, 968). The booking and transmission of information after the booking process is complete can be similar to the description above with regard to FIGS. 6-8, and as depicted in the example interfaces in FIGS. 7L-N. In response to receiving the booking confirmation, the guide computing device 904 can stop and/or adjust the broadcast signal that is being transmitted (step M, 966). For example, the guide computing device 904 may be configured to locally broadcast immediately available adventures and may stop broadcasting when the guide is not immediately available. In another example, the guide computing device 904 may be configured to change the identifier to an identifier for the same adventure at a later time slot in the day so that the guide can continue to locally line-up bookings for the adventure.

Similar to the description above with regard to FIGS. 6-8, the local broadcast using beacon signals and adventure identifiers can allow for guide transactions to be processed through the system 902 even though the guide and the participant are at the same physical location when the adventure is booked.

Additionally and/or alternatively, the adventure management computer system 902 can broadcast information about the on-duty adventure participant devices, such as the devices 906 and 908. The adventure management computer system 902 can identify devices to receive notifications about currently available on-duty adventures based on a variety of factors, such as the actual or estimated proximity of the user to the location of the on-duty adventure, user settings indicating whether the user wants to receive notifications about on-duty adventures, the type of adventures that the user is interested in, and/or other appropriate factors. The location of the user can be determined based on a variety of information, such as an adventure mobile app being authorized to use and transmit location information for the devices 906 and 908, the user having provided their location (e.g., hometown), location information for the user from other services (e.g., authorized social media systems), and/or other sources.

For example, the adventure management computer system 902 can broadcast information about the on-duty adventure with adventure information 948 to the device 908 (step H, 946) in response to the guide computing device 904 activating the adventure. The on-duty adventure information can be provided on the device 908 as, for example, a push notification that includes a brief description of the on-duty adventure that, if selected by the user, can cause an interface 950 to be presented with information on the on-duty adventure. The information can include, for example, location information 952 (e.g., address, map) for the adventure and an option to book the adventure (book now button 954). Once the on-duty adventure is booked by a user, the system 902 can stop and/or modify the broadcast for the on-duty adventure, similar to the description for the local broadcast.

Figure 10:
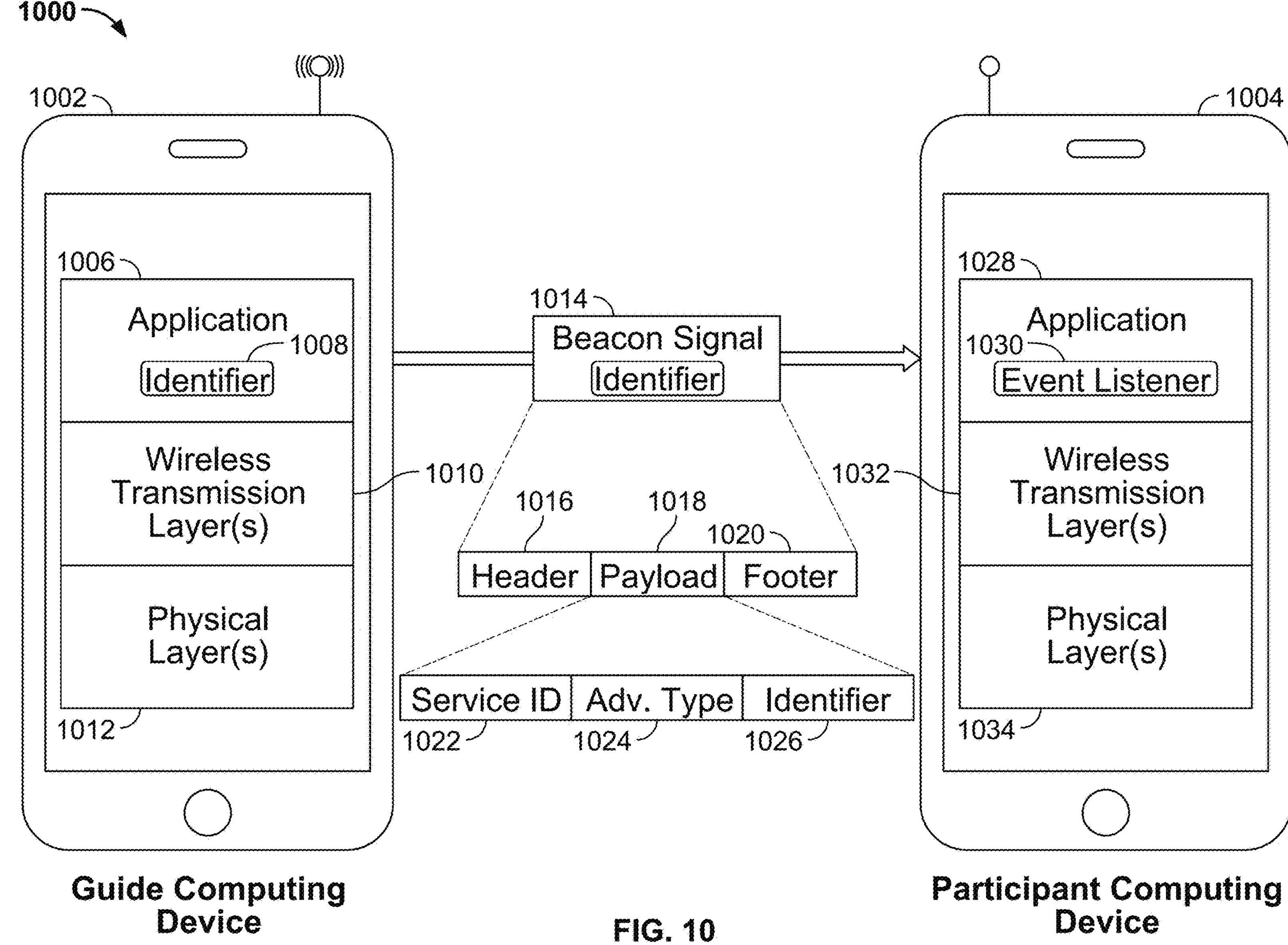
FIG. 10 is a conceptual diagram of a system for local adventure beacon signal transmissions.

FIG. 10 is a conceptual diagram of a system 1000 for local adventure beacon signal transmissions. The system 1000 includes an example guide computing device 1002 (similar to the guide computing device 904) and an example participant computing device 1004 (similar to the participant computing device 906). Both the guide computing device 1002 and the participant computing device 1004 can include beacon transmission and monitoring stacks that are similarly programmed to transmit and listen for beacon signals over a common wireless protocol. For example, the guide computing device 1002 includes an application layer 1006 (e.g., mobile app) that has obtained an identifier for the adventure that is transmitted in the payload of a beacon signal 1014 through wireless transmission layers 1010 and physical layers 1012 on the device 1002.

The beacon signal 1014 is transmitted as a data packet with a header 1016, a payload 1018, and a footer 1020. The payload 1018 can include various data that is encoded in the payload value 1018, such as through particular bit designations in the payload value. For example, the payload 1018 can include a service ID 1022 that identifies the beacon signal 1014 as an on-duty adventure beacon signal, an adventure type 1024 that is an enumerated value for the type of adventure that is being advertised (e.g., hunting, biking, snow), and an identifier for the adventure 1026 that can be used to retrieve information for the adventure from an adventure management computer system. The data values 1022 and 1024 can be used by the application layer 1028 and the event listener 1030 on the participant computing device 1004 to provide a device-level filter that efficiently determines whether the device 1004 should request additional on-duty adventure information. The beacon signal can be received at application layer 1028 on the device 1004 through physical layers 1034 and wireless transmission layer 1032 on the device 1004.

Figure 11:
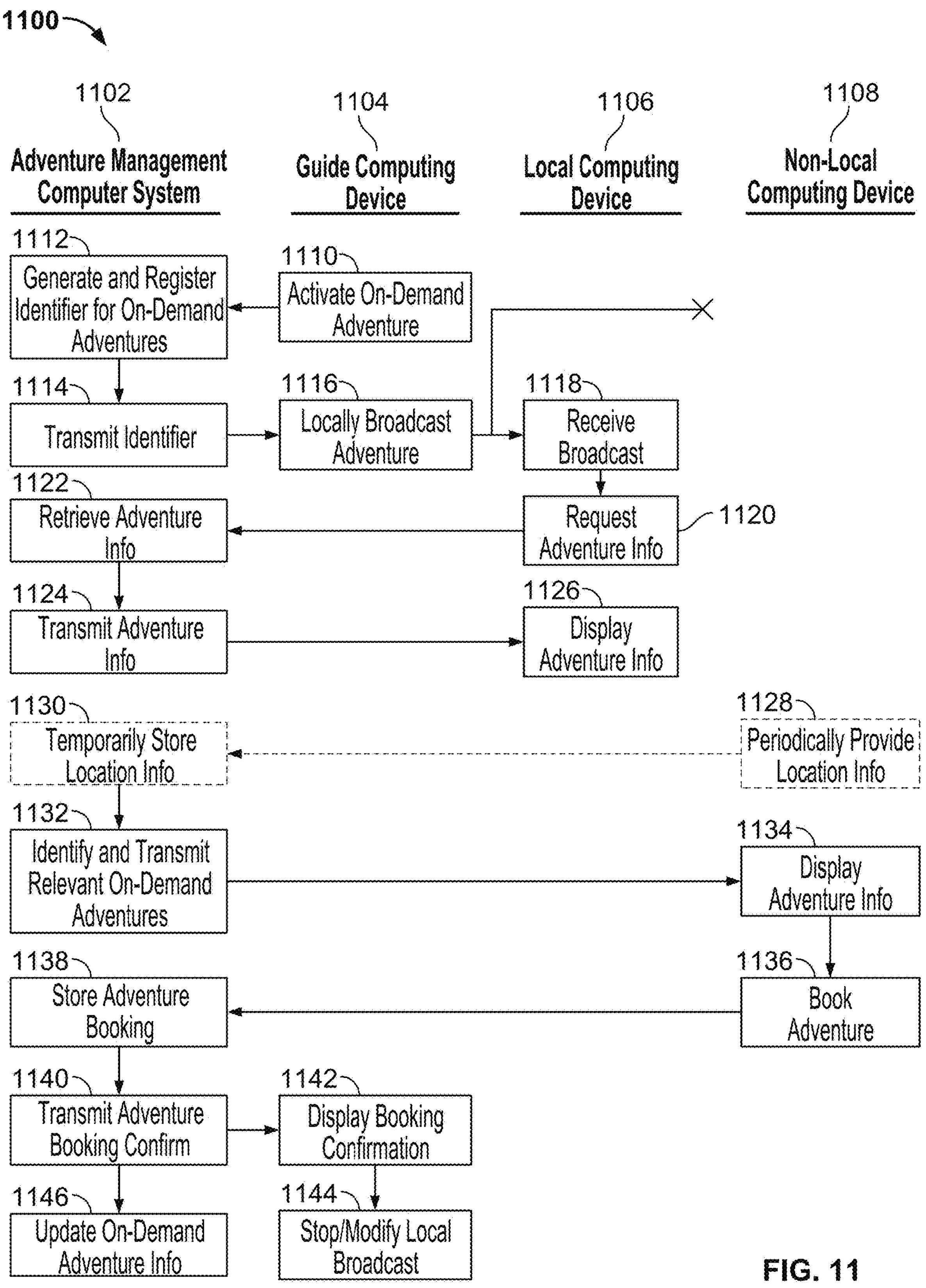
FIG. 11 is a flowchart of an example technique for providing on-duty adventure broadcasting and booking.

FIG. 11 is a flowchart of an example technique 1100 for providing on-duty adventure broadcasting and booking. The technique 1100 can be performed, in-part, by an adventure management system 1102 (similar to the systems 102, 302, 502, 802, 902), a guide computing device 1104 (similar to computing devices (similar to computing devices 104, 304, 804, 904, 1002), a local participant computing device (similar to the computing devices 906 and 1004), and a non-local participant computing devices (similar to the computing devices 908).

The guide computing device 1104 can activate an on-duty adventure (1110), which can include the guide computing device 1104 transmitting an on-duty activation request to the adventure management computer system 1102. In response to receiving the on-duty activation request, the adventure management computer system 1102 can generate and register an identifier for the on-duty adventure (1112) that can be transmitted to the guide computing device 1104 (1114) for local broadcast by the guide computing device 1104 (1116). In the depicted example, the local computing device 1106 is located within the local broadcast range of the guide computing device 1104 and can receive the broadcast (1118). However, that same broadcast may not be received by the non-local computing device 1108 that is located outside of the local broadcast range (as indicated by the 'X').

In response to receiving the broadcast, which can include the identifier for the on-duty adventure, the local computing device 1106 can request adventure information from the adventure management computer system 1102 (1120). Such a request can include the identifier locally broadcast by the guide computing device 1104. The adventure management computer system 1102 can receive the request and use the adventure identifier to retrieve adventure information (1122) and transmit the adventure information to the local computing device 1106 (1126). The local computing device 1106 can display the adventure information (1126). From the adventure information, the local computing device 1106 can proceed to book the adventure with the adventure management computer system 1102, which can all stem from the local broadcast by the guide computing device 1104 that was detected by the local computing device 1106, as described above with regard to FIG. 9.

Optionally, the non-local computing device 1108 can periodically provide location information to the adventure management computer system 1102 (1128), which can at least temporarily store the location information for serving location-based adventures to the non-local computing device 1108 (1130). For example, in response to the on-duty adventure being activated, the adventure management computer system 1102 can identify that the on-duty adventure is relevant to the non-local computing device 1108 and can transmit information for the adventure to the non-local computing device 1108 (1132). The adventure management computer system 1102 can make such determinations based on any of a variety of factors, such as proximity between a user's current/recent/estimated location and the location of the on-duty adventure, the user's interest in the type of adventure (e.g., based on explicitly expressed interests, based on implicit interests), the user's current availability to participate in the adventure (e.g., based on accessing an electronic schedule for the user), and/or combinations thereof. The adventure management computer system 1102 can perform similar analysis and distribution of on-duty adventures to the location computing device 1106 as well.

The non-local computing device 1108 can display adventure information (1134), which can include providing an interface through which the user can book the adventure (1136). The adventure management computer system 1102 can book the adventure in response to receiving the booking request from the non-local computing device 1108 (1138) and can proceed to transmit adventure booking confirmations (1140) to both the guide computing device 1104 and the non-local computing device 1108. For example, the guide computing device 1104 can display the booking confirmation (1142), which can include displaying contact information for the user of the non-local computing device 1108. Similar display of confirmation and contact information for the guide can be presented on the non-local computing device 1108. In response to receiving the booking confirmation, the guide computing device 1104 can stop and/or modify the local broadcasts for the adventure (1144) and the adventure management computer system 1102 can similarly update/modify broadcasts of on-duty adventure information (1146).

FIGS. 12A-M are a set of example screenshots for onboarding a guide to an adventure management platform through an interface on a mobile device, such as a smartphone, tablet computing device, wearable computing device (e.g., smartwatch, virtual reality headset, augmented reality headset), and/or other mobile computing devices. The screenshots in FIGS. 12A-M are examples of mobile-specific interfaces for onboarding a guide and are designed with specific features and layouts specifically adapted for ease of use on a mobile device, which generally has a smaller display with one or more touch/presence sensitive surfaces. The interfaces in FIGS. 12A-M include layouts and features to permit guides to be onboarded and to create adventures with minimal time and user input via mobile device input subsystems on mobile devices (e.g., touchscreens, buttons), which can be more difficult and cumbersome for users to provide information than traditional computer input mechanisms, such as keyboards and pointer devices (e.g., mouse). For example, the input features can laid-out in a vertical arrangements (e.g., allow for ready scrolling between features), larger sized buttons and selectable areas can be provided to reduce the granularity with which user input needs to be provided (e.g., reduce the precision with which touch input is provided), buttons and other input features sufficiently spaced apart so as to avoid erroneous inputs (e.g., avoid touch intended for a first button being registered for a second button), and to favor selectable input features over typing input features, which can reduce the number of input actions required from users. The interfaces depicted in FIGS. 12A-M are similar to the screenshots in FIGS. 4A-S, which can be used on any computing device, including both mobile computing devices and other non-mobile computing devices (e.g., desktop computers).

Figure 12A:
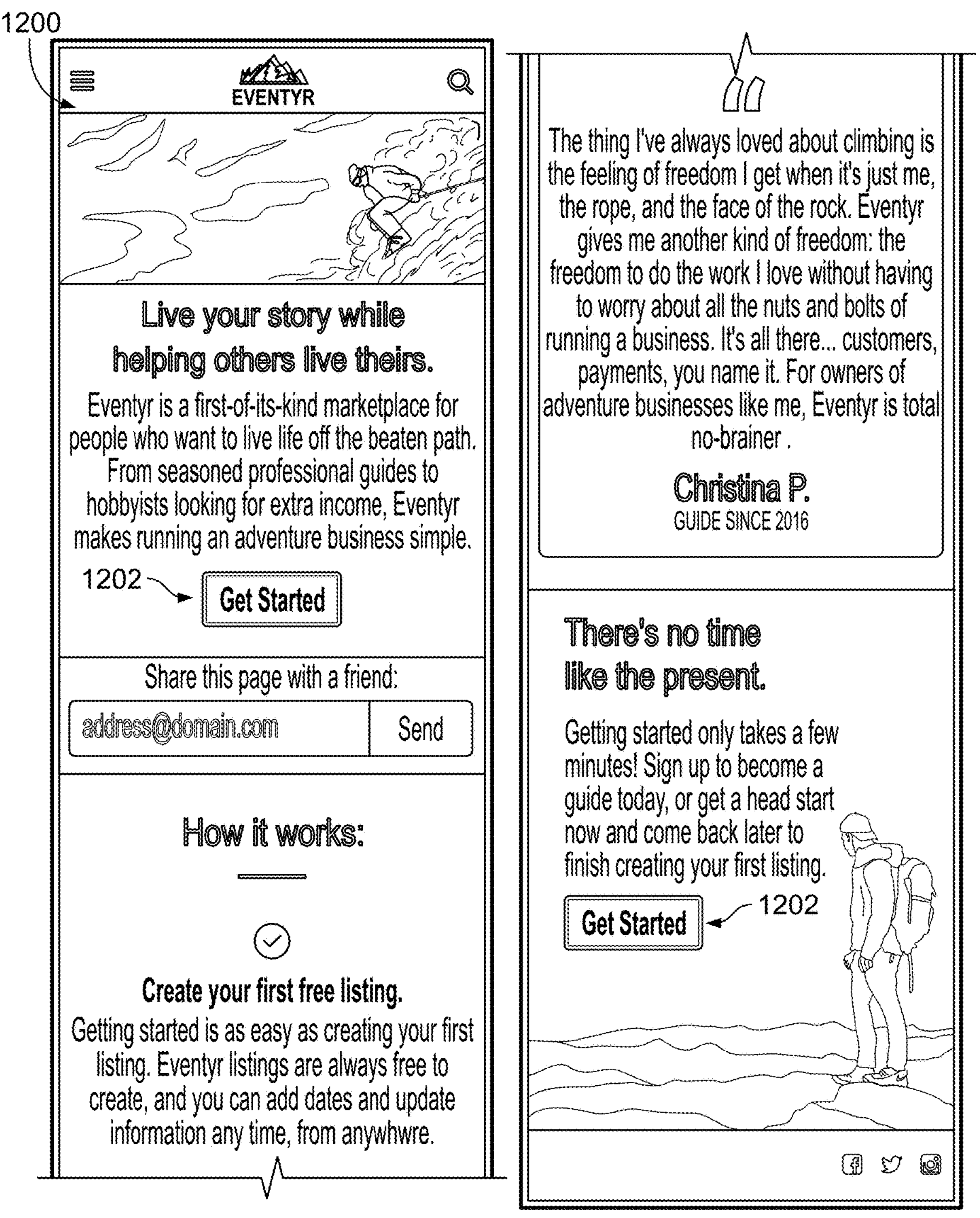

Referring to FIG. 12A, a first example GUI 1200 through which a guide can initially register with an adventure management computer system (e.g., the computer system 102) is depicted. FIG. 12A is similar to FIG. 4A, and includes a selectable buttons 1202 at the top and bottom of the page for initiating the onboarding process, similar to the buttons 402, 404. The button 1202 can be positioned at both ends of a vertically scrolling content page about becoming a guide so as to permit a user to either immediately initiate the registration process when the page is loaded or to review the content page and then initiate the registration process, which can occur without having to scroll back up to the top of the content page.

Figure 12B:
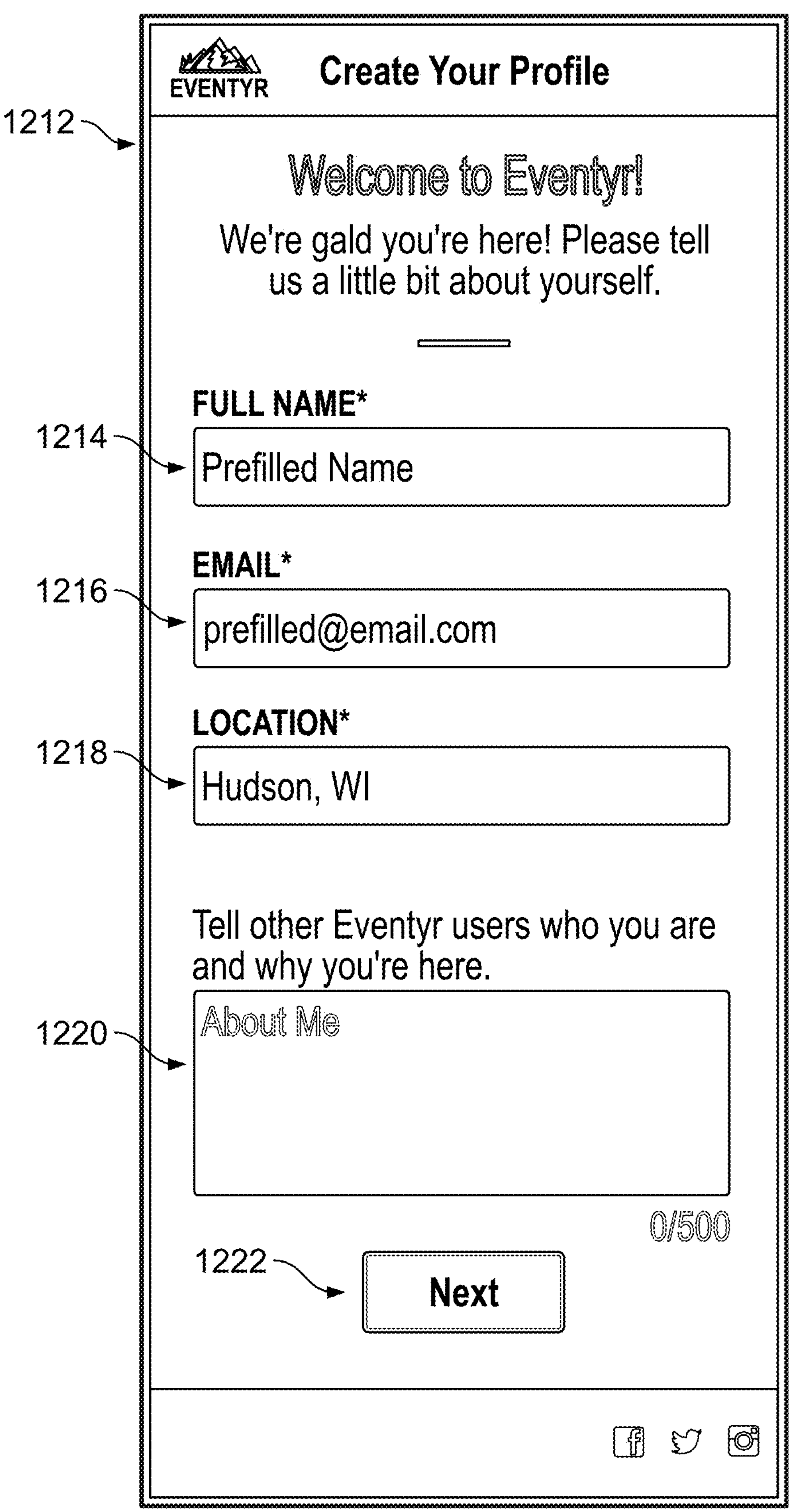

In response to selecting the buttons 1202, the user can be prompted to provide login credentials for an example social media platform, as depicted in FIG. 4B-C. Once authenticated, the social media account credentials can be used as login and account information on the platform 102, and can be used to automatically obtain and prefill information for the guide's profile, as depicted in FIG. 12B (similar to FIG. 12D). For example, the social media information can be used to prefill one or more of the fields 1214-1220 (similar to fields 414-420). Once guide information is entered, the guide can select the next button 1222 (similar to the button 422).

Figure 12C:
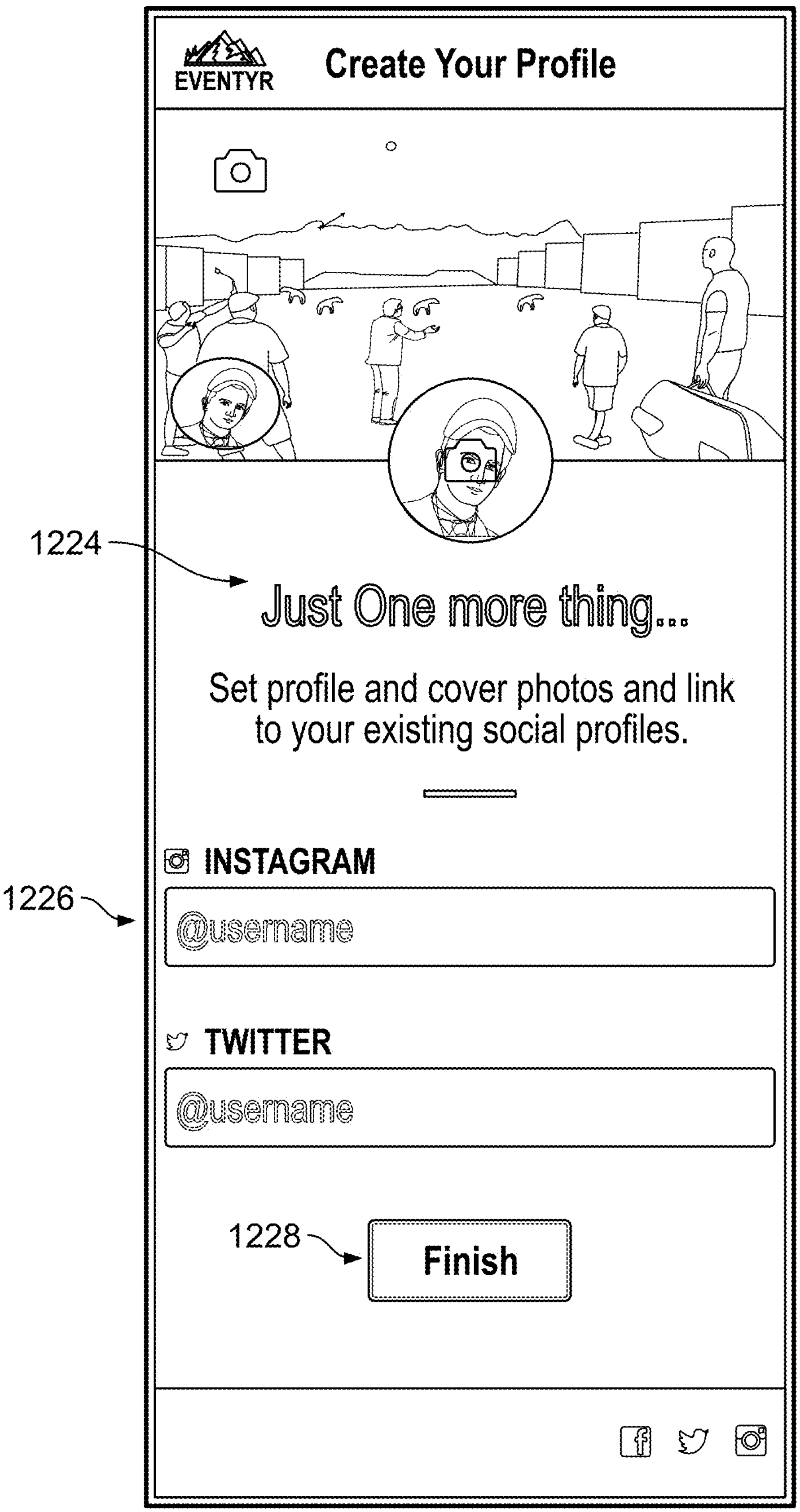

Referring now to FIG. 12C (similar to FIG. 4E), the guide can be prompted to select/set profile and cover photos (1224, similar to 424) that have been populated from the social media data for the guide, and can be asked to identify other social media accounts that are associated with the user (1226, similar to 426). These can be optional fields that a user can fill out. Once ready, the guide can select the finish button 1228 (similar to 428).

Figure 12D:
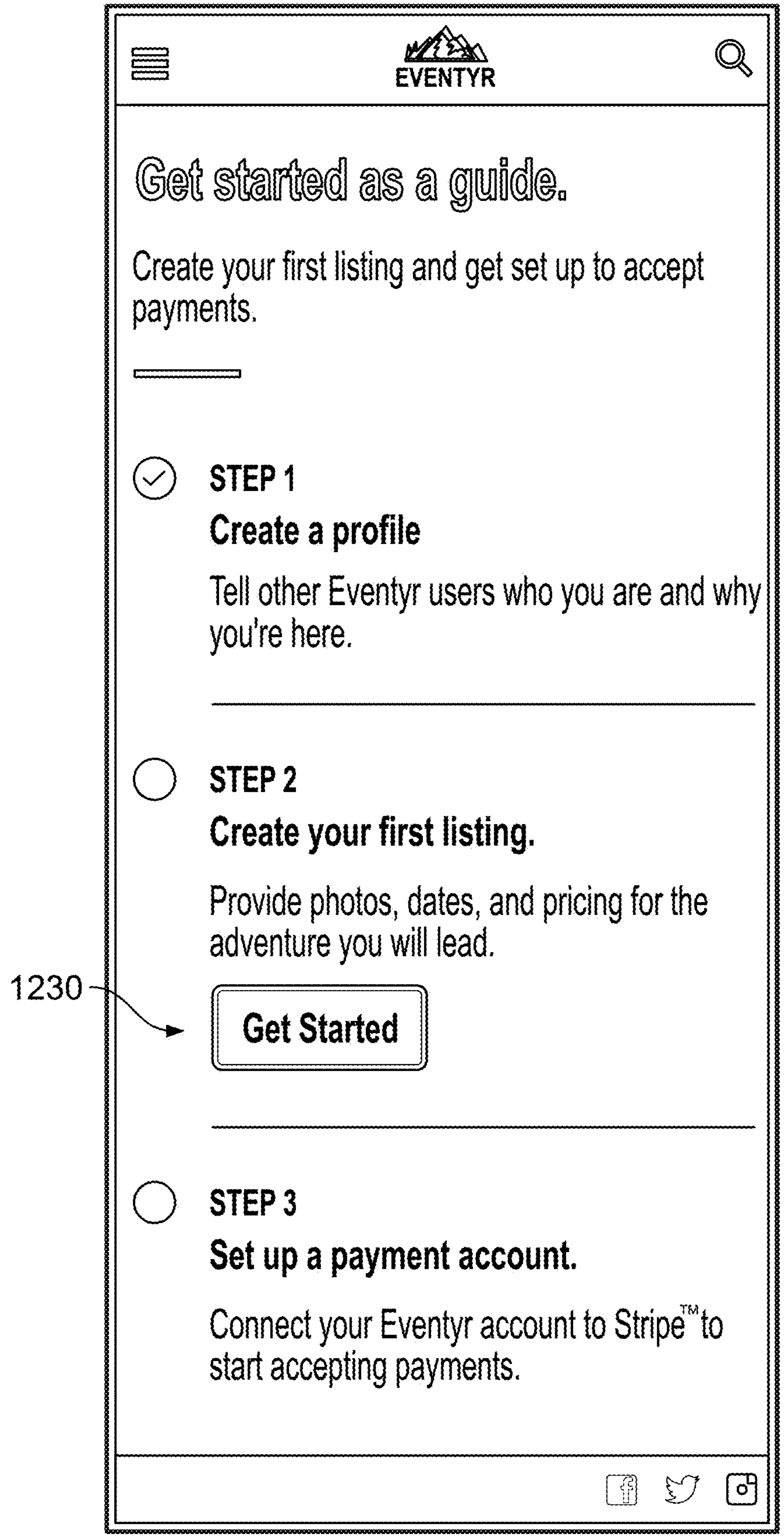
Figure 12E:
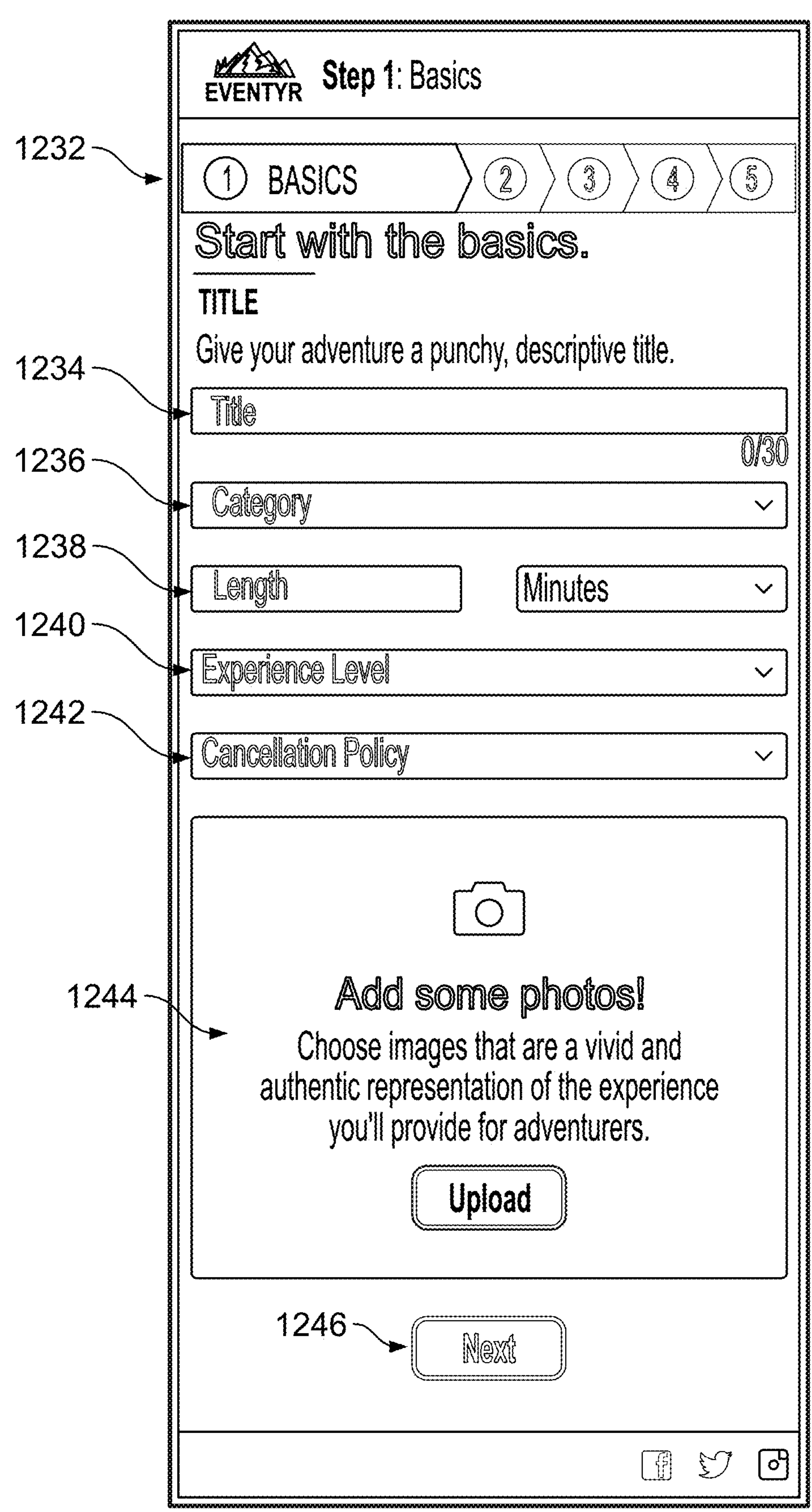

Referring now to FIG. 12D (similar to FIG. 4F), the guide can be prompted to create his/her first adventure listing, as indicated by the button 1230 (similar to button 430). A user who is not intending to initially act as a guide (but is not precluded from doing so at a later date) would not be presented with the option 1230. In response to selecting the button 1230, a first step in creating an adventure listing (identified in the status bar 1232 as "basics") is presented to the guide with fields 1234-1244 (similar to 434-444_, as depicted in FIG. 12E (similar to FIG. 4G). The fields 1234-1244 can be specifically designed to include shorter lists of enumerated values that can be readily selected by a user (e.g., drop-down lists, select forms), to simplify the guide on-boarding process on mobile devices for guides. By doing this, the number of input fields requiring the user to type information, which can be more cumbersome than mere selections, can be minimized in favor of selectable input fields, which can permit a user to provide input via one or more selection inputs. Once the basic information for the adventure has been input, the user can select the next button 1246 (similar to button 446).

Figure 12F:
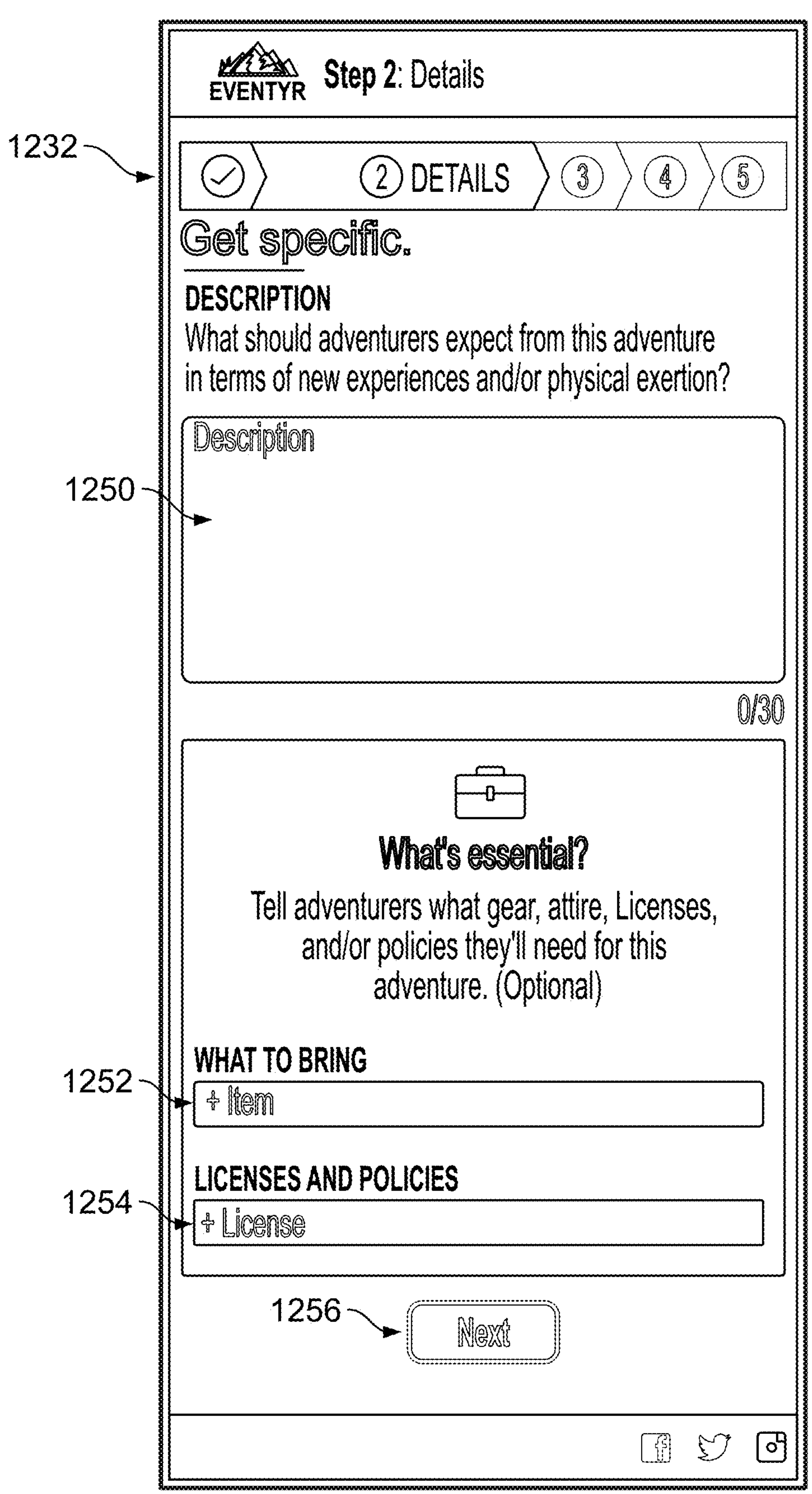

Referring now to FIG. 12F (similar to FIG. 4I), additional details for the adventure are requested via the fields 1250-1254 (similar to 450-454). In this example, the guide has provided a description of the example adventure (1250) and has identified what a user should bring (1252). Once ready, the guide can proceed to the next step by selectin the next button 1256.

Figure 12G:
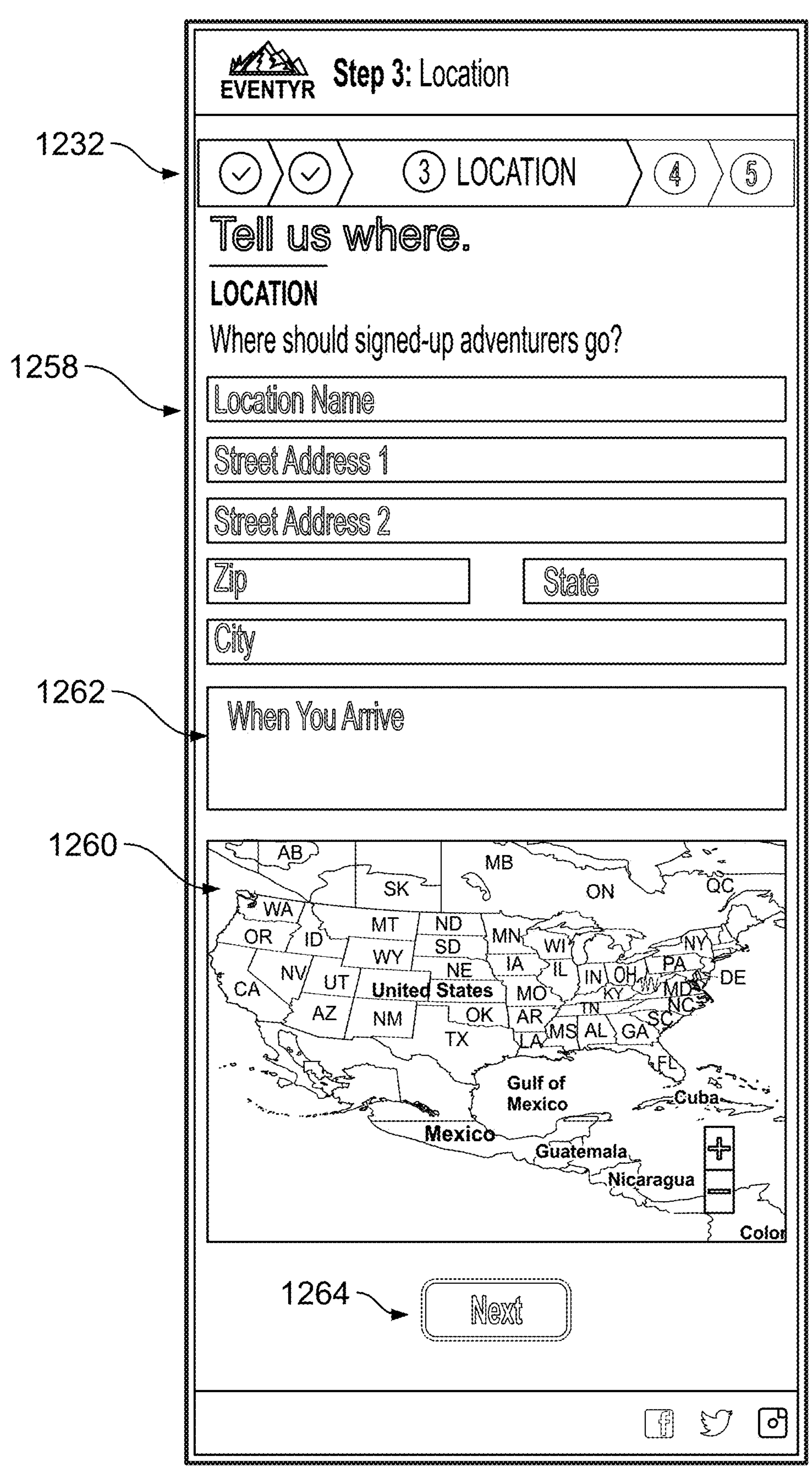

Referring now to FIG. 12G (FIG. 4J), location information for the adventure can be provided via the fields 1258 (similar to 458-462). The location can either be designated in the textual location fields 1258 or through the interactive map 1260. Once one is populated, the other can be determined and automatically populated as well. The location can be the starting location where participants are to meet the guide to participate in the adventure, with more granular instructions on where to physically meet the guide when they arrive at the location. Once ready, the guide can select the next button 1264 to proceed to the next step.

Figure 12H:
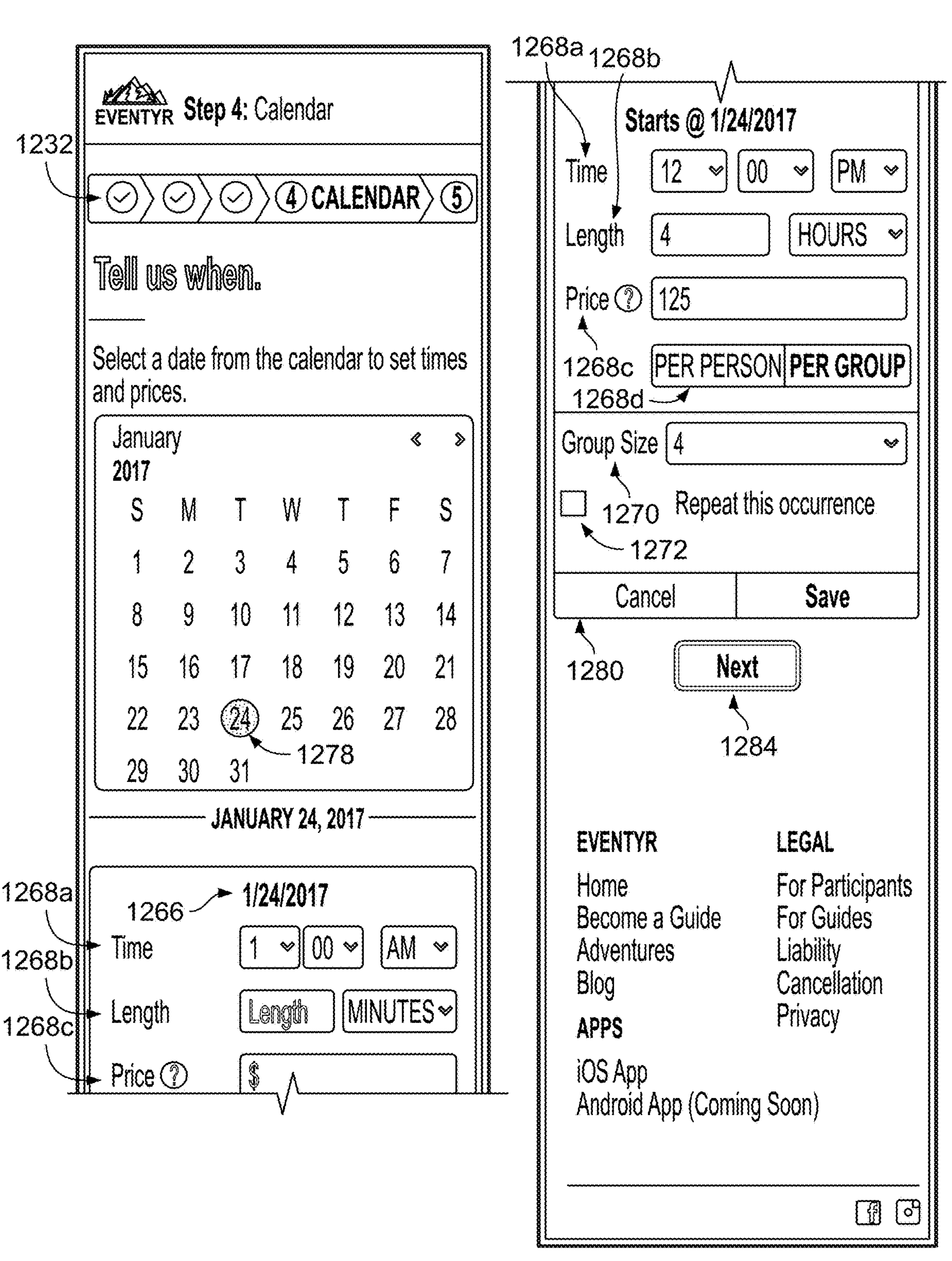

Referring now to FIG. 12H (similar to FIG. 4K), calendar information for the adventure can be provided via the fields 1268-1280 (similar to 468-480). In the depicted example, the guide is able to designate a starting date and time with touch input via the calendar (1278), which is reflected in text form as 1266. Touch-based selection of the initial calendar entry for the adventure can be easier and require less input than text-based designation of the date. The user can also designated details for the adventure vial fields 1268*a-d*, which permit designation of times, duration, price, and the pricing type for the adventure. The user can also designate the group size (1270) and repetition (1272) for the adventure, which can be saved/cancelled (1280). Multiple occurrences of an adventure, including multiple and varied repeating occurrences, can be designated via this interface, as described above with regard to FIGS. 4K-L. Once ready, the user can select the next button 1284.

Referring to FIG. 12I (similar to FIG. 4M), the user can then preview the adventure and, when ready, can select the finish button 1286 (similar to 486). Once uploaded and completed, the adventure may undergo automatic and/or human review before being officially approved and going live on the site.

Figure 12J:
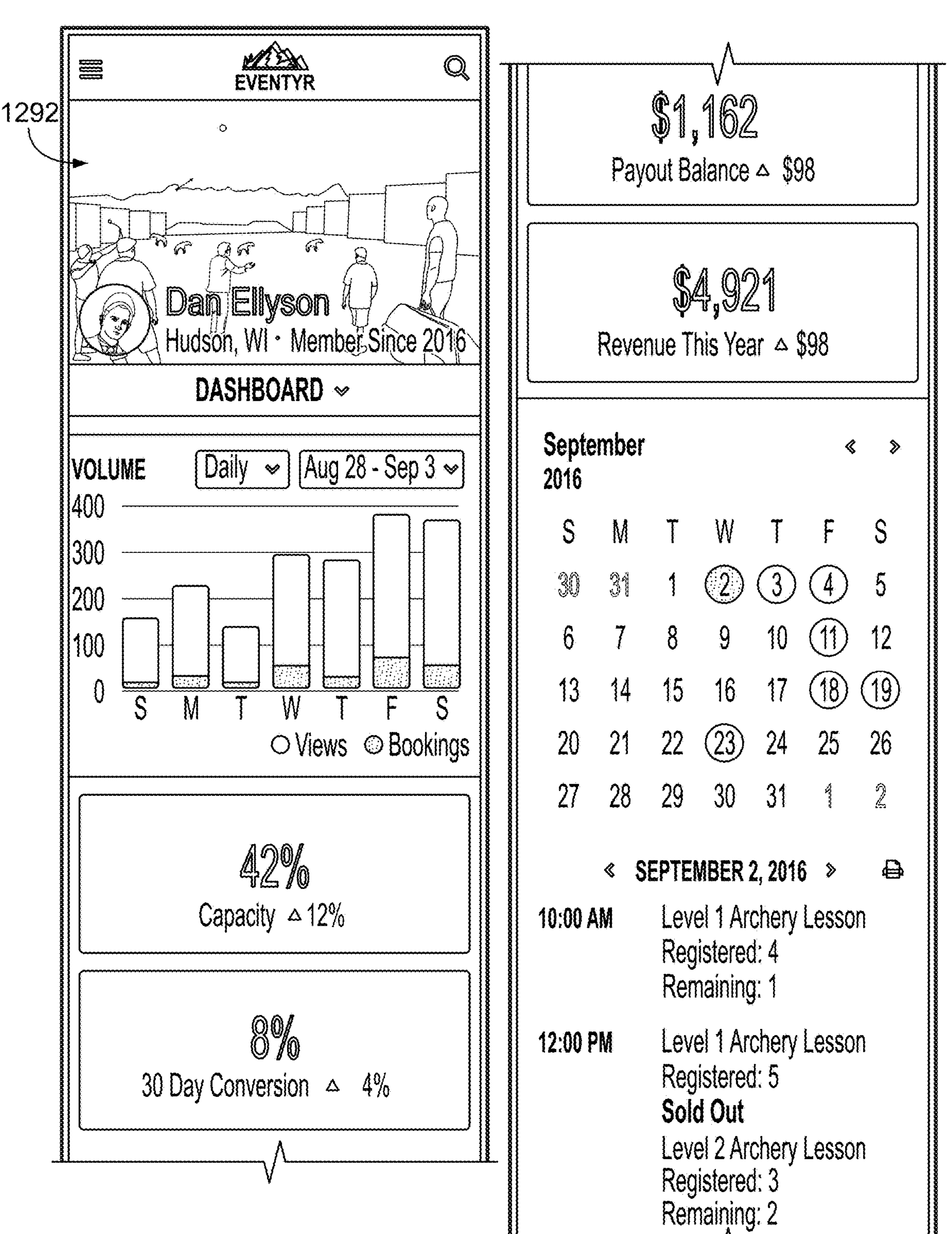
Figure 12J:
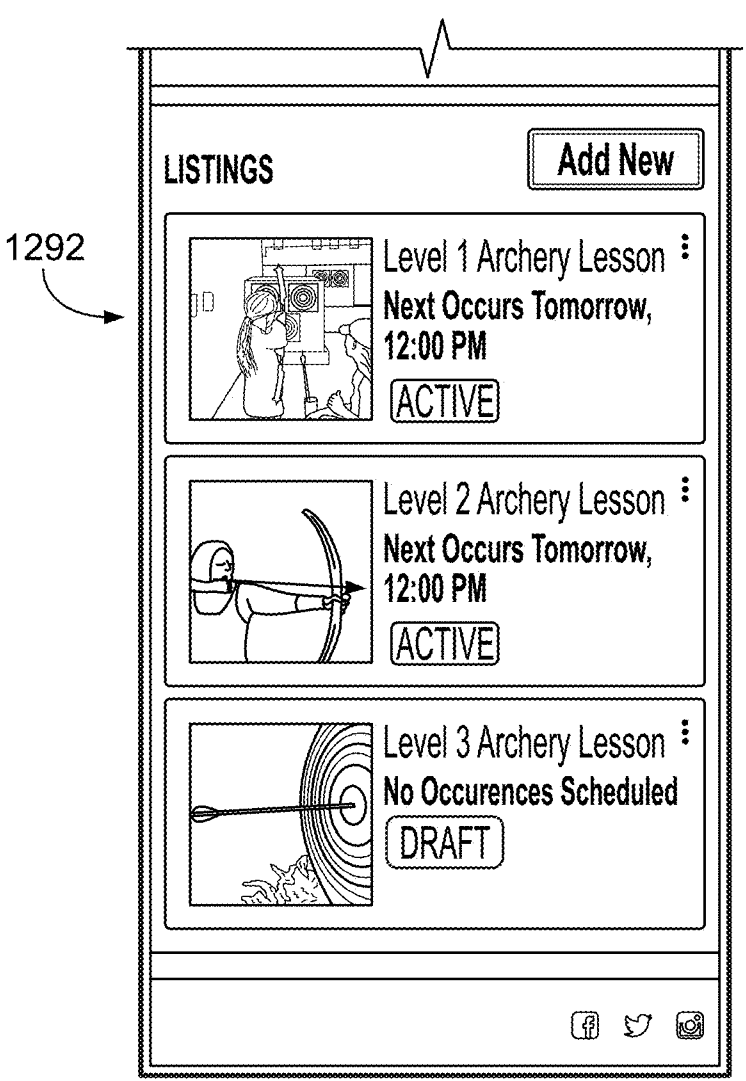

Once the onboarding process (FIGS. 12A-I) for the guide has been completed, the guide can view a customized view of his/her account on the site. Referring to FIG. 12J (similar to FIG. 4P), a dashboard interface 1292 (similar to 492) can be presented that includes a listing of all adventures that the guide has created along with statistics, revenue, and other information, along with a button to create another adventure.

Figure 12K:
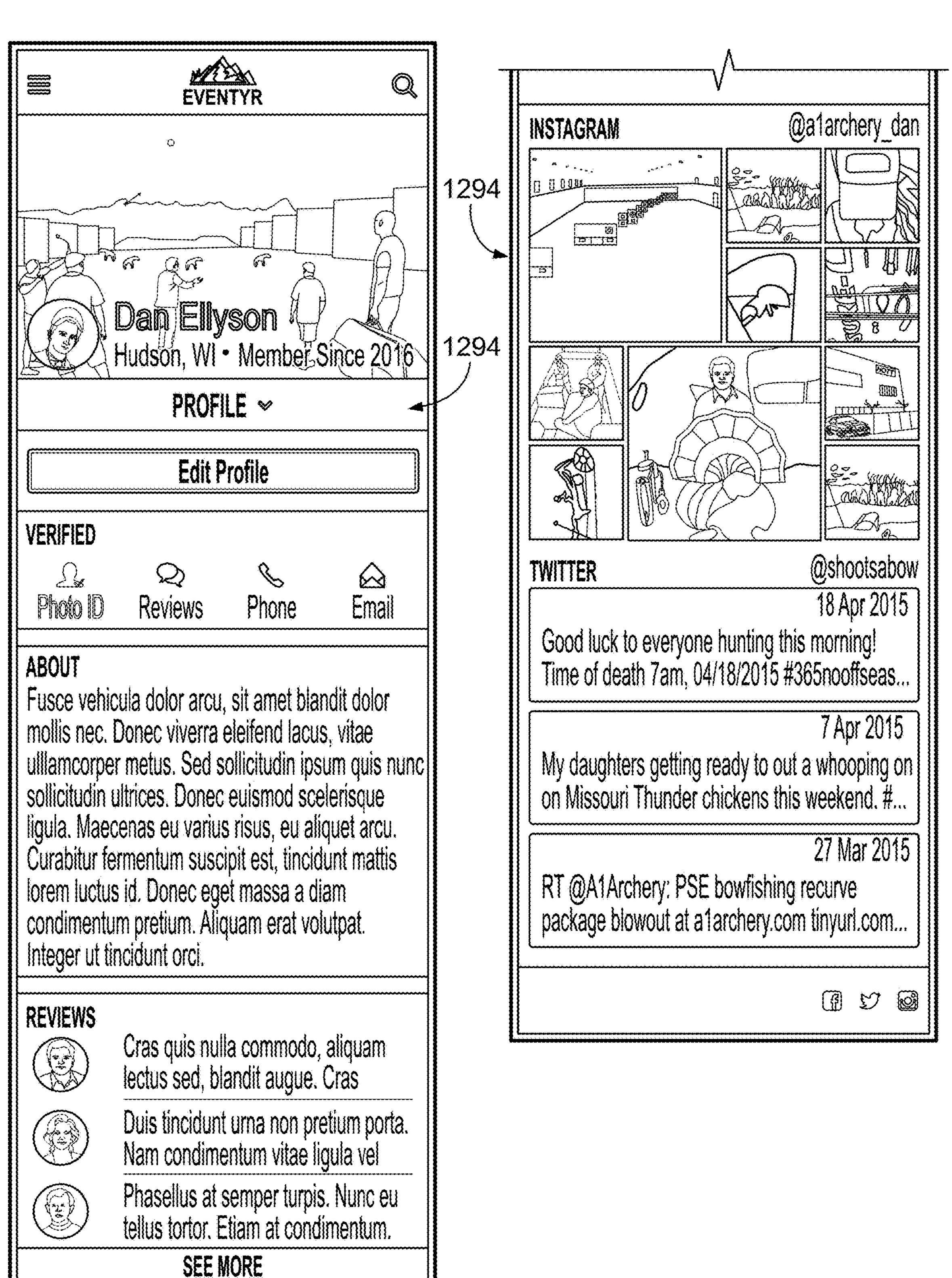

Referring to FIG. 12K (similar to FIG. 4Q), a passport interface 1294 (similar to 494) can be presented, which provides the guide with a list of adventures in which the guide has been a participant on another guide's adventure. The passport interface 494 includes upcoming adventures (booked adventures) and a history of adventures.

Figure 12L:
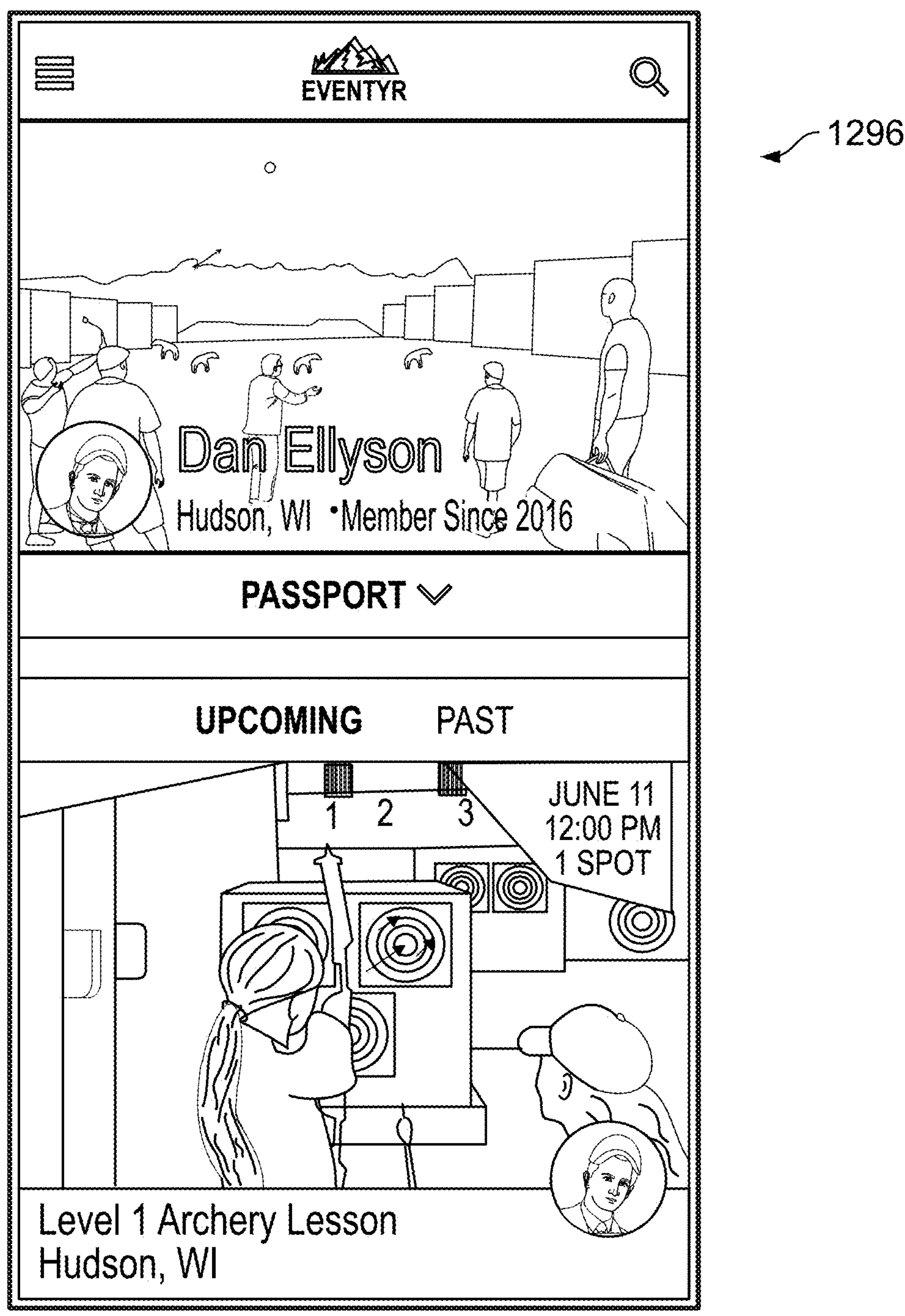

Referring now to FIG. 12L (similar to FIG. 4R), a profile interface 1296 (similar to 496) can be presented to the guide through which the guide can view his/her profile, associated photos and social media content, and reviews from past participants. The guide can use the profile interface 1296 to manage his/her public image/presentation to potential participants. Some of all of the information in the interface 1296 can be accessible to the public.

Figure 12M:
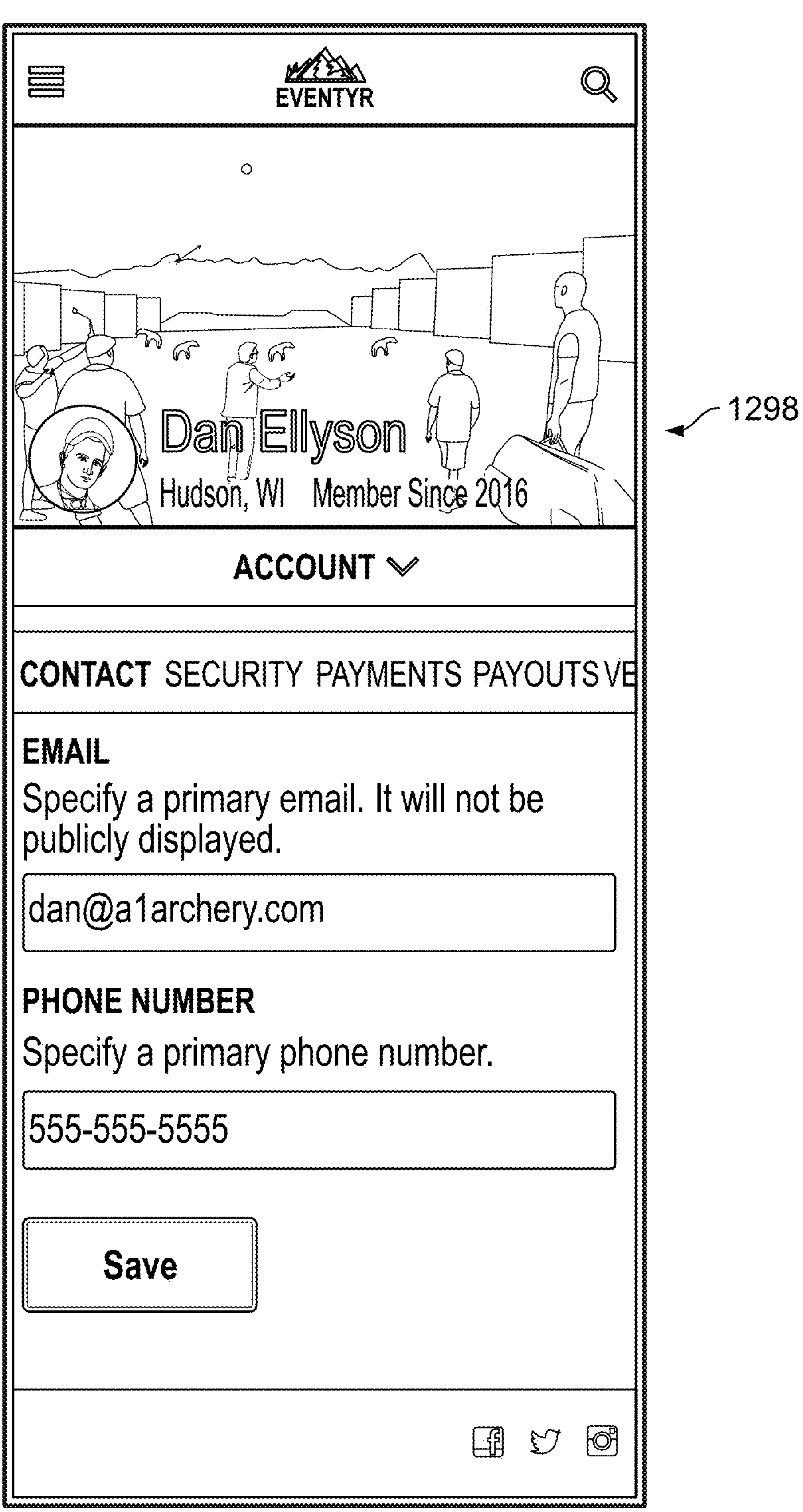

Referring now to FIG. 12M (similar to FIG. 4S), an account interface 1298 (similar to 498) can be presented through which a guide can manage his/her account settings, which can include contact information, security, payment information, payouts, and verification features.

Figure 13:
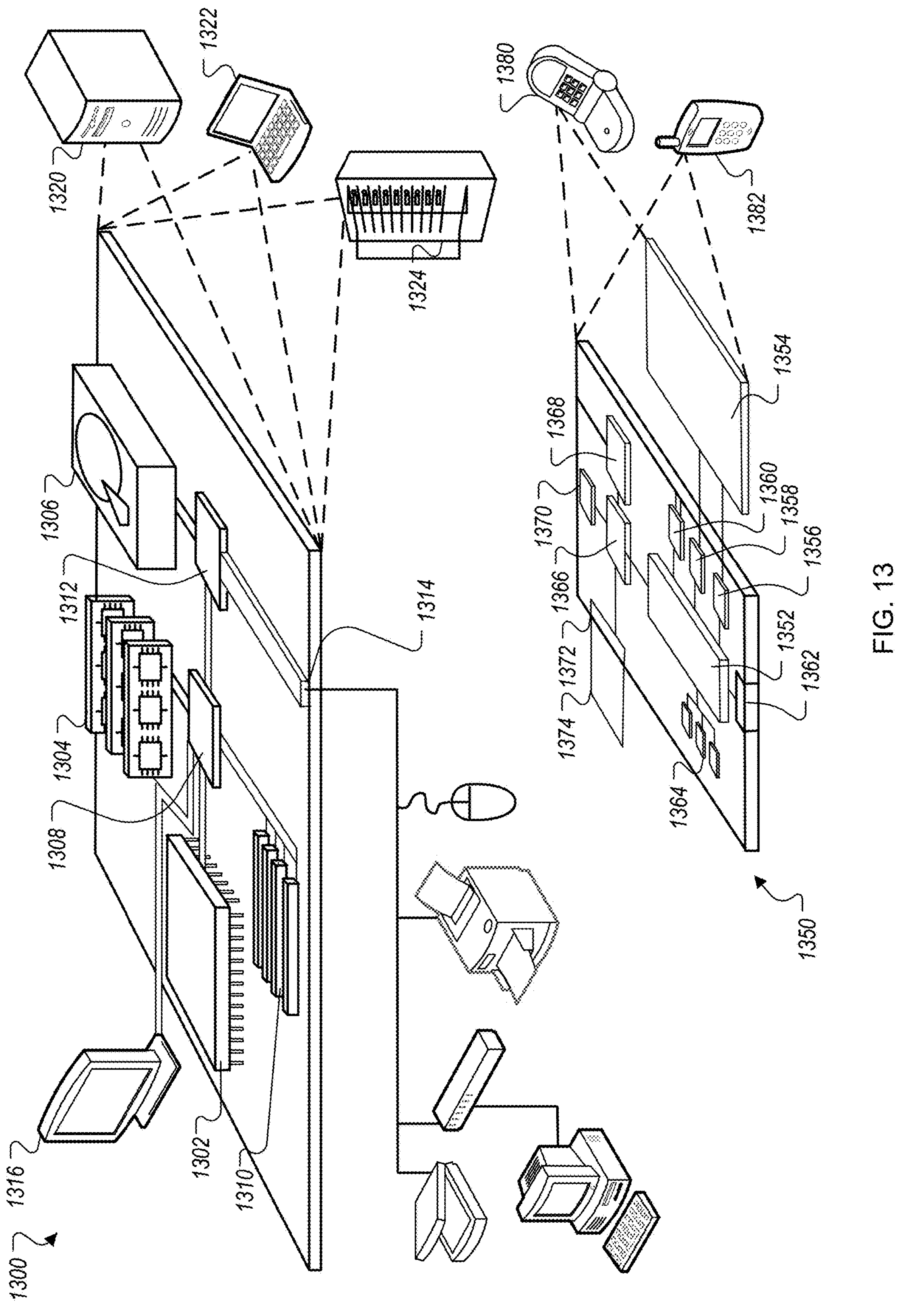
FIG. 13 is a block diagram of example computing devices.

FIG. 13 is a block diagram of computing devices 1300, 1350 that may be used to implement the systems and methods described in this document, as either a client or as a server or plurality of servers. Computing device 1300 is intended to represent various forms of digital computers, such as laptops, desktops, workstations, personal digital assistants, servers, blade servers, mainframes, and other appropriate computers. Computing device 1350 is intended to represent various forms of mobile devices, such as personal digital assistants, cellular telephones, smartphones, and other similar computing devices. Additionally computing device 1300 or 1350 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 1300 includes a processor 1302, memory 1304, a storage device 1306, a high-speed interface 1308 connecting to memory 1304 and high-speed expansion ports 1310, and a low speed interface 1312 connecting to low speed bus 1314 and storage device 1306. Each of the components 1302, 1304, 1306, 1308, 1310, and 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high speed interface 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, or memory on processor 1302.

The high speed controller 1308 manages bandwidth-intensive operations for the computing device 1300, while the low speed controller 1312 manages lower bandwidth-intensive operations. Such allocation of functions is exemplary only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing device 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT (Thin-Film-Transistor Liquid Crystal Display) display or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be provide in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be provide as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352 that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, Wi-Fi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smartphone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. An improvement to a guide mobile computing device using mobile-specific interfaces within a mobile device form factor, comprising:

the guide mobile computing device configured to execute an activity guide mobile application stored in a computer-readable memory of the guide mobile computing device such that the guide mobile computing device is responsive to touch inputs of the activity guide user at a touchscreen display of the guide mobile computing device;

a wireless communication chipset of the guide mobile computing device to transmit local beacon signals for detection by nearby mobile computing devices, the local beacon signals including, at least, the local beacon signal identifier for an activated on-duty adventure opportunity; and the touchscreen display of the guide mobile computing device configured to display and receive touch input within an interactive map and within an interactive calendar of the activity guide mobile application, wherein the guide mobile computing device is configured to wirelessly transmit activity opportunity information to adventure management computer system to activate an adventure opportunity that is reservable by a participant computing device based on the beacon signal of the guide mobile computing device being detected and without the participant computing device needing to determine its own location, wherein the touchscreen display of the guide mobile computing device is configured to display and receive touch input within a set of mobile-specific interfaces of an improved onboarding sequence of the activity guide mobile application, said improved onboarding sequence including at least one of the mobile-specific interfaces comprising said interactive map and at least another of the mobile-specific interfaces comprising said interactive calendar, and wherein the set of mobile-specific interfaces includes: an activity listing graphic user interface at the touchscreen display that prompts the activity guide user for input into each of: an activity category field, an experience level field for said one or more participants, and a photo selection field to upload an image descriptive of the activity category field.

2. The improvement to the guide mobile computing device of claim 1, wherein the set of mobile-specific interfaces includes: a registration user interface at the touchscreen display that, responsive to the activity guide user inputting social media login credentials, automatically populates text into one or more guide profile fields at the registration user interface at the touchscreen display.

3. The improvement to the guide mobile computing device of claim 2, wherein responsive to touch input indicative of completion of the set of mobile-specific interfaces of the improved onboarding sequence, wherein the touchscreen display of the guide mobile computing device is configured to display and receive touch input within a customized dashboard interface that both identifies of all adventure opportunities that the activity guide user uploaded to the adventure management computer system and contemporaneously provides a touch-responsive button to upload another adventure opportunity to the adventure management computer system.

4. The improvement to the guide mobile computing device of claim 3, wherein the set of mobile-specific interfaces includes:

an activity location graphic user interface including the interactive map that is initiated onscreen at the touchscreen display in response to user input in the activity listing graphic user interface and that displays a geographic location based on the geographic location coordinates identified by the geographic location positioning system of the guide mobile computing device, wherein touch input on the interactive map geotags a start meeting location of the activity guide user.

5. The improvement to the guide mobile computing device of claim 4, wherein the set of mobile-specific interfaces includes:

an activity calendar graphic user interface including the interactive calendar that is initiated onscreen at the touchscreen display in response to user input in the activity location graphic user interface and that displays touch-selectable dates for selection of a start date by the activity guide user.

6. The improvement to the guide mobile computing device of claim 5, wherein the adventure guide mobile application stored in the computer-readable memory of the guide mobile computing device that, when executed, causes the guide mobile computing device to:

responsive to the activity guide user input in the activity listing graphic user interface, present on the touchscreen display the activity location graphic user interface that includes the interactive map configured to receive touch input for geotagging of the start meeting location of the activity guide user;

responsive to the activity guide user input in the activity location graphic user interface, present on the touchscreen display the activity calendar graphic user interface that prompts the activity guide user for input into each of: a start date field using the interactive calendar, a payment field indicative of a price for said one or more participants, a maximum group size field, and a recurring adventure field; and after transmitting activity opportunity information to the adventure management computer system, present on the touchscreen display a participant reservation notification indicative of said one or more participants reserving an activity for the start date previously selected using the activity calendar graphic user interface of the guide mobile computing device.

7. The improvement to the guide mobile computing device of claim 6, wherein the adventure guide mobile application stored in the computer-readable memory of the guide mobile computing device that, when executed, further causes the guide mobile computing device to:

update the activity calendar graphic user interface of the guide mobile computing device in response to receiving the participant reservation notification indicative of said one or more participants reserving the activity for the start date previously selected using the activity calendar graphic user interface of the guide mobile computing device.

8. The improvement to the guide mobile computing device of claim 1, wherein the adventure guide mobile application stored in the computer-readable memory of the guide mobile computing device that, when executed, further causes the guide mobile computing device to:

present on the touchscreen display a payment notification of said one or more participants reserving the activity.

9. The improvement to the guide mobile computing device of claim 1, wherein the adventure guide mobile application stored in the computer-readable memory of the guide mobile computing device that, when executed, further causes the guide mobile computing device to:

present on the touchscreen display a media share graphic user interface that prompts the activity guide user to select images or video for uploading to the adventure management computer system for sharing with said one or more participants reserving the activity.

10. The improvement to the guide mobile computing device of claim 1, wherein the adventure guide mobile application stored in the computer-readable memory of the guide mobile computing device that, when executed, further causes the guide mobile computing device to:

present on the touchscreen display an on-duty activation graphic user interface that provides a single-button activation to signal that the activity guide user is immediately available for on-duty adventure opportunity previously input via the activity listing graphic user interface.

11. An improvement to a guide mobile computing device using mobile-specific interfaces of an activity guide mobile application within a mobile device form factor, comprising:

the guide mobile computing device configured to execute the activity guide mobile application stored in a computer-readable memory of the guide mobile computing device such that the guide mobile computing device is responsive to touch inputs of the activity guide user at a touchscreen display of the guide mobile computing device;

a wireless communication chipset of the guide mobile computing device to transmit local beacon signals for detection by nearby mobile computing devices, the local beacon signals including, at least, the local beacon signal identifier for an activated on-duty adventure opportunity, wherein the guide mobile computing device is configured to wirelessly transmit activity opportunity information to adventure management computer system to activate an adventure opportunity that is reservable by a participant computing device based on the beacon signal of the guide mobile computing device being detected, wherein the touchscreen display of the guide mobile computing device is configured to display and receive touch input within a set of mobile-specific interfaces of an improved onboarding sequence of the activity guide mobile application, said improved onboarding sequence including at least one of the mobile-specific interfaces comprising an interactive map and at least another of the mobile-specific interfaces comprising an interactive calendar, and wherein the set of mobile-specific interfaces includes: an activity listing graphic user interface at the touchscreen display that prompts the activity guide user for input into each of: an activity category field, an experience level field for said one or more participants, and a photo selection field to upload an image descriptive of the activity category field.

12. The improvement to the guide mobile computing device of claim 11, wherein the set of mobile-specific interfaces includes: a registration user interface at the touchscreen display that, responsive to the activity guide user inputting social media login credentials, automatically populates text into one or more guide profile fields at the registration user interface at the touchscreen display.

13. The improvement to the guide mobile computing device of claim 12, wherein responsive to touch input indicative of completion of the set of mobile-specific interfaces of the improved onboarding sequence, wherein the touchscreen display of the guide mobile computing device is configured to display and receive touch input within a customized dashboard interface that both identifies of all adventure opportunities that the activity guide user uploaded to the adventure management computer system and contemporaneously provides a touch-responsive button to upload another adventure opportunity to the adventure management computer system.

14. The improvement to the guide mobile computing device of claim 13, wherein the set of mobile-specific interfaces includes:

an activity location graphic user interface including the interactive map that is initiated onscreen at the touchscreen display in response to user input in the activity listing graphic user interface and that displays a geographic location based on the geographic location coordinates identified by the geographic location positioning system of the guide mobile computing device, wherein touch input on the interactive map geotags a start meeting location of the activity guide user.

15. The improvement to the guide mobile computing device of claim 14, wherein the set of mobile-specific interfaces includes:

an activity calendar graphic user interface including the interactive calendar that is initiated onscreen at the touchscreen display in response to user input in the activity location graphic user interface and that displays touch-selectable dates for selection of a start date by the activity guide user.

16. The improvement to the guide mobile computing device of claim 15, wherein the adventure guide mobile application stored in the computer-readable memory of the guide mobile computing device that, when executed, causes the guide mobile computing device to:

responsive to the activity guide user input in the activity listing graphic user interface, present on the touchscreen display the activity location graphic user interface that includes the interactive map configured to receive touch input for geotagging of the start meeting location of the activity guide user;

responsive to the activity guide user input in the activity location graphic user interface, present on the touchscreen display the activity calendar graphic user interface that prompts the activity guide user for input into each of: a start date field using the interactive calendar, a payment field indicative of a price for said one or more participants, a maximum group size field, and a recurring adventure field; and after transmitting activity opportunity information to the adventure management computer system, present on the touchscreen display a participant reservation notification indicative of said one or more participants reserving an activity for the start date previously selected using the activity calendar graphic user interface of the guide mobile computing device.

17. The improvement to the guide mobile computing device of claim 6, wherein the adventure guide mobile application stored in the computer-readable memory of the guide mobile computing device that, when executed, further causes the guide mobile computing device to:

update the activity calendar graphic user interface of the guide mobile computing device in response to receiving the participant reservation notification indicative of said one or more participants reserving the activity for the start date previously selected using the activity calendar graphic user interface of the guide mobile computing device.

18. The improvement to the guide mobile computing device of claim 11, wherein the adventure guide mobile application stored in the computer-readable memory of the guide mobile computing device that, when executed, further causes the guide mobile computing device to:

present on the touchscreen display a payment notification of said one or more participants reserving the activity.

19. The improvement to the guide mobile computing device of claim 11, wherein the adventure guide mobile application stored in the computer-readable memory of the guide mobile computing device that, when executed, further causes the guide mobile computing device to:

present on the touchscreen display a media share graphic user interface that prompts the activity guide user to select images or video for uploading to the adventure management computer system for sharing with said one or more participants reserving the activity.

20. The improvement to the guide mobile computing device of claim 11, wherein the adventure guide mobile application stored in the computer-readable memory of the guide mobile computing device that, when executed, further causes the guide mobile computing device to:

present on the touchscreen display an on-duty activation graphic user interface that provides a single-button activation to signal that the activity guide user is immediately available for on-duty adventure opportunity previously input via the activity listing graphic user interface.

* * * * *